(12) United States Patent
Orita

(10) Patent No.: US 8,504,208 B2
(45) Date of Patent: Aug. 6, 2013

(54) MOBILE OBJECT CONTROLLER AND FLOOR SURFACE ESTIMATOR

(75) Inventor: Atsuo Orita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/479,894

(22) Filed: May 24, 2012

(65) Prior Publication Data

US 2012/0303162 A1 Nov. 29, 2012

(30) Foreign Application Priority Data

May 25, 2011 (JP) ................................. 2011-117462
May 25, 2011 (JP) ................................. 2011-117463
May 25, 2011 (JP) ................................. 2011-117464

(51) Int. Cl.
G05B 15/02 (2006.01)

(52) U.S. Cl.
USPC ............... 700/275; 700/245; 700/260; 901/1

(58) Field of Classification Search
None
See application file for complete search history.

(56) References Cited

U.S. PATENT DOCUMENTS

| | | | | |
|---|---|---|---|---|
| 5,276,390 | A * | 1/1994 | Fisher et al. ............... | 318/568.1 |
| 5,929,585 | A * | 7/1999 | Fujita ......................... | 318/568.2 |
| 7,664,572 | B2 * | 2/2010 | Takenaka et al. ............ | 700/253 |
| 8,005,573 | B2 * | 8/2011 | Takenaka et al. ............ | 700/260 |
| 2002/0103610 | A1 * | 8/2002 | Bachmann et al. ............ | 702/94 |
| 2005/0085948 | A1 * | 4/2005 | Herr et al. ..................... | 700/258 |
| 2011/0301756 | A1 * | 12/2011 | Yoshiike et al. .............. | 700/253 |
| 2012/0259463 | A1 * | 10/2012 | Orita ............................ | 700/245 |
| 2012/0303161 | A1 * | 11/2012 | Orita ............................ | 700/262 |

FOREIGN PATENT DOCUMENTS

| | | |
|---|---|---|
| JP | 06-031658 | 2/1994 |
| JP | 10-277969 | 10/1998 |

OTHER PUBLICATIONS

T. Takenaka, T. Matsumoto, T. Yoshiike, T. Hasegawa, S. Shirokura, H. Kaneko, and A. Orita, "Real Time Motion Generation and Control for Biped Robot—4th Report: Integrated Balance Control-", In Proceedings of IEEE/RSJ International Conference on Intelligent Robots and Systems, 2009.*
Huang, Qingjiu "Hybrid position, posture, force and moment control of robot manipulators" 1444-1450, Robotics and Biomimetics, 2008. ROBIO 2008. IEEE International Conference on Feb. 22-25, 2009.*
J.L. Jiu, and H.P. Huang, "A fast and smooth walking pattern generator of biped robot using Jacobian inverse kinematics," IEEE Workshop on Advanced Robotics and Its Social Impacts, ARSO 2007, pp. 1-6, 2007.*

* cited by examiner

*Primary Examiner* — Kavita Padmanabhan
*Assistant Examiner* — Michael Scapin
(74) *Attorney, Agent, or Firm* — Rankin, Hill & Clark LLP

(57) ABSTRACT

A total floor reaction force required correction amount by which an error between an observed value of a total floor reaction force acting on a mobile object 101 and a desired total floor reaction force approaches zero is converted to a spring displacement amount of a position/posture of a representative contact surface representative of ground surfaces of the mobile object 101. A correction amount of a displacement amount of each joint of the mobile object 101 is determined by multiplying the spring displacement amount by a pseudo inverse matrix of a Jacobian matrix representing a relation between a change amount of the position and posture of the representative contact surface per unit time and a change amount of a generalized variable vector per unit time. The displacement amount of each joint is controlled according to a corrected desired joint displacement amount obtained by correcting a desired joint displacement amount.

15 Claims, 11 Drawing Sheets

MOBILE OBJECT CONTROLLER AND FLOOR SURFACE ESTIMATOR

BACKGROUND OF THE INVENTION

1. Field of the Invention

The present invention relates to a controller of a mobile object such as a legged mobile robot, and an estimator for estimating a position and posture of a floor surface on which the mobile object moves.

2. Description of the Related Art

In motion control of a mobile object such as a legged mobile robot that moves on a floor surface by moving a plurality of leg links (e.g. repeatedly landing and lifting each leg link) connected to a body, each leg link's joints are basically driven so that an actual motion of the mobile object follows a desired motion of the mobile object.

Typically, the desired motion is generated so as to satisfy kinetic requirements (requirements such as the ZMP existing within a supporting polygon) on a supposed floor surface that is set to represent an actual floor surface. However, a shape error and the like of the supposed floor surface, which is used for generating the desired motion, from the actual floor surface can cause the actual motion of the mobile object to deviate from the desired motion. In such a case, the mobile object tends to lose its posture.

As a technique for preventing this, a compliance control technique proposed by the applicant of the present application in Japanese Patent No. 3629133 (hereafter referred to as Patent Document 1) as an example is conventionally known. In this compliance control technique, while observing a floor reaction force actually acting on a bipedal walking robot, a desired position and posture of a distal end (foot) of each leg link are corrected so that an actual floor reaction force moment generated about a desired total floor reaction force central point follows a desired moment for restoring the bipedal walking robot's upper body posture to a desired posture. The amount of displacement of each joint of the leg link is controlled according to the corrected desired position and posture.

Moreover, a technique of estimating an inclination angle of an actual floor surface in a mobile environment of a legged mobile robot is conventionally proposed by the applicant of the present application in Japanese Patent No. 3024028 (hereafter referred to as Patent Document 2) as an example.

SUMMARY OF THE INVENTION

In the conventional compliance control technique as described in Patent Document 1, the correction of the desired position and posture of the distal end (foot) of each leg link so that the actual floor reaction force moment generated about the desired total floor reaction force central point follows the desired moment is a combination of a correction (hereafter referred to as a first correction) that changes the vertical positions of the distal ends of both leg links in opposite directions and a correction (hereafter referred to as a second correction) that changes the posture of the distal end of each leg link.

Here, the amount of correction of the position of the distal end of each leg link in the first correction and the amount of correction of the posture of the distal end of each leg link in the second correction are separately determined.

In the conventional compliance control technique, however, a change in floor reaction force due to the first correction and a change in floor reaction force due to the second correction tend to interfere with each other. This is problematic because a change in floor reaction force moment actually generated as a result of the correction of the position and posture of the distal end of each leg link by combining the first correction and the second correction tends to cause a discrepancy with the desired moment.

In order to suppress the discrepancy as much as possible, it is necessary to appropriately adjust a gain for determining the amount of correction of the position of the distal end of each leg link by the first correction (i.e. a gain defining a ratio at which a moment to be generated about the desired total floor reaction force central point by the first correction contributes to the desired moment) and a gain for determining the amount of correction of the posture of the distal end of each leg link by the second correction (i.e. a gain defining a ratio at which a moment to be generated about the desired total floor reaction force central point by the second correction contributes to the desired moment). This is problematic because a large number of processing steps are usually required for such adjustment.

Meanwhile, in order to realize various motions of the mobile object such as the legged mobile robot, there is also a need to not only cause the mobile object to move (travel) on a floor but also cause the mobile object to perform a required motion while at least one movable link such as a leg link or an arm link of the mobile object contacts each of a plurality of contact target surfaces (e.g. a floor surface and a wall surface) existing in a mobile environment (external world) of the mobile object.

In this case, a contact force (reaction force) acts on the mobile object from each contact target surface, unlike in the case where the mobile object simply moves on the floor.

In such a situation where the mobile object contacts the plurality of contact target surfaces, too, it is desirable to appropriately adjust the amount of displacement of each joint of the mobile object so that a contact force (reaction force) actually acting on the mobile object from each contact target surface follows a required desired contact force, to enable the mobile object to move stably.

Here, the compliance control technique as described in Patent Document 1 may be applied to control the contact force actually acting on the mobile object from each contact target surface.

In the conventional compliance control technique, however, a change in floor reaction force moment actually generated as a result of the correction of the position and posture of the distal end of each leg link by combining the first correction and the second correction tends to cause a discrepancy with the desired moment, as mentioned earlier. There is a possibility that the same problem arises on each contact target surface other than the floor surface.

Besides, since there are a larger number of contact target surfaces, a larger number of processing steps are required for appropriate adjustment of the gain relating to the correction (first correction) of the position of the movable link on each contact target surface and the gain relating to the correction (second correction) of the posture of the movable link on each contact target surface, in order to suppress the above-mentioned discrepancy as much as possible.

When the mobile object subjected to compliance control as described in Patent Document 1 moves on the floor surface, a steady-state error between a total floor reaction force actually acting on the mobile object and a desired total floor reaction force seems to be caused by an error of the position or posture of the supposed floor surface, which is used when generating the desired motion of the mobile object, from the actual floor surface.

Accordingly, the technique as described in Patent Document 2 may be employed to estimate the position or posture of the actual floor surface based on the error between the observed (measured or estimated) value of the actual total floor reaction force and the desired total floor reaction force, while performing compliance control as described in Patent Document 1.

In the conventional compliance control technique, however, a change in floor reaction force moment actually generated as a result of the correction of the position and posture of the distal end of each leg link by combining the first correction and the second correction tends to cause a discrepancy with the desired moment, as mentioned earlier.

This raises a possibility that, in the case of estimating the position or posture of the actual floor surface by the technique as described in Patent Document 2 based on the error between the observed value of the actual total floor reaction force and the desired total floor reaction force, it is difficult to attain sufficiently high estimation accuracy.

Besides, a large number of processing steps are required for appropriate adjustment of the gain relating to the first correction and the gain relating to the second correction in order to suppress the above-mentioned discrepancy as much as possible, as mentioned earlier.

Furthermore, in the case of applying the technique as described in Patent Document 2 to the technique as described in Patent Document 1, it is necessary to set a compliance model for floor surface estimation, apart from the compliance control technique as described in Patent Document 1. This is problematic because the mobile object control process is more complicated.

The present invention was made in view of the background described above, and has an object of providing a mobile object controller capable of appropriate motion control of a mobile object moving on a floor surface so that a total floor reaction force actually acting on the mobile object follows a desired total floor reaction force, with no need for a process of determining the amount of correction of a position and posture of a distal end of each leg link from a desired motion.

The present invention more generally has an object of providing a mobile object controller capable of appropriate motion control of a mobile object moving in contact with a plurality of contact target surfaces so that a total contact force actually acting on the mobile object from each contact target surface follows a desired value, with no need for a process of determining the amount of correction of a position and posture of each contact portion of the mobile object on each contact target surface from a desired motion.

The present invention further has an object of providing a floor surface estimator capable of appropriate estimation of a position and posture of an actual floor surface in a mobile environment of a mobile object, while performing appropriate motion control of the mobile object moving on a floor surface so that a total floor reaction force actually acting on the mobile object follows a desired total floor reaction force with no need for a process of determining the amount of correction of a position and posture of a distal end of each leg link from a desired motion.

Generalized concepts of technical matters on which the present invention is based are described below.

As shown in FIG. 1, a mobile object 101 having N (N≧2) leg links 103_1 to 103_N connected to a body 102 is supposed to be a mobile object capable of moving on a floor surface. Each of the leg links 103_1 to 103_N of the mobile object 101 has a plurality of joints (not shown). Displacing these joints enables each of the leg links 103_1 to 103_N to move spatially. Each joint is a rotational joint or a prismatic joint.

By grounding (contacting the floor surface) a distal end of a supporting leg that is composed of at least one leg link out of the N leg links 103_1 to 103_N, the mobile object 101 can support its own weight on the floor surface via the supporting leg. Moreover, by spatially moving the leg links 103_1 to 103_N, the mobile object 101 can move on the floor surface. Hereafter, each of the leg links 103_1 to 103_N is generically referred to as an i-th leg link 103_$i$ (i=1, 2, ..., N) or a leg link 103_$i$.

In an arbitrary motion state of the mobile object 101, a total floor reaction force (vector) which is a floor reaction force total acting on the mobile object 101 from the floor surface is denoted by ↑FMt, a total translational floor reaction force which is a translational force vector of ↑FMt is denoted by ↑Ft, and a total floor reaction force moment which is a moment vector of ↑FMt is denoted by ↑Mt.

Here, the total translational floor reaction force ↑Ft and the total floor reaction force moment ↑Mt are each expressed as a three-component column vector in an inertial coordinate system (coordinate system fixed with respect to the floor). The total floor reaction force ↑FMt is expressed as a six-component column vector (=[↑Ft, ↑Mt]$^T$) formed by arranging the components of ↑Ft and ↑Mt. An acting point Pt of the total floor reaction force ↑FMt is a point on the floor surface.

In this specification, the symbol "↑" is used to express a vector (column vector). The superscript "T" denotes transposition. As the inertial coordinate system for representing the translational force, the moment, the position, the posture, and the like, a three-axis orthogonal coordinate system whose X axis is a horizontal axis in a front-back direction of the mobile object 101, whose Z axis is a vertical direction of the mobile object 101, and whose Y axis is a direction (right-left direction of the mobile object 101) orthogonal to the X axis and the Z axis is used as an example, for the sake of clarity.

A floor reaction force (hereafter referred to as an i-th leg floor reaction force or a leg floor reaction force) acting on the i-th leg link 103_$i$ (i=1, 2, ..., N) from the floor surface is denoted by ↑FM_i, a translational floor reaction force which is a translational force vector of ↑FM_i is denoted by ↑F_i, and a floor reaction force moment which is a moment vector of ↑FM_i is denoted by ↑M_i.

Here, the translational floor reaction force ↑F_i and the floor reaction force moment ↑M_i are each expressed as a three-component column vector in the inertial coordinate system, as in the case of the total floor reaction force ↑FMt. The i-th leg floor reaction force ↑FM_i is expressed as a six-component column vector (=[↑F_i, ↑M_i]$^T$) formed by arranging the components of ↑F_i and ↑M_i. An acting point P_i of the i-th leg floor reaction force ↑FM_i is a point on the floor surface within a ground surface of the i-th leg link 103_$i$ (i.e. within a contact surface between the distal end of the i-th leg link 103_$i$ and the floor surface).

Though the acting point P_i of the i-th leg floor reaction force ↑FM_i does not exist in the case where the i-th leg link 103_$i$ is not grounded (in the case where ↑FM_i is a zero vector), the acting point P_i is assumed to be an arbitrarily set point (e.g. a representative point of the distal end of the i-th leg link 103_$i$), for convenience's sake.

A relation between the total floor reaction force ↑FMt and the leg floor reaction force ↑FM_i (i=1, 2, ..., N) is typically given by the following equation (1).

$$\uparrow FMt = \sum_{i=1}^{N} AA\_i \cdot \uparrow FM\_i \qquad (1)$$
$$= AA\_1 \cdot \uparrow FM\_1 + AA\_2 \cdot \uparrow FM\_2 + \ldots +$$
$$AA\_N \cdot \uparrow FM\_N$$

-continued where $$\uparrow FMt = \begin{bmatrix} \uparrow Ft \\ \uparrow Mt \end{bmatrix}$$

$$\uparrow FM\_i = \begin{bmatrix} \uparrow F\_i \\ \uparrow M\_i \end{bmatrix} (i = 1, 2, \ldots, N)$$

AA_i (i=1, 2, ..., N) is a matrix defined by $$AA\_i \equiv \begin{bmatrix} I & 0 \\ VV\_i & I \end{bmatrix}$$

VV_i (i=1, 2, ..., N) is a matrix such that VV_i·↑F_i=↑V_i×↑F_i, and

↑V_i (i=1, 2, ..., N) is a position vector of the acting point P_i of the i-th leg floor reaction force ↑FM_i relative to the acting point Pt of the total floor reaction force ↑FMt.

In the where clause of the equation (1), the components "I" and "0" of the matrix AA_i are respectively a unit matrix and a zero matrix, and "×" is an arithmetic sign representing an outer product (vector product).

Here, suppose a floor reaction force ↑ΔFM_i (=[↑ΔF_i, ↑ΔM_i]$^T$) for perturbation is added to the acting point P_i of the i-th leg floor reaction force ↑FM_i, thereby adding a floor reaction force ↑ΔFMt (=[↑ΔFt, ↑ΔMt]$^T$) for perturbation to the acting point Pt of the total floor reaction force ↑FMt. Note that adding the floor reaction force ↑ΔFM_i for perturbation to the acting point P_i means that the floor reaction force acting at the acting point P_i is changed from ↑FM_i to ↑FM_i+↑ΔFM_i. Likewise, adding the floor reaction force ↑ΔFMt for perturbation to the acting point Pt means that the floor reaction force acting at the acting point Pt is changed from ↑FMt to ↑FMt+↑ΔFMt.

Hereafter, ↑ΔFM_i is referred to as an i-th leg perturbation floor reaction force, and a translational force vector ↑ΔF_i and a moment vector ↑ΔM_i of ↑ΔFM_i are respectively referred to as an i-th leg perturbation translational floor reaction force and an i-th leg perturbation floor reaction force moment. In addition, ↑ΔFMt is referred to as a perturbation total floor reaction force, and a translational force vector ↑ΔFt and a moment vector ↑ΔMt of ↑ΔFMt are respectively referred to as a perturbation total translational floor reaction force and a perturbation total floor reaction force moment.

A relation between the perturbation total floor reaction force ↑ΔFMt and the i-th leg perturbation floor reaction force ↑ΔFM_i (i=1, 2, ..., N) is given by the following equation (2) based on the equation (1).

$$\uparrow \Delta FMt = \sum_{i=1}^{N} AA\_i \cdot \uparrow \Delta FM\_i \qquad (2)$$
$$= AA\_1 \cdot \uparrow \Delta FM\_1 + AA\_2 \cdot \uparrow \Delta FM\_2 + \ldots + AA\_N \cdot \uparrow \Delta FM\_N$$

AA_i (i=1, 2, ..., N) in the equation (2) is the same as that defined in the where clause of the equation (1).

It is assumed that the i-th leg perturbation floor reaction force ↑ΔFM_i is generated by spring displacements of the position and posture of the ground surface (hereafter referred to as an i-th leg ground surface) of the i-th leg link 103_i. In more detail, it is assumed that the i-th leg perturbation translational floor reaction force ↑ΔF_i is generated by the spring displacement (translational displacement) of the position of the i-th leg ground surface, and the i-th leg perturbation floor reaction force moment ↑ΔM_i is generated by the spring displacement (rotational displacement) of the posture of the i-th leg ground surface.

The spring displacements of the position and posture of the i-th leg ground surface respectively correspond to a translational displacement and a rotational displacement by an elastic deformation of the floor in the i-th leg ground surface or an elastic deformation of the distal end of the i-th leg link 103_i.

The amount of displacement of the position (vector of the amount of translational displacement of the i-th leg ground surface in the directions of the three axes, hereafter referred to as a spring translational displacement amount) and the amount of displacement of the posture (vector of the amount of rotational displacement of the i-th leg ground surface about the three axes, hereafter referred to as a spring rotational displacement amount) of the i-th leg ground surface by the spring displacements are respectively denoted by ↑Xorg_i and ↑Xrot_i. A relation between ↑Xorg_i and ↑ΔF_i and a relation between ↑Xrot_i and ↑ΔM_i are respectively given by the following equations (3) and (4).

$$\uparrow \Delta F\_i = Korg\_i \cdot \uparrow Xorg\_i \qquad (3)$$

$$\uparrow \Delta M\_i = Krot\_i \cdot \uparrow Xrot\_i \qquad (4)$$

Korg_i in the equation (3) is a three-dimensional diagonal matrix (hereafter referred to as a translational spring constant matrix Korg_i) whose diagonal components are spring constants of the components of the spring translational displacement amount ↑Xorg_i of the i-th leg ground surface. Krot_i in the equation (4) is a three-dimensional diagonal matrix (hereafter referred to as a rotational spring constant matrix Krot_i) whose diagonal components are spring constants of the components of the spring rotational displacement amount ↑Xrot_i of the i-th leg ground surface.

Moreover, a representative contact surface is supposed to be a single virtual contact surface representative of all contact surfaces between the mobile object 101 and the floor surface (ground surfaces of all leg links 103 which are grounded). It is assumed that the total floor reaction force ↑FMt acts on the mobile object 101 in this representative contact surface. The representative contact surface mentioned here corresponds to a supporting polygon.

It is also assumed that the perturbation total floor reaction force ↑ΔFMt is generated by spring displacements of the position and posture of the representative contact surface, as in the case of the i-th leg ground surface. In more detail, it is assumed that the perturbation total translational floor reaction force ↑ΔFt is generated by the spring displacement (translational displacement) of the position of the representative contact surface, and the perturbation total floor reaction force moment ↑ΔMt is generated by the spring displacement (rotational displacement) of the posture of the representative contact surface.

The spring translational displacement amount of the position (vector of the amount of translational displacement in the directions of the three axes by the spring displacement) and the spring rotational displacement amount of the posture (vector of the amount of rotational displacement about the three axes by the spring displacement) of the representative contact surface are respectively denoted by ↑Xc_org and ↑Xc_rot. A relation between ↑Xc_org and ↑ΔFt and a relation between ↑Xc_rot and ↑ΔMt are respectively given by the following equations (5) and (6).

$$↑ΔFt = Kc\_org \cdot ↑Xc\_org \quad (5)$$

$$↑ΔMt = Kc\_rot \cdot ↑Xc\_rot \quad (6)$$

Kc_org in the equation (5) is a three-dimensional diagonal matrix (hereafter referred to as a translational spring constant matrix Kc_org) whose diagonal components are spring constants of the components of the spring translational displacement amount ↑Xc_org of the representative contact surface. Kc_rot in the equation (6) is a three-dimensional diagonal matrix (hereafter referred to as a rotational spring constant matrix Kc_rot) whose diagonal components are spring constants of the components of the spring rotational displacement amount ↑Xc_rot of the representative contact surface.

In a state where only one leg link 103_i of the mobile object 101 is grounded, the representative contact surface matches the ground surface (i-th leg ground surface) of this single leg link 103_i. In such a state, the spring displacements of the position and posture of the representative contact surface are the same as spring displacements of the position and posture of the i-th leg ground surface. The spring displacements respectively correspond to a translational displacement and a rotational displacement by an elastic deformation of the floor in the i-th leg ground surface or an elastic deformation of the distal end of the i-th leg link 103_i.

In a state where two or more leg links 103 of the mobile object 101 are grounded, on the other hand, the representative contact surface serves as a ground surface of a single virtual ground portion that combines ground portions of all leg links 103 which are grounded. In such a state, the spring displacements of the position and posture of the representative contact surface respectively correspond to a translational displacement and a rotational displacement by an elastic deformation of the floor in the ground surface of the virtual ground portion or an elastic deformation of the virtual ground portion.

The following equation (7) is derived from the equation (2), with regard to the perturbation total translational floor reaction force ↑ΔFt that is added to the acting point Pt of the total floor reaction force ↑FMt by adding the i-th leg perturbation translational floor reaction force ↑ΔF_i to the acting point P_i of each i-th leg floor reaction force ↑FM_i (i=1, 2, ..., N).

$$↑ΔFt = ↑ΔF\_1 + ↑ΔF\_2 + \ldots + ↑ΔF\_N \quad (7)$$

From the equations (3), (5), and (7), the following equation (8) is obtained.

$$Kc\_org \cdot ↑Xc\_org = Korg\_1 \cdot ↑Xorg\_1 + Korg\_2 \cdot ↑Xorg\_2 + \ldots + Korg\_N \cdot ↑Xorg\_N \quad (8)$$

The acting point Pt of the total floor reaction force ↑FMt before the addition of the perturbation total floor reaction force ↑ΔFMt is assumed to be a total floor reaction force central point (COP), and the acting point P_i of the i-th leg floor reaction force ↑FM_i before the addition of the i-th leg perturbation floor reaction force ↑ΔFM_i is assumed to be a floor reaction force central point of the i-th leg ground surface. A relation between a position vector (denoted by ↑Pt) of the acting point Pt and a position vector (denoted by ↑P_i) of each acting point P_i (i=1, 2, ..., N) relative to an arbitrary reference point is given by the following equation (9).

Note that the total floor reaction force central point is the acting point of the total floor reaction force ↑FMt, where the horizontal component (component about the horizontal axis) of the total floor reaction force moment ↑Mt about the total floor reaction force central point is zero. Likewise, the floor reaction force central point of the i-th leg ground surface is the acting point of the i-th leg floor reaction force ↑FM_i, where the horizontal component (component about the horizontal axis) of the floor reaction force moment ↑M_i about the floor reaction force central point is zero.

$$↑Pt = r\_1 \cdot ↑P\_1 + r\_2 \cdot ↑P\_2 + \ldots + r\_N \cdot ↑P\_N \quad (9)$$

In the equation (9), r_i (i=1, 2, ..., N) is a weight coefficient defined by r_i=Fn_i/Fnt. Fn_i (i=1, 2, ..., N) is an absolute value of a normal force component (hereafter referred to as a floor surface normal force component), perpendicular to the floor surface, of the i-th leg translational floor reaction force ↑F_i, and Fnt is an absolute value of a normal force component (floor surface normal force component), perpendicular to the floor surface, of the total translational floor reaction force ↑Ft, where Fnt=Fn_1+Fn_2+...+Fn_N. Accordingly, the weight coefficient r_i is a ratio of the floor surface normal force component Fn_i of the i-th leg translational floor reaction force ↑F_i to the floor surface normal force component Fnt of the total translational floor reaction force ↑Ft, where 0≦r_i≦1.

In this specification, it is assumed that Fn_i and Fnt match or substantially match the vertical component (Z-axis component) of ↑F_i and the vertical component (Z-axis component) of ↑Ft, respectively.

The same relation as the equation (9) is assumed to hold between the spring translational displacement amount ↑Xc_org of the position of the representative contact surface and the spring translational displacement amount ↑Xorg_i of the position of the i-th leg ground surface, too. That is, the following equation (10) is assumed to hold.

$$↑Xc\_org = r\_1 \cdot ↑Xorg\_1 + r\_2 \cdot ↑Xorg\_2 + \ldots + r\_N \cdot ↑Xorg\_N \quad (10)$$

The following equation (11) is derived from the equations (8) and (10).

$$Korg\_i = r\_i \cdot Kc\_org \quad (11)$$

In the present invention, the equation (10) is used as a basic equation representing the relation between the spring translational displacement amount ↑Xc_org of the representative contact surface and the spring translational displacement amount ↑Xorg_i of the i-th leg ground surface (i=1, 2, ..., N), and the equation (11) is used as a basic equation representing the relation between the translational spring constant matrix Kc_org of the representative contact surface and the translational spring constant matrix Korg_i of the i-th leg ground surface (i=1, 2, ..., N).

Thus, each diagonal component (spring constant relating to the translational displacement in each of the directions of the three axes) of the translational spring constant matrix Korg_i of the i-th leg ground surface is proportional to the weight coefficient r_i. When the weight coefficient r_i is larger (closer to "1"), i.e. when the ratio of the floor surface normal force component Fn_i of the i-th leg translational floor reaction force ↑F_i to the floor surface normal force component Fnt of the total translational floor reaction force ↑Ft is higher, each diagonal component of the translational spring constant matrix Korg_i of the i-th leg ground surface is larger. In other words, when the ratio of Fn_i to Fnt is higher, the sensitivity of change of the spring translational displacement amount ↑Xorg_i of the i-th leg ground surface to the required i-th leg perturbation translational floor reaction force is higher.

In a state where only one i-th leg link 103_i is grounded (r_i=1), the i-th leg ground surface and the representative contact surface match each other, so that the translational spring constant matrix Korg_i of the i-th leg ground surface and the translational spring constant matrix Kc_org of the representative contact surface match each other. Moreover, since ↑ΔF_i=↑ΔFt, the spring translational displacement amount ↑Xorg_i of the i-th leg ground surface and the spring translational displacement amount ↑Xc_org of the representative contact surface match each other.

In a state where two or more leg links 103 are grounded, on the other hand, the spring translational displacement amount ↑Xc_org of the representative contact surface is a weighted mean value (weighted mean value with r_i as the weight coefficient) of the spring translational displacement amounts ↑Xorg_i of the i-th leg ground surfaces corresponding to the leg links 103_i other than all ungrounded leg links.

The following equation (12) is derived from the equation (2), with regard to the perturbation total floor reaction force moment ↑ΔMt that is added to the acting point Pt of the total floor reaction force ↑FMt by adding the i-th leg perturbation floor reaction force moment ↑ΔM_i to the acting point P_i of each i-th leg floor reaction force ↑FM_i (i=1, 2, . . . , N) in a state where the respective translational floor reaction forces ↑F_1 to ↑F_N of the first to N-th leg floor reaction forces ↑FM_1 to ↑FM_N are fixed.

$$\uparrow \Delta Mt = \uparrow \Delta M\_1 + \uparrow \Delta M\_2 + \ldots + \uparrow \Delta M\_N \quad (12)$$

From the equations (4), (6), and (12), the following equation (13) is obtained.

$$Kc\_rot \cdot \uparrow Xc\_rot = Krot\_1 \cdot \uparrow Xrot\_1 + Krot\_2 \cdot \uparrow Xrot\_2 + \ldots + Krot\_N \cdot \uparrow Xrot\_N \quad (13)$$

In the case where the acting point P_i of the i-th leg floor reaction force ↑FM_i matches the floor reaction force central point of the i-th leg ground surface, adding the i-th leg perturbation floor reaction force moment ↑ΔM_i to the acting point P_i (floor reaction force central point) of the i-th leg floor reaction force ↑FM_i in a state where the respective translational floor reaction forces ↑F_1 to ↑F_N of the first to N-th leg floor reaction forces ↑FM_1 to ↑FM_N are fixed is equivalent to shifting the horizontal position of the floor reaction force central point in the i-th leg ground surface from the point P_i.

Likewise, in the case where the acting point Pt of the total floor reaction force ↑FMt matches the total floor reaction force central point (COP), adding the perturbation total floor reaction force moment ↑ΔMt to the acting point Pt of the total floor reaction force ↑FMt is equivalent to shifting the horizontal position of the total floor reaction force central point from the point Pt.

This being the case, when the amount of displacement (two-component displacement amount vector) of the horizontal position of the floor reaction force central point in the i-th leg ground surface is denoted by ↑ΔRpt_i and the amount of displacement (two-component displacement amount vector) of the horizontal position of the total floor reaction force central point is denoted by ↑ΔCOP, the component about the horizontal axis (component about the X axis and the Y axis) of ↑ΔCOP·Fnt≈↑ΔMt and the component about the horizontal axis (component about the X axis and the Y axis) of ↑ΔRpt_i·Fn_i≈↑ΔM_i are obtained. Therefore, the following equation (14) is derived from the equation (12).

$$\uparrow \Delta COP = r\_1 \cdot \uparrow \Delta Rpt\_1 + r\_2 \cdot \uparrow \Delta Rpt\_2 + \ldots + r\_N \cdot \uparrow \Delta Rpt\_N \quad (14)$$

In the equation (14), r_i (i=1, 2, . . . , N) is the above-mentioned weight coefficient r_i (=Fn_i/Fnt).

Since the first to N-th leg ground surfaces are portions on the common floor surface, in the case where the same floor surface normal force component Fn_i acts on each of the first to N-th leg ground surfaces, the same relation between the perturbation floor reaction force moment (=↑ΔRpt_i·Fn_i) corresponding to the displacement amount ↑ΔRpt_i of the horizontal position of the floor reaction force central point of the i-th leg ground surface and the component about the horizontal axis in the rotational displacement amount ↑Xrot_i by the spring displacement of the i-th leg ground surface holds for every i-th leg ground surface.

This indicates that the following equation (15) holds in the case where the same floor surface normal force component Fn_i (denoted by Fna) acts on each of the first to N-th leg ground surfaces.

$$\uparrow \Delta Rpt\_i \cdot Fna = Krot \cdot \uparrow Xrot\_i\_xy \quad (15)$$

where ↑Xrot_i_xy is the component about the horizontal axis (component about the X axis and the Y axis) in the spring rotational displacement amount ↑Xrot_i of the i-th leg ground surface, and Krot is a two-dimensional diagonal matrix (spring constant matrix relating to the rotation about the X axis and the Y axis).

Given that the equation (15) equally holds for the representative contact surface, the following equation (16) is obtained.

$$\uparrow \Delta COP \cdot Fna = Krot \cdot \uparrow Xc\_rot\_xy \quad (16)$$

where ↑Xc_rot_xy is the component about the horizontal axis (component about the X axis and the Y axis) in the spring rotational displacement amount ↑Xc_rot of the representative contact surface.

From the equations (14) to (16), the following equation (17) is obtained.

$$Krot \cdot \uparrow Xc\_rot\_xy = r\_1 \cdot Krot \cdot \uparrow Xrot\_1\_xy + r\_2 \cdot Krot \cdot \uparrow Xrot\_2\_xy + \ldots + r\_N \cdot Krot \cdot \uparrow Xrot\_N\_xy \quad (17)$$

From the equation (17), the following equation (18) is obtained.

$$\uparrow Xc\_rot\_xy = r\_1 \cdot \uparrow Xrot\_1\_xy + r\_2 \cdot \uparrow Xrot\_2\_xy + \ldots + r\_N \cdot \uparrow Xrot\_N\_xy \quad (18)$$

In the present invention, it is assumed that the same relation as the equation (18) holds for all components (three components) between the spring rotational displacement amount ↑Xc_rot of the representative contact surface and the spring rotational displacement amount ↑Xrot_i of the i-th leg ground surface. That is, the following equation (19) is assumed to hold.

$$\uparrow Xc\_rot = r\_1 \cdot \uparrow Xrot\_1 + r\_2 \cdot \uparrow Xrot\_2 + \ldots + r\_N \cdot \uparrow Xrot\_N \quad (19)$$

The following equation (20) is derived from the equations (13) and (19).

$$Krot\_i = r\_i \cdot Kc\_rot \quad (20)$$

In the present invention, the equation (19) is used as a basic equation representing the relation between the spring rotational displacement amount ↑Xc_rot of the representative contact surface and the spring rotational displacement amount ↑Xrot_i of the i-th leg ground surface (i=1, 2, . . . , N), and the equation (20) is used as a basic equation representing the relation between the rotational spring constant matrix Kc_rot of the representative contact surface and the rotational spring constant matrix Krot_i of the i-th leg ground surface (i=1, 2, . . . , N).

Thus, each diagonal component (spring constant relating to the rotational displacement about each of the three axes) of the rotational spring constant matrix Krot_i of the i-th leg ground surface is proportional to the weight coefficient r_i. When the weight coefficient r_i is larger (closer to "1"), i.e.

when the ratio of the floor surface normal force component Fn_i of the i-th leg translational floor reaction force ↑F_i to the floor surface normal force component Fnt of the total translational floor reaction force ↑Ft is higher, each diagonal component of the rotational spring constant matrix Krot_i of the i-th leg ground surface is larger. In other words, when the ratio of Fn_i to Fnt is higher, the sensitivity of change of the spring rotational displacement amount ↑Xrot_i of the i-th leg ground surface to the required i-th leg perturbation floor reaction force moment is higher.

In a state where only one i-th leg link 103_i is grounded (r_i=1), the i-th leg ground surface and the representative contact surface match each other, so that the rotational spring constant matrix Krot_i of the i-th leg ground surface and the rotational spring constant matrix Kc_rot of the representative contact surface match each other. Moreover, since ↑ΔM_i=↑ΔMt, the spring rotational displacement amount ↑Xrot_i of the i-th leg ground surface and the spring rotational displacement amount ↑Xc_rot of the representative contact surface match each other.

In a state where two or more leg links 103 are grounded, on the other hand, the spring rotational displacement amount ↑Xc_rot of the representative contact surface is a weighted mean value (weighted mean value with r_i as the weight coefficient) of the spring rotational displacement amounts ↑Xrot_i of the i-th leg ground surfaces corresponding to the leg links 103_i other than all ungrounded leg links.

Next, applying the equations (3) to (6) to the equation (2) and further applying the equations (11) and (20) yields the following equation (21).

$$\begin{bmatrix} Kc\_org & 0 \\ 0 & Kc\_rot \end{bmatrix} \cdot \begin{bmatrix} \uparrow Xc\_org \\ \uparrow Xc\_rot \end{bmatrix} = \sum_{i=1}^{N} \left( r\_i \cdot \begin{bmatrix} Kc\_org & 0 \\ Kc\_org \cdot VV\_i & Kc\_rot \end{bmatrix} \cdot \begin{bmatrix} \uparrow Xorg\_i \\ \uparrow Xrot\_i \end{bmatrix} \right) \quad (21)$$

The equations (11) and (20) are based on the premise that the acting point Pt of the total floor reaction force ↑FMt is the total floor reaction force central point and the acting point P_i of the i-th leg floor reaction force ↑FM_i is the floor reaction force central point of the i-th leg ground surface. Let ↑V_i be the position vector of the floor reaction force central point of the i-th leg ground surface relative to the acting point Pt as the total floor reaction force central point. Then, VV_i (i=1, 2, ..., N) in the equation (21) is a matrix defined as follows.

VV_i: matrix such that VV_i·↑F_i=V_i×↑F_i where ↑V_i is the position vector of the floor reaction force central point of the i-th leg ground surface relative to the total floor reaction force central point.

In more detail, the total floor reaction force central point is the total floor reaction force central point corresponding to the total floor reaction force ↑FMt before the addition of the perturbation total floor reaction force ↑ΔFMt, and the floor reaction force central point of the i-th leg ground surface is the floor reaction force central point corresponding to the i-th leg floor reaction force ↑FM_i before the addition of the i-th leg perturbation floor reaction force ↑ΔFM_i.

The following equation (22) is derived from the equation (21).

$$\begin{bmatrix} \uparrow Xc\_org \\ \uparrow Xc\_rot \end{bmatrix} = \sum_{i=1}^{N} \left( r\_i \cdot A\_i \cdot \begin{bmatrix} \uparrow Xorg\_i \\ \uparrow Xrot\_i \end{bmatrix} \right) \quad (22)$$

where $$A\_i \equiv \begin{bmatrix} I & 0 \\ Rk \cdot VV\_i & I \end{bmatrix}$$

$$Rk \equiv Kc\_rot^{-1} \cdot Kc\_org$$

Let ↑q1 be a generalized variable vector whose components are the position (position in the directions of the three axes) and posture (posture angle about the three axes) of the body 102 of the mobile object 101 and the amount of displacement of each joint of the mobile object 101, ↑Xc be a displacement amount vector (=[↑Xc_org, ↑Xc_rot]$^T$) composed of the spring translational displacement amount ↑Xc_org of the position of the representative contact surface and the spring rotational displacement amount ↑Xc_rot of the posture of the representative contact surface, and ↑X_i be a displacement amount vector (=[↑Xorg_i, ↑Xrot_i]$^T$) composed of the spring translational displacement amount ↑Xorg_i of the position of the i-th leg ground surface and the spring rotational displacement amount ↑Xrot_i of the posture of the i-th leg ground surface. Hereafter, ↑Xc is referred to as a spring translational/rotational displacement amount of the representative contact surface, and ↑X_i is referred to as a spring translational/rotational displacement amount of the i-th leg ground surface. In more detail, the generalized variable vector ↑q1 is a column vector formed by arranging the six components of the position and posture of the body 102 and the amount of displacement of each joint of the mobile object 101.

When the spring translational/rotational displacement amount ↑Xc of the representative contact surface is regarded as the amount of displacement (temporal change rate) of the position and posture of the representative contact surface per unit time, a Jacobian matrix representing a relation between the amount of displacement of the position and posture of the representative contact surface per unit time and the amount of change (temporal change rate) ↑Δq1 of the generalized variable vector ↑q1 per unit time is expressed as a matrix Jc that represents the relation between ↑Xc and ↑Δq1 by the following equation (23). Here, ↑Δq1 is a column vector formed by arranging the change amounts of the components of the generalized variable vector ↑q1 per unit time.

$$\uparrow Xc = Jc \cdot \uparrow \Delta q1 \quad (23)$$

Likewise, when the spring translational/rotational displacement amount ↑X_i of the i-th leg ground surface is regarded as the amount of displacement (temporal change rate) of the position and posture of the i-th leg ground surface per unit time, a Jacobian matrix representing a relation between the amount of displacement of the position and posture of the i-th leg ground surface per unit time and the amount of change (temporal change rate) ↑Δq1 of the generalized variable vector ↑q1 per unit time is expressed as a matrix J_i that represents the relation between ↑X_i and ↑Δq1 by the following equation (24).

$$\uparrow X\_i = J\_i \cdot \uparrow \Delta q1 \quad (24)$$

Let Jc_org be a Jacobian matrix representing a relation between the amount of displacement of the position of the representative contact surface per unit time and ↑Δq1 (i.e. matrix representing the relation between ↑Xc_org and ↑Δq1 by the following equation (25a)), and Jc_rot be a Jacobian matrix representing a relation between the amount of displacement of the posture of the representative contact surface per unit time and ↑Δq1 (i.e. matrix representing the relation between ΔXc_rot and ↑Δq1 by the following equation (25b)). Then, Jc=[Jc_org, Jc_rot]$^T$, as shown in the equation (25c).

$$↑Xc\_org = Jc\_org · ↑Δq1 \quad (25a)$$

$$↑Xc\_rot = Jc\_rot · ↑Δq1 \quad (25b)$$

$$Jc = [Jc\_org, Jc\_rot]^T \quad (25c)$$

Likewise, let Jorg_i be a Jacobian matrix representing a relation between the amount of displacement of the position of the i-th leg ground surface per unit time and ↑Δq1 (i.e. matrix representing the relation between ↑Xorg_i and ↑Δq1 by the following equation (26a)), and Jrot_i be a Jacobian matrix representing a relation between the amount of displacement of the posture of the i-th leg ground surface per unit time and ↑Δq1 (i.e. matrix representing the relation between ↑Xrot_i and ↑Δq1 by the following equation (26b)). Then, J_i=[Jorg_i, Jrot_i]$^T$, as shown by the equation (26c).

$$↑Xorg\_i = Jorg\_i · ↑Δq1 \quad (26a)$$

$$↑Xrot\_i = Jrot\_i · ↑Δq1 \quad (26b)$$

$$J\_i = [Jorg\_i, Jrot\_i]^T \quad (26c)$$

Differentiating both sides of the equation (22) and applying the equations (23) and (24) yields the following equation (27).

$$Jc = \sum_{i=1}^{N} (r\_i · A\_i · J\_i) \quad (27)$$
$$= r\_1 · A\_1 · J\_1 + r\_2 · A\_2 · J\_2 + ... +$$
$$r\_N · A\_N · A\_N · J\_N$$

Thus, the Jacobian matrix Jc (hereafter referred to as a representative contact surface Jacobian matrix Jc) relating to the displacement of the position and posture of the representative contact surface can be determined from the Jacobian matrix J_i (i=1, 2, ..., N) relating to the displacement of the position and posture of each leg ground surface, according to the equation (27).

Since the position and posture of the i-th leg ground surface are the position and posture of the distal end of the i-th leg link 103_i, the Jacobian matrix J_i (hereafter referred to as a leg link Jacobian matrix J_i) is a Jacobian matrix representing a relation between the amount of change of the position and posture of the distal end of the i-th leg link 103_i per unit time and ↑Δq1. Such a Jacobian matrix J_i can be specified based on an observed value of an actual displacement amount of each joint of the mobile object 101 and its temporal change rate.

Once each leg link Jacobian matrix J_i (i=1, 2, ..., N) is specified in this way, the representative contact surface Jacobian matrix Jc can be determined using J_i according to the equation (27).

When the perturbation total floor reaction force ↑ΔFMt of a certain value is given as a required manipulation amount for realizing a required state of the mobile object 101, ↑ΔFMt can be converted to a required value of the spring translational/rotational displacement amount ↑Xc (=[↑Xc_org, ↑Xc_rot]$^T$) of the representative contact surface, according to the equations (5) and (6). This conversion is given by the following equation (28).

$$↑Xc = \begin{bmatrix} ↑Xc\_org \\ ↑Xc\_rot \end{bmatrix} \quad (28)$$
$$= \begin{bmatrix} Kc\_org^{-1} & 0 \\ 0 & Kc\_rot^{-1} \end{bmatrix} · ↑ΔFMt$$
$$= \begin{bmatrix} Kc\_org^{-1} & 0 \\ 0 & Kc\_rot^{-1} \end{bmatrix} · \begin{bmatrix} ↑ΔFt \\ ↑ΔMt \end{bmatrix}$$

Let Jc$^{-1}$ be a pseudo inverse matrix of the representative contact surface Jacobian matrix Jc. The amount of correction of the displacement amount of each joint of the mobile object 101 for realizing the required value of the perturbation total floor reaction force ↑ΔFMt can be determined from the required value of the spring translational/rotational displacement amount ↑Xc of the representative contact surface, according to the following equation (29).

$$↑Δq1 = Jc^{-1} · ↑Xc \quad (29)$$

Hence, when the required value of the perturbation total floor reaction force ↑ΔFMt is given as the required manipulation amount for controlling the total floor reaction force acting on the mobile object 101 in an arbitrary motion state of the mobile object 101, the representative contact surface Jacobian matrix Jc is calculated according to the equation (27), and the pseudo inverse matrix Jc$^{-1}$ of Jc is determined. The displacement amount vector ↑Xc of the representative contact surface corresponding to the required value of ↑ΔFMt is then calculated according to the equation (28). From ↑Xc and Jc$^{-1}$, the amount of correction of the displacement amount of each joint for realizing the required value of the perturbation total floor reaction force ↑ΔFMt can be determined according to the equation (29).

Therefore, the displacement amount of each joint can be collectively determined without determining the amount of correction of the position and posture of the distal end of each leg link 103_i individually.

The above describes a first technical matter on which the present invention is based.

Next, suppose the required value of the perturbation total floor reaction force ↑ΔFMt is determined so that the total floor reaction force actually acting on the mobile object 101 follows the desired total floor reaction force for realizing the desired motion of the mobile object 101. It is assumed here that the required value of ↑ΔFMt is determined by integrating an error between the observed value of the actual total floor reaction force and the desired total floor reaction force or by combining at least an integral term obtained by integrating the error and a proportional term proportional to the error.

The integral (hereafter denoted by ↑ΔFMt_int) of the error between the observed value of the actual total floor reaction force and the desired total floor reaction force is related to a steady-state difference between the position and posture of the supposed floor surface supposed in the desired motion of the mobile object 101 and the position and posture of the actual floor surface. This suggests that ↑Xc calculated by converting the integral ↑ΔFMt_int of the error according to the equation (28), i.e. ↑Xc_int calculated from ↑ΔFMt_int according to the following equation (28-1), corresponds to the steady-state error between the position and posture of the supposed floor surface and the position and posture of the actual floor surface.

$$\uparrow Xc\_int = \begin{bmatrix} \uparrow Xc\_org\_int \\ \uparrow Xc\_rot\_int \end{bmatrix} \quad (28\text{-}1)$$

$$= \begin{bmatrix} Kc\_org^{-1} & 0 \\ 0 & Kc\_rot^{-1} \end{bmatrix} \cdot \uparrow \Delta FMt\_int$$

$$= \begin{bmatrix} Kc\_org^{-1} & 0 \\ 0 & Kc\_rot^{-1} \end{bmatrix} \cdot \begin{bmatrix} \uparrow \Delta Ft\_int \\ \uparrow \Delta Mt\_int \end{bmatrix}$$

In the equation (28-1), a translational displacement amount component and a rotational displacement amount component of ↑Xc_int are respectively denoted by ↑Xc_org_int and ↑Xc_rot_int, and a translational force component and a moment component of ↑ΔFMt_int are respectively denoted by ↑ΔFt_int and ↑ΔMt_int.

Therefore, the position and posture of the actual floor surface can be estimated by correcting the position and posture of the supposed floor surface by ↑Xc_int.

The above describes a second technical matter on which the present invention is based.

The following describes the present invention (invention relating to a mobile object capable of moving on a floor surface) on the basis of the above description.

The present invention is a mobile object controller which performs motion control of a mobile object according to a desired motion of the mobile object and a desired total floor reaction force which is a desired value of a total floor reaction force to be applied to the mobile object to realize the desired motion, the mobile object including a body, a plurality of leg links connected to the body, and a joint actuator which drives a joint of each leg link, and moving on a floor surface by movements of the plurality of leg links, the mobile object controller comprising: a total floor reaction force required correction amount determination element configured to determine a total floor reaction force required correction amount according to an error between an observed value of the total floor reaction force actually acting on the mobile object and the desired total floor reaction force, the total floor reaction force required correction amount being a required correction amount of the total floor reaction force to be additionally applied to the mobile object so that the error approaches zero; a representative contact surface position/posture displacement amount calculation element configured to calculate, from the determined total floor reaction force required correction amount and a predetermined spring constant of a representative contact surface, a required displacement amount of a position and posture of the representative contact surface corresponding to the total floor reaction force required correction amount based on an assumption that the total floor reaction force required correction amount is generated by a spring displacement of the position and posture of the representative contact surface, the representative contact surface being a single virtual contact surface representative of all contact surfaces between the mobile object and the floor surface; a representative contact surface Jacobian matrix calculation element configured to calculate a representative contact surface Jacobian matrix Jc according to the equation (27) from a leg link Jacobian matrix J_i for each leg link, the spring constant, a relative position of an actual floor reaction force central point of a distal end of each leg link relative to a total floor reaction force central point, and a floor reaction force actually acting on each leg link, the representative contact surface Jacobian matrix Jc being a Jacobian matrix representing a relation between a temporal change rate of the position and posture of the representative contact surface and a temporal change rate of a generalized variable vector whose components are a position and posture of the body and a displacement amount of each joint of the mobile object, the leg link Jacobian matrix J_i being a Jacobian matrix representing a relation between a temporal change rate of a position of a distal end of the leg link or a temporal change rate of a position and posture of the distal end of the leg link and the temporal change rate of the generalized variable vector, and the total floor reaction force central point being an acting point of the total floor reaction force actually acting on the mobile object; a joint displacement correction amount determination element configured to determine a joint displacement correction amount by multiplying the calculated required displacement amount of the position and posture of the representative contact surface by a pseudo inverse matrix $Jc^{-1}$ of the calculated representative contact surface Jacobian matrix Jc, the joint displacement correction amount being a correction amount of the displacement amount of each joint of the mobile object for realizing the required displacement amount of the position and posture of the representative contact surface; and a joint displacement control element configured to control the joint actuator according to a corrected desired joint displacement amount obtained by correcting a desired joint displacement amount by the determined joint displacement correction amount, the desired joint displacement amount being the displacement amount of each joint of the mobile object defined by the desired motion of the mobile object (first invention).

The equation (27) and the meanings of the variables of the equation (27) are as follows.

$$Jc = \sum_{i=1}^{N} (r\_i \cdot A\_i \cdot J\_i) \quad (27)$$

where
Jc is the representative contact surface Jacobian matrix,
i is an identification number of a leg link,
N is a total number of leg links,
r_i is a weight coefficient of an i-th leg link determined by the following equation (27-1), $$r\_i = Fn\_i \bigg/ \left( \sum_{j=1}^{N} Fn\_j \right) \quad (27\text{-}1)$$

Fn_i is a normal force component of a floor reaction force acting on the i-th leg link,
A_i is a matrix defined by the following equation (27-2), $$A\_i \equiv \begin{bmatrix} I & 0 \\ Rk \cdot VV\_i & I \end{bmatrix} \quad (27\text{-}2)$$

Rk is a coefficient matrix defined by the following equation (27-3), $$Rk \equiv Kc\_rot^{-1} \cdot Kc\_org \quad (27\text{-}3)$$

Kc_org is a spring constant matrix relating to a translational displacement of the position of the representative contact surface,
Kc_rot is a spring constant matrix relating to a rotational displacement of the posture of the representative contact surface, VV_i is a matrix such that VV_i·↑F_i=↑V_i×↑F_i,
↑F_i is a floor reaction force vector acting on the i-th leg link,
↑V_i is a position vector of a floor reaction force central point of a distal end of the i-th leg link relative to the total floor reaction force central point, and
J_i is the leg link Jacobian matrix.

Note that, in the present invention, "floor surface" is not limited to an ordinary indoor floor surface but may also be a land surface or a road surface outdoors.

According to the first invention, the total floor reaction force required correction amount determination element determines the total floor reaction force required correction amount by which the error between the observed value of the total floor reaction force (hereafter also referred to as an actual total floor reaction force) actually acting on the mobile object and the desired total floor reaction force approaches zero. That is, the total floor reaction force required correction amount is determined as a feedback manipulation amount (control input) by which the actual total floor reaction force follows the desired total floor reaction force. The total floor reaction force required correction amount corresponds to the required value of the perturbation total floor reaction force ↑ΔFMt.

For example, the desired total floor reaction force in the present invention may be generated so as to satisfy a kinetic relation of an appropriate kinetic model for the desired motion of the mobile object, on the supposed floor surface as a model of the actual floor surface.

Alternatively, the desired total floor reaction force may be a result of correcting a reference total floor reaction force, which is generated so as to satisfy the kinetic relation for the desired motion of the mobile object, according to an error between a desired value and an actual value (observed value) of a predetermined state quantity relating to the motion of the mobile object (state quantity such as a position of a specific part (e.g. body) or an overall center of gravity of the mobile object, a posture of a specific part (e.g. body) of the mobile object, or a change rate of such position or posture) so that the error approaches zero.

The representative contact surface position/posture displacement amount calculation element then calculates the required displacement amount of the position and posture of the representative contact surface corresponding to the determined total floor reaction force required correction amount.

Thus, the total floor reaction force required correction amount as the feedback manipulation amount (control input) by which the actual total floor reaction force follows the desired total floor reaction force is converted to the required displacement amount of the position and posture of the representative contact surface as a single virtual surface.

Here, the displacement amount of the position and posture of the representative contact surface corresponds to the spring translational/rotational displacement amount ↑Xc. ↑Xc has the relation of the equation (23) represented by the representative contact surface Jacobian matrix Jc, with the change amount ↑Δq1 of the generalized variable vector ↑q1 per unit time.

Accordingly, by multiplying the required displacement amount of the position and posture of the representative contact surface corresponding to the total floor reaction force required correction amount by the pseudo inverse matrix $Jc^{-1}$ of the representative contact surface Jacobian matrix Jc (i.e. according to the equation (29)), the joint displacement correction amount of the mobile object for realizing the required displacement amount (and realizing the total floor reaction force required correction amount) can be determined.

Hence, in the present invention, the representative contact surface Jacobian matrix calculation element calculates the representative contact surface Jacobian matrix Jc. The representative contact surface Jacobian matrix Jc is calculated according to the equation (27), from each leg link Jacobian matrix J_i (i=1, 2, . . . , N) which is the Jacobian matrix representing the relation between the temporal change rate of the position of the distal end of each leg link or the temporal change rate of the position and posture of the distal end of each leg link and the temporal change rate of the generalized variable vector, the spring constant, the relative position of the actual floor reaction force central point of the distal end of each leg link relative to the total floor reaction force central point as the acting point of the total floor reaction force actually acting on the mobile object, and the value of the floor reaction force actually acting on each leg link.

For example, the value of the floor reaction force actually acting on each leg link, the position of the floor reaction force acting point, and the position of the total floor reaction force acting point used for the calculation of the equation (27) may be observed values obtained by measurement by a force sensor or the like mounted in the mobile object. Alternatively, the value of the floor reaction force and the acting point positions may be approximately estimated or predicted based on the desired total floor reaction force, an appropriate model, and the like, so long as the actual values can be accurately approximated.

Regarding the leg link Jacobian matrix, in the present invention, each leg link may be any of a leg link of a structure where the floor reaction force moment acting on the distal end of the leg link (floor reaction force moment about the acting point on the ground surface of the distal end) can be changed in a state where the distal end is grounded (e.g. a leg link whose distal end is made of a foot that can be changed in posture by an actuator, and contacts the floor surface in a surface contact state) and a leg link of a structure where the floor reaction force moment acting on the distal end cannot be changed (e.g. a leg link whose distal end contacts the floor surface in a point contact state).

In the case where each leg link has the structure where the floor reaction force moment on the distal end can be changed, the leg link Jacobian matrix is a Jacobian matrix representing the relation between the temporal change rate of the position and posture of the distal end of the leg link and the temporal change rate of the generalized variable vector.

In the case where each leg link has the structure where the floor reaction force moment on the distal end cannot be changed, on the other hand, the leg link Jacobian matrix is a Jacobian matrix representing the relation between the temporal change rate of the position of the distal end of the leg link and the temporal change rate of the generalized variable vector.

These leg link Jacobian matrices can be calculated by a known method based on the observed value of the actual displacement amount of each joint of the mobile object.

In the present invention, the joint displacement correction amount determination element determines the joint displacement correction amount, by multiplying the required displacement amount of the position and posture of the representative contact surface by the pseudo inverse matrix $Jc^{-1}$ of the representative contact surface Jacobian matrix Jc calculated as described above. As a result, the joint displacement correction amount for realizing the total floor reaction force required correction amount is determined.

The joint displacement control element then controls the joint actuator according to the corrected desired joint displacement amount obtained by correcting, by the joint displacement correction amount determined as described above, the desired joint displacement amount which is the displacement amount of each joint of the mobile object defined by the desired motion of the mobile object.

Thus, the displacement amount of each joint of the mobile object is controlled so that the actual total floor reaction force follows the desired total floor reaction force, thereby achieving compliance control.

According to the first invention, the total floor reaction force required correction amount is converted to the required displacement amount of the position and posture of the representative contact surface. The joint displacement correction amount of each joint of the mobile object is then calculated according to the required displacement amount. Hence, it is possible to collectively determine the amount of correction (joint displacement correction amount) of the displacement amount of each joint of the mobile object so that the actual total floor reaction force follows the desired total floor reaction force, without executing a process of determining the amount of correction of the position and posture of the distal end of each leg link in consideration of the relation between the correction of the position and posture of the distal end of each individual leg link and the change of the actual total floor reaction force or the interrelation between these factors. As a result, the process of determining the joint displacement correction amount can be efficiently performed in a short time.

Here, the weight coefficient r_i of each leg link in the equation (27) is set so that the leg link whose normal force component of the floor reaction force is larger has a larger weight coefficient (closer to "1"). This means the total floor reaction force required correction amount is shared by each leg link in such a manner that the leg link whose normal force component of the floor reaction force is larger has a larger correction amount. Accordingly, it is possible to determine such a joint displacement correction amount that ensures the total floor reaction force required correction amount without needlessly correcting the position or posture of the distal end of any leg link whose normal force component of the floor reaction force is relatively small.

In addition, since the weight coefficient r_i of each leg link continuously changes, the representative contact surface Jacobian matrix Jc has no discontinuous change. As a result, the displacement amount of each joint of the mobile object can be continuously changed smoothly. This enables the mobile object to move smoothly.

Therefore, according to the first invention, it is possible to perform appropriate motion control of the mobile object so that the total floor reaction force actually acting on the mobile object follows the desired total floor reaction force, with no need for a process of determining the amount of correction of the position and posture of the distal end of each leg link from the desired motion.

In the first invention, for example, the total floor reaction force required correction amount determined by the total floor reaction force required correction amount determination element may be a value proportional to the error, an integral of the error, or the like.

Preferably, the total floor reaction force required correction amount determined by the total floor reaction force required correction amount determination element is a sum total of a proportional term proportional to the error and an integral term obtained by integrating the error (second invention).

The error between the observed value of the total floor reaction force actually acting on the mobile object and the desired total floor reaction force includes a temporary error caused by the actual floor surface's local unevenness or the like which is not included in the supposed floor surface supposed upon generating the desired motion, and a steady-state error caused by a steady-state deviation of the whole position and posture of the actual floor surface from the supposed floor surface. According to the second invention, it is possible to compensate for the temporary error by the proportional term, and also compensate for the steady-state error by the integral term.

The integral of the error corresponds to the steady-state error between the position and posture of the actual floor surface on which the mobile object moves and the position and posture of the supposed floor surface. Through the use of this, a function of estimating the position and posture of the actual floor surface may be added to the first invention.

In detail, the total floor reaction force required correction amount determined by the total floor reaction force required correction amount determination element is a value obtained by integrating the error, and the mobile object controller further comprises a floor surface estimation element configured to estimate a position and posture of an actual floor surface by correcting a position and posture of a supposed floor surface according to the required displacement amount calculated by the representative contact surface position/posture displacement amount calculation element, the supposed floor surface being a floor surface supposed in the desired motion (third invention).

As an alternative, the total floor reaction force required correction amount determined by the total floor reaction force required correction amount determination element is a value obtained by combining at least a proportional term proportional to the error and an integral term obtained by integrating the error, and the mobile object controller further comprises: a representative contact surface steady-state displacement amount calculation element configured to calculate a representative contact surface steady-state displacement amount from the integral term in the total floor reaction force required correction amount and the spring constant of the representative contact surface, the representative contact surface steady-state displacement amount being a displacement amount of the position and posture of the representative contact surface corresponding to the integral term; and a floor surface estimation element configured to estimate a position and posture of an actual floor surface by correcting a position and posture of a supposed floor surface according to the representative contact surface steady-state displacement amount calculated by the representative contact surface steady-state displacement amount calculation element, the supposed floor surface being a floor surface supposed in the desired motion (fourth invention).

Note that the position and posture of the supposed floor surface or the actual floor surface are the position and posture of the floor surface in or near the ground surface of the distal end of each leg link of the mobile object.

In the fourth invention, for example, the total floor reaction force required correction amount may be determined by combining only the proportional term and the integral term. Alternatively, the total floor reaction force required correction amount may be determined by combining not only the proportional term and the integral term but also another term such as a derivative term.

According to the third invention, in a state where compliance control is performed on the mobile object as described above, the total floor reaction force required correction amount determined by the total floor reaction force required correction amount determination element is the integral (integral term) of the error between the observed value of the actual total floor reaction force and the desired total floor reaction force. Therefore, the required displacement amount of the position and posture of the representative contact surface calculated by the representative contact surface position/posture displacement amount calculation element from the total floor reaction force required correction amount and the spring constant corresponds to the steady-state difference between the position and posture of the supposed floor surface which is a floor surface supposed in the desired motion and the position and posture of the actual floor surface. That is, the required displacement amount corresponds to ↑Xc_int in the equation (28-1).

According to the fourth invention, in a state where compliance control is performed on the mobile object as described above, the displacement amount (displacement amount of the position and posture of the representative contact surface calculated using the integral term instead of the total floor reaction force required correction amount) of the position and posture of the representative contact surface calculated by the same calculation as the representative contact surface position/posture displacement amount calculation element from the spring constant and the integral term of the total floor reaction force required correction amount determined by the total floor reaction force required correction amount determination element corresponds to the steady-state difference between the position and posture of the supposed floor surface and the position and posture of the actual floor surface, namely, ↑Xc_int in the equation (28-1).

Hence, in the third invention, the position and posture of the supposed floor surface corrected by the required displacement amount calculated by the representative contact surface position/posture displacement amount calculation element are estimated as the position and posture of the actual floor surface.

Meanwhile, in the fourth invention, the representative contact surface steady-state displacement amount calculation element calculates the representative contact surface steady-state displacement amount which is the displacement amount of the position and posture of the representative contact surface corresponding to the integral term, from the spring constant of the representative contact surface and the integral term of the total floor reaction force required correction amount. The position and posture of the supposed floor surface corrected by the representative contact surface steady-state displacement amount calculated by the representative contact surface steady-state displacement amount calculation element are then estimated as the position and posture of the actual floor surface.

Thus, according to the third and fourth inventions, it is possible to estimate the position and posture of the actual floor surface. Since the joint displacement correction amount that ensures the total floor reaction force required correction amount can be determined to control the motion of the mobile object by the above-mentioned compliance control, each of the required displacement amount in the third invention and the representative contact surface steady-state displacement amount in the fourth invention reliably corresponds to the steady-state difference between the position and posture of the supposed floor surface and the position and posture of the actual floor surface.

Hence, according to the third and fourth inventions, not only the same advantageous effects as the first invention can be attained, but also the position and posture of the actual floor surface can be accurately estimated.

Therefore, according to the third and fourth inventions, it is possible to appropriately estimate the position and posture of the actual floor surface in the mobile environment of the mobile object, while performing appropriate motion control of the mobile object so that the total floor reaction force actually acting on the mobile object follows the desired total floor reaction force with no need for a process of determining the amount of correction of the position and posture of the distal end of each leg link from the desired motion.

Moreover, in the fourth invention, the total floor reaction force required correction amount is the combination of at least the proportional term and the integral term, and so the same advantageous effects as the second invention can be attained.

In the first to fourth inventions, the pseudo inverse matrix $Jc^{-1}$ of the representative contact surface Jacobian matrix Jc may be calculated by a known appropriate method.

Preferably, the pseudo inverse matrix $Jc^{-1}$ of the calculated representative contact surface Jacobian matrix Jc is a matrix obtained according to the following equation (30) from a weight matrix W set beforehand and the calculated representative contact surface Jacobian matrix Jc, wherein the mobile object controller further comprises a pseudo inverse matrix calculation parameter determination element configured to determine a value of k (real number) in the equation (30) so that a determinant DET expressed by the following equation (31) is equal to or more than a predetermined positive threshold, $$Jc^{-1} = W^{-1} \cdot Jc^T \cdot (Jc \cdot W^{-1} \cdot Jc^T + k \cdot I)^{-1} \quad (30)$$

$$DET = det(Jc \cdot W^{-1} \cdot Jc^T + k \cdot I) \quad (31)$$

where W is the weight matrix set beforehand which is a diagonal matrix, and wherein the pseudo inverse matrix calculation parameter determination element is configured to: repeatedly perform a process of setting a provisional value of k by gradually increasing the provisional value from a predetermined initial value, calculating the determinant DET using the set provisional value, and determining whether or not an absolute value of the calculated determinant DET is equal to or more than the predetermined threshold, and determine the provisional value of k in the case where a result of the determination is true as the value of k used for calculating the pseudo inverse matrix according to the equation (30); and set an increment of the provisional value of k in the case where the result of the determination is false, to a value proportional to an n-th root of an absolute value of an error between the absolute value of the determinant DET calculated using the provisional value before the increment and the predetermined threshold, where n is an order of $Jc \cdot W^{-1} \cdot Jc^T$ (fifth invention).

In the equation (30), I is a unit matrix. The weight coefficient matrix W adjusts, for each joint, the degree of correction of the displacement amount of the joint for realizing the required displacement amount of the position and posture of the representative contact surface in consideration of, for example, responsiveness of a change of the position and posture of the representative contact surface to a change of the displacement amount of the joint. The weight coefficient matrix W may be a unit matrix.

Meanwhile, k is an adjustment parameter for preventing the determinant of the matrix inside the parentheses in the right side of the equation (30), i.e. the determinant DET shown in the equation (31), from becoming excessively small in magnitude, and is a real number equal to or more than zero. Basically, the pseudo inverse matrix $Jc^{-1}$ can be calculated according to the equation (30) in the case where the adjustment parameter k=0.

In such a case, however, there is a possibility that the magnitude of the determinant DET becomes excessively small (close to zero). When this occurs, the inverse matrix of the matrix inside the parentheses in the right side of the equation (30) diverges, making it impossible to determine the appropriate pseudo inverse matrix $Jc^{-1}$. To prevent this, a matrix obtained by multiplying the unit matrix I by k is added to the first term inside the parentheses in the right side of the equation (30).

The appropriate adjustment parameter k for preventing the magnitude of the determinant DET from becoming excessively small changes with Jc. Moreover, the magnitude of the determinant DET changes nonlinearly with the change of k.

Accordingly, in the fifth invention, the pseudo inverse matrix calculation parameter determination element performs exploratory determination of k such that the absolute value of the determinant DET is equal to or more than the predetermined threshold (not excessively small).

In detail, the process of setting a provisional value of k by gradual increase from a predetermined initial value, calculating the determinant DET using the set provisional value, and determining whether or not the absolute value of the calculated determinant DET is equal to or more than the predetermined threshold is repeatedly performed, and the provisional value of k in the case where the result of the determination is true is determined as the value of k used for calculating the pseudo inverse matrix according to the equation (30).

In this process, if the increment of the provisional value of k is fixed, there is a high likelihood that it takes long to eventually determine the value of k or the value of k determined in each control cycle of the mobile object controller varies frequently. This tends to cause a discontinuous change of the calculated pseudo inverse matrix $Jc^{-1}$.

On the other hand, according to the findings of the inventor of the present application, the determinant DET changes in proportion to the n-th power of k, where n is the order of $Jc \cdot W^{-1} \cdot Jc^T$.

In view of this, in the fifth invention, the increment of the provisional value of k in the case where the result of the determination is false is set to a value proportional to the n-th root (n is the order of $Jc \cdot W^{-1} \cdot Jc^T$) of the absolute value of the error between the absolute value of the determinant DET calculated using the provisional value before the increase by the increment and the predetermined threshold, in the process of the pseudo inverse matrix calculation parameter determination element.

Therefore, according to the fifth invention, the appropriate value of k (the value of k such that the absolute value of DET is equal to or more than the predetermined threshold) used for calculating the pseudo inverse matrix $Jc^{-1}$ can be efficiently determined in a short time in each control cycle of the mobile object controller, and also the pseudo inverse matrix $Jc^{-1}$ can be changed smoothly. This allows the joint displacement correction amount to be determined so as to smoothly change the displacement amount of each joint of the mobile object.

Moreover, according to the fifth invention, the weight coefficient matrix W makes it possible to adjust, for each joint, the degree of correction of the displacement amount of the joint for realizing the required displacement amount of the position and posture of the representative contact surface in consideration of, for example, responsiveness of a change of the position and posture of the representative contact surface to a change of the displacement amount of the joint.

The present invention may also be realized as a floor surface estimator, because the position and posture of the actual floor surface can be estimated as described with regard to the third or fourth invention.

The floor surface estimator according to the present invention is a floor surface estimator which estimates a position and posture of an actual floor surface on which a mobile object moves, in a mobile object controller performing motion control of the mobile object according to a desired motion of the mobile object and a desired total floor reaction force which is a desired value of a total floor reaction force to be applied to the mobile object to realize the desired motion, the mobile object including a body, a plurality of leg links connected to the body, and a joint actuator which drives a joint of each leg link, and moving on the floor surface by movements of the plurality of leg links, the floor surface estimator comprising: a total floor reaction force required correction amount determination element configured to determine, as a total floor reaction force required correction amount, a result of integrating an error between an observed value of the total floor reaction force actually acting on the mobile object and the desired total floor reaction force, the total floor reaction force required correction amount being a correction amount of the total floor reaction force to be additionally applied to the mobile object so that the error approaches zero; a representative contact surface position/posture displacement amount calculation element configured to calculate, from the determined total floor reaction force required correction amount and a predetermined spring constant of a representative contact surface, a required displacement amount of a position and posture of the representative contact surface corresponding to the total floor reaction force required correction amount based on an assumption that the total floor reaction force required correction amount is generated by a spring displacement of the position and posture of the representative contact surface, the representative contact surface being a single virtual contact surface representative of all contact surfaces between the mobile object and the floor surface; a representative contact surface Jacobian matrix calculation element configured to calculate a representative contact surface Jacobian matrix Jc according to the equation (27) from a leg link Jacobian matrix J_i for each leg link, the spring constant, a relative position of an actual floor reaction force central point of a distal end of each leg link relative to a total floor reaction force central point, and a floor reaction force actually acting on each leg link, the representative contact surface Jacobian matrix Jc being a Jacobian matrix representing a relation between a temporal change rate of the position and posture of the representative contact surface and a temporal change rate of a generalized variable vector whose components are a position and posture of the body and a displacement amount of each joint of the mobile object, the leg link Jacobian matrix J_i being a Jacobian matrix representing a relation between a temporal change rate of a position of a distal end of the leg link or a temporal change rate of a position and posture of the distal end of the leg link and the temporal change rate of the generalized variable vector, and the total floor reaction force central point being an acting point of the total floor reaction force actually acting on the mobile object; a joint displacement correction amount determination element configured to determine a joint displacement correction amount by multiplying the calculated required displacement amount of the position and posture of the representative contact surface by a pseudo inverse matrix $Jc^{-1}$ of the calculated representative contact surface Jacobian matrix Jc, the joint displacement correction amount being a correction amount of the displacement amount of each joint of the mobile object for realizing the required displacement amount of the position and posture of the representative contact surface; and a joint displacement control element configured to control the joint actuator according to a corrected desired joint displacement amount obtained by correcting a desired joint displacement amount by the determined joint displacement correction amount, the desired joint displacement amount being the displacement amount of each joint of the mobile object defined by the desired motion of the mobile object, wherein the position and posture of the actual floor surface are estimated by correcting a position and posture of a supposed floor surface according to the required displacement amount calculated by the representative contact surface position/posture displacement amount calculation element, the supposed floor surface being a floor surface supposed in the desired motion (sixth invention).

Alternatively, the floor surface estimator according to the present invention is a floor surface estimator which estimates a position and posture of an actual floor surface on which a mobile object moves, in a mobile object controller performing motion control of the mobile object according to a desired motion of the mobile object and a desired total floor reaction force which is a desired value of a total floor reaction force to be applied to the mobile object to realize the desired motion, the mobile object including a body, a plurality of leg links connected to the body, and a joint actuator which drives a joint of each leg link, and moving on the floor surface by movements of the plurality of leg links, the floor surface estimator comprising: a total floor reaction force required correction amount determination element configured to determine a total floor reaction force required correction amount which is a correction amount of a total floor reaction force to be additionally applied to the mobile object so that an error between an observed value of the total floor reaction force actually acting on the mobile object and the desired total floor reaction force approaches zero, by combining at least a proportional term proportional to the error and an integral term obtained by integrating the error; a representative contact surface position/posture displacement amount calculation element configured to calculate, from the determined total floor reaction force required correction amount and a predetermined spring constant of a representative contact surface, a required displacement amount of a position and posture of the representative contact surface corresponding to the total floor reaction force required correction amount based on an assumption that the total floor reaction force required correction amount is generated by a spring displacement of the position and posture of the representative contact surface, the representative contact surface being a single virtual contact surface representative of all contact surfaces between the mobile object and the floor surface; a representative contact surface Jacobian matrix calculation element configured to calculate a representative contact surface Jacobian matrix Jc according to the equation (27) from a leg link Jacobian matrix J_i for each leg link, the spring constant, a relative position of an actual floor reaction force central point of a distal end of each leg link relative to a total floor reaction force central point, and a floor reaction force actually acting on each leg link, the representative contact surface Jacobian matrix Jc being a Jacobian matrix representing a relation between a temporal change rate of the position and posture of the representative contact surface and a temporal change rate of a generalized variable vector whose components are a position and posture of the body and a displacement amount of each joint of the mobile object, the leg link Jacobian matrix J_i being a Jacobian matrix representing a relation between a temporal change rate of a position of a distal end of the leg link or a temporal change rate of a position and posture of the distal end of the leg link and the temporal change rate of the generalized variable vector, and the total floor reaction force central point being an acting point of the total floor reaction force actually acting on the mobile object; a joint displacement correction amount determination element configured to determine a joint displacement correction amount by multiplying the calculated required displacement amount of the position and posture of the representative contact surface by a pseudo inverse matrix $Jc^{-1}$ of the calculated representative contact surface Jacobian matrix Jc, the joint displacement correction amount being a correction amount of the displacement amount of each joint of the mobile object for realizing the required displacement amount of the position and posture of the representative contact surface; a joint displacement control element configured to control the joint actuator according to a corrected desired joint displacement amount obtained by correcting a desired joint displacement amount by the determined joint displacement correction amount, the desired joint displacement amount being the displacement amount of each joint of the mobile object defined by the desired motion of the mobile object; and a representative contact surface steady-state displacement amount calculation element configured to calculate a representative contact surface steady-state displacement amount from the integral term in the total floor reaction force required correction amount and the spring constant of the representative contact surface, the representative contact surface steady-state displacement amount being a displacement amount of the position and posture of the representative contact surface corresponding to the integral term, wherein the position and posture of the actual floor surface are estimated by correcting a position and posture of a supposed floor surface according to the representative contact surface steady-state displacement amount calculated by the representative contact surface steady-state displacement amount calculation element, the supposed floor surface being a floor surface supposed in the desired motion (seventh invention).

According to the sixth and seventh inventions, the same advantageous effects as the third and fourth inventions can be attained, respectively. That is, it is possible to perform appropriate motion control (compliance control mentioned above) of the mobile object so that the total floor reaction force actually acting on the mobile object follows the desired total floor reaction force, with no need for a process of determining the amount of correction of the position and posture of the distal end of each leg link from the desired motion.

Since the joint displacement correction amount that ensures the total floor reaction force required correction amount can be determined to control the motion of the mobile object by the above-mentioned compliance control, each of the total floor reaction force required correction amount in the sixth invention and the representative contact surface steady-state displacement amount in the seventh invention reliably corresponds to the steady-state difference between the position and posture of the supposed floor surface and the position and posture of the actual floor surface. Hence, the position and posture of the actual floor surface can be accurately estimated.

Therefore, according to the sixth and seventh inventions, it is possible to appropriately estimate the position and posture of the actual floor surface in the mobile environment of the mobile object, while performing appropriate motion control of the mobile object so that the total floor reaction force actually acting on the mobile object follows the desired total floor reaction force with no need for a process of determining the amount of correction of the position and posture of the distal end of each leg link from the desired motion.

Moreover, in the seventh invention, the total floor reaction force required correction amount is the combination of at least the proportional term and the integral term, and so the joint displacement correction amount by which the actual total floor reaction force follows the desired total floor reaction force can be determined by compensating for not only the influence of the steady-state error of the position and posture of the supposed floor surface from the actual floor surface but also the influence of the temporary error between the observed value of the actual total floor reaction force and the desired total floor reaction force caused by the actual floor surface's local unevenness or the like which is not included in the supposed floor surface.

In the sixth and seventh inventions, it is desirable to determine the pseudo inverse matrix $Jc^{-1}$ of the representative contact surface Jacobian matrix by the same method as in the fifth invention.

In the sixth invention, it is preferable that the pseudo inverse matrix $Jc^{-1}$ of the calculated representative contact surface Jacobian matrix Jc is a matrix obtained according to the equation (30) from a weight matrix W set beforehand and the calculated representative contact surface Jacobian matrix Jc, wherein the floor surface estimator further comprises a pseudo inverse matrix calculation parameter determination element configured to determine a value of k in the equation (30) so that a determinant DET expressed by the equation (31) is equal to or more than a predetermined positive threshold, and wherein the pseudo inverse matrix calculation parameter determination element is configured to: repeatedly perform a process of setting a provisional value of k by gradually increasing the provisional value from a predetermined initial value, calculating the determinant DET using the set provisional value, and determining whether or not an absolute value of the calculated determinant DET is equal to or more than the predetermined threshold, and determine the provisional value of k in the case where a result of the determination is true as the value of k used for calculating the pseudo inverse matrix according to the equation (30); and set an increment of the provisional value of k in the case where the result of the determination is false, to a value proportional to an n-th root of an absolute value of an error between the absolute value of the determinant DET calculated using the provisional value before the increment and the predetermined threshold, where n is an order of $Jc \cdot W^{-1} \cdot Jc^T$ (eighth invention).

The same applies to the seventh invention (ninth invention).

According to the eighth and ninth inventions, the same advantageous effects as the fifth invention can be attained. That is, the appropriate value of k (the value of k such that the absolute value of DET is equal to or more than the predetermined threshold) used for calculating the pseudo inverse matrix $Jc^{-1}$ can be efficiently determined in a short time in each control cycle of the mobile object controller, and also the pseudo inverse matrix $Jc^{-1}$ can be changed smoothly. This allows the joint displacement correction amount to be determined so as to smoothly change the displacement amount of each joint of the mobile object.

Moreover, the weight coefficient matrix W makes it possible to adjust, for each joint, the degree of correction of the displacement amount of the joint for realizing the required displacement amount of the position and posture of the representative contact surface in consideration of, for example, responsiveness of a change of the position and posture of the representative contact surface to a change of the displacement amount of the joint.

The first invention and its related second to ninth inventions are each an invention concerning a situation where the mobile object receives a reaction force only from an external floor surface (in more detail, a situation where most or all of an external force acting on the mobile object other than gravity is a reaction force from a floor surface on which the mobile object is grounded (i.e. which the mobile object contacts)). However, the technique of the first invention may also be extensively applied to a situation where the mobile object contacts a plurality of contact target surfaces (a floor surface, a wall surface, etc.) and receives a reaction force from the plurality of contact target surfaces.

For purposes of illustration of the invention of this extended technique, generalized concepts of technical matters on which the extended technique is based are described below.

As shown in FIG. 9, a mobile object 201 having a plurality of movable links 203 connected to a body 202 is supposed. Each movable link 203 of the mobile object 201 has a plurality of joints. Displacing these joints enables each movable link 203 to move spatially. Each joint is a rotational joint or a prismatic joint.

Suppose, in an arbitrary motion state of the mobile object 201, distal ends of m(i) (m(i)≧1) movable links 203 (203_1 to 203_m(i)) out of the movable links 203 of the mobile object 201 contact an i-th contact target surface which is one contact target surface existing in a mobile environment of the mobile object 201, and the mobile object 201 receives a contact force as a reaction force from the i-th contact target surface via the movable links 203_1 to 203_m(i). In the following description, each of the movable links 203_1 to 203_m(i) is generically referred to as a j-th movable link 203_j (j=1, 2, . . . , m(i)) or a movable link 203_j.

A total contact force (vector) which is a contact force total acting on the mobile object 201 from the i-th contact target surface is denoted by ↑FMt(i), a total translational contact force which is a translational force vector of ↑FMt(i) is denoted by ↑Ft(i), and a total contact force moment which is a moment vector of ↑FMt(i) is denoted by ↑Mt(i).

Here, the total translational contact force ↑Ft(i) and the total contact force moment ↑Mt(i) are each expressed as a three-component column vector in an inertial coordinate system (coordinate system fixed with respect to the floor, wall, or the like in the mobile environment of the mobile object 201). The i-th total contact force ↑FMt(i) is expressed as a six-component column vector (=[↑Ft(i), ↑Mt(i)]$^T$) formed by arranging the components of ↑Ft(i) and ↑Mt(i). An acting point Pt(i) of the total contact force ↑FMt(i) is a point on the i-th contact target surface.

As the inertial coordinate system for representing the translational force, the moment, the position, the posture, and the like, for example, a three-axis orthogonal coordinate system whose X axis is a horizontal axis in a front-back direction of the mobile object 201, whose Z axis is a vertical direction of the mobile object 201, and whose Y axis is a direction (right-left direction of the mobile object 201) orthogonal to the X axis and the Z axis is used as in FIG. 1. Here, the front-back direction and the right-left direction of the mobile object 201 may be arbitrarily defined.

A contact force (hereafter referred to as a movable link contact force) acting on the j-th movable link 203_j (j=1, 2, . . . , m(i)) from the i-th contact target surface is denoted by ↑FM(i)_j, a translational contact force which is a translational force vector of ↑FM(i)_j is denoted by ↑F(i)_j, and a contact force moment which is a moment vector of ↑FM(i)_j is denoted by ↑M(i)_j.

Here, the translational contact force ↑F(i)_j and the contact force moment ↑M(i)_j are each expressed as a three-component column vector in the inertial coordinate system, as in the case of the i-th total contact force ↑FMt(i). The j-th movable link contact force ↑FM(i)_j is expressed as a six-component column vector (=[↑F(i)_j, ↑M(i)_j]$^T$) formed by arranging the components of ↑F(i)_j and ↑M(i)_j. An acting point P(i)_j of the j-th movable link contact force ↑FM(i)_j is a point on the i-th contact target surface within a contact surface between the j-th movable link 203_j and the i-th contact target surface.

A relation between the total contact force ↑FMt(i) (hereafter also referred to as an i-th total contact force ↑FMt(i)) and the movable link contact force ↑FM(i)_j (j=1, 2, ..., m(i)) is typically given by the following equation (51).

$$\uparrow FMt(i) = \sum_{j=1}^{m(i)} AA(i)\_j \cdot \uparrow FM(i)\_j \quad (51)$$

$$= AA(i)\_1 \cdot \uparrow FM(i)\_1 + AA(i)\_2 \cdot \uparrow FM(i)\_2 + \ldots +$$

$$AA(i)\_m(i) \cdot \uparrow FM(i)\_m(i)$$

where $$\uparrow FMt(i) = \begin{bmatrix} \uparrow Ft(i) \\ \uparrow Mt(i) \end{bmatrix}$$

$$\uparrow FM(i)\_j = \begin{bmatrix} \uparrow F(i)\_j \\ \uparrow M(i)\_j \end{bmatrix} \quad (j = 1, 2, \ldots, m(i))$$

AA(i)_j (j=1, 2, ..., m(i)) is a matrix defined by $$AA(i)\_j \equiv \begin{bmatrix} I & 0 \\ VV(i)\_j & I \end{bmatrix}$$

VV(i)_j (j=1, 2, ..., m(i)) is a matrix such that VV(i)_j·↑F(i)_j=↑V(i)_j×↑F(i)_j, and ↑V(i)_j (j=1, 2, ..., m(i)) is a position vector of the acting point P(i)_j of the j-th movable link contact force ↑FM(i)_j relative to the acting point Pt(i) of the i-th total contact force ↑FMt(i).

In the where clause of the equation (51), the components "I" and "0" of the matrix AA(i)_j are respectively a unit matrix and a zero matrix, and "×" is an arithmetic sign representing an outer product (vector product).

The equation (51) is an equation obtained by extending the equation (1) for each of the plurality of contact target surfaces. In the case where the i-th contact target surface is a floor surface and m(i)=N, the equation (51) is equivalent to the equation (1).

Here, suppose a contact force ↑ΔFM(i)_j (=[↑ΔF(i)_j, ↑ΔM(i)_j]$^T$) for perturbation is added to the acting point P(i)_j of the j-th movable link contact force ↑FM(i)_j, thereby adding a contact force ↑ΔFMt(i) (=[↑ΔFt(i), ↑ΔMt(i)_j]$^T$) for perturbation to the acting point Pt(i) of the i-th total contact force ↑FMt(i). Note that adding the contact force ↑ΔFM(i)_j for perturbation to the acting point P(i)_j means that the contact force acting at the acting point P(i)_j is changed from ↑FM(i)_j to ↑FM(i)_j+↑ΔFM(i)_j. Likewise, adding the contact force ↑ΔFMt(i) for perturbation to the acting point Pt(i) means that the total contact force acting at the acting point Pt(i) is changed from ↑FMt(i) to ↑FMt(i)+↑ΔFMt(i).

Hereafter, ↑ΔFM(i)_j is referred to as a j-th movable link perturbation contact force, and a translational force vector ↑ΔF(i)_j and a moment vector ↑ΔM(i) j of ↑ΔFM(i)_j are respectively referred to as a j-th movable link perturbation translational contact force and a j-th movable link perturbation contact force moment. Moreover, ↑ΔFMt(i) is referred to as an i-th perturbation total contact force (or a perturbation total contact force), and a translational force vector ↑ΔFt(i) and a moment vector ↑ΔMt(i) of ↑ΔFMt(i) are respectively referred to as an i-th perturbation total translational contact force (or a perturbation total translational contact force) and an i-th perturbation total contact force moment (or a perturbation total contact force moment).

A relation between the perturbation total contact force ↑ΔFMt(i) and the j-th movable link perturbation contact force ↑ΔFM(i)_j (j=1, 2, ..., m(i)) is given by the following equation (52) based on the equation (51).

$$\uparrow \Delta FMt(i) = \sum_{j=1}^{m(i)} AA(i)\_j \cdot \uparrow \Delta FM(i)\_j \quad (52)$$

$$= AA(i)\_1 \cdot \uparrow \Delta FM(i)\_1 + AA(i)\_2 \cdot$$

$$\uparrow \Delta FM(i)\_2 + \ldots + AA(i)\_N \cdot \uparrow \Delta FM(i)\_m(i)$$

AA(i)_j (j=1, 2, ..., m(i)) in the equation (52) is the same as that defined in the where clause of the equation (51).

It is assumed that the j-th movable link perturbation contact force ↑ΔFM(i)_j is generated by spring displacements of the position and posture of the contact surface (hereafter referred to as a j-th movable link contact surface or a movable link contact surface) between the j-th movable link 203_j and the i-th contact target surface.

In more detail, it is assumed that the j-th movable link perturbation translational contact force ↑ΔF(i)_j is generated by the spring displacement (translational displacement) of the position of the j-th movable link contact surface, and the j-th movable link perturbation contact force moment ↑ΔM(i)_j is generated by the spring displacement (rotational displacement) of the posture of the j-th movable link contact surface.

The spring displacements of the position and posture of the j-th movable link contact surface respectively correspond to a translational displacement and a rotational displacement by an elastic deformation of an element forming the i-th contact target surface in the j-th movable link contact surface or an elastic deformation of a contact portion of the j-th movable link 203_j.

The amount of displacement of the position (vector of the amount of translational displacement of the j-th movable link contact surface in the directions of the three axes, hereafter referred to as a spring translational displacement amount) and the amount of displacement of the posture (vector of the amount of rotational displacement of the j-th movable link contact surface about the three axes, hereafter referred to as a spring rotational displacement amount) of the j-th movable link contact surface by the spring displacements are respectively denoted by ↑Xorg(i)_j and ↑Xrot(i)_j. A relation between ↑Xorg(i)_j and ↑ΔF(i)_j and a relation between ↑Xrot(i)_j and ↑ΔM(i)_j are respectively given by the following equations (53) and (54).

$$\uparrow \Delta F(i)\_j = Korg(i)\_j \cdot \uparrow Xorg(i)\_j \quad (53)$$

$$\uparrow \Delta M(i)\_j = Krot(i)\_j \cdot \uparrow Xrot(i)\_j \quad (54)$$

Korg(i)_j in the equation (53) is a three-dimensional diagonal matrix (hereafter referred to as a translational spring constant matrix Korg(i)_j) whose diagonal components are spring constants of the components of the spring translational displacement amount ↑Xorg(i)_j of the j-th movable link contact surface. Krot(i)_j in the equation (54) is a three-dimensional diagonal matrix (hereafter referred to as a rotational spring constant matrix Krot(i)_j) whose diagonal components are spring constants of the components of the spring rotational displacement amount ↑Xrot(i)_j of the j-th movable link contact surface.

An i-th representative contact surface is supposed to be a single virtual contact surface representative of all contact surfaces between the mobile object 201 and the i-th contact target surface (contact surfaces of all movable links 203(i)_1 to 203(i)_m(i) which contact the i-th contact target surface). It is assumed that the i-th total contact force ↑FMt(i) acts on the mobile object 201 in the i-th representative contact surface. The i-th representative contact surface mentioned here corresponds to a supporting polygon on the i-th contact target surface.

It is also assumed that the i-th perturbation total contact force ↑ΔFMt(i) is generated by spring displacements of the position and posture of the i-th representative contact surface, as in the case of the j-th movable link contact surface.

In more detail, it is assumed that the perturbation total translational contact force ↑ΔFt(i) is generated by the spring displacement (translational displacement) of the position of the i-th representative contact surface, and the perturbation total contact force moment ↑ΔMt(i) is generated by the spring displacement (rotational displacement) of the posture of the i-th representative contact surface.

The spring translational displacement amount of the position (vector of the amount of translational displacement in the directions of the three axes by the spring displacement) and the spring rotational displacement amount of the posture (vector of the amount of rotational displacement about the three axes by the spring displacement) of the i-th representative contact surface are respectively denoted by ↑Xc_org(i) and ↑Xc_rot(i). A relation between ↑Xc_org(i) and ↑ΔFt(i) and a relation between ↑Xc_rot(i) and ↑ΔMt(i) are respectively given by the following equations (55) and (56).

$$\uparrow \Delta Ft(i) = Kc\_org(i) \cdot \uparrow Xc\_org(i) \quad (55)$$

$$\uparrow \Delta Mt(i) = Kc\_rot(i) \cdot \uparrow Xc\_rot(i) \quad (56)$$

Kc_org(i) in the equation (55) is a three-dimensional diagonal matrix (hereafter referred to as a translational spring constant matrix Kc_org(i)) whose diagonal components are spring constants of the components of the spring translational displacement amount ↑Xc_org(i) of the i-th representative contact surface. Kc_rot(i) in the equation (56) is a three-dimensional diagonal matrix (hereafter referred to as a rotational spring constant matrix Kc_rot(i)) whose diagonal components are spring constants of the components of the spring rotational displacement amount ↑Xc_rot(i) of the i-th representative contact surface.

In a state where only one movable link 203_j of the mobile object 201 contacts the i-th contact target surface, the i-th representative contact surface matches the contact surface (j-th movable link contact surface) of this single movable link 203_j with the i-th contact target surface. In such a state, the spring displacements of the position and posture of the i-th representative contact surface are the same as spring displacements of the position and posture of the j-th movable link contact surface. The spring displacements respectively correspond to a translational displacement and a rotational displacement by an elastic deformation of the element forming the i-th contact target surface in the j-th movable link contact surface or an elastic deformation of a contact portion of the j-th movable link 203_j.

In a state where two or more movable links 203 of the mobile object 201 contact the i-th contact target surface, on the other hand, the i-th representative contact surface serves as a contact surface, with the i-th contact target surface, of a single virtual contact portion that combines contact portions of all movable links 203 contacting the i-th contact target surface. In such a state, the spring displacements of the position and posture of the i-th representative contact surface respectively correspond to a translational displacement and a rotational displacement by an elastic deformation of the element forming the i-th contact target surface in the contact surface of the virtual contact portion or an elastic deformation of the virtual contact portion.

The following equation (57) is derived from the equation (52), with regard to the perturbation total translational contact force ↑ΔFt(i) that is added to the acting point Pt(i) of the total contact force ↑FMt(i) by adding the j-th movable link perturbation translational contact force ↑ΔF(i)_j to the acting point P(i)_j of each j-th movable link contact force ↑FM(i)_j (j=1, 2, ..., m(i)).

$$\uparrow \Delta Ft(i) = \uparrow \Delta F(i)\_1 + \uparrow \Delta F(i)\_2 + \ldots + \uparrow \Delta F(i)\_m(i) \quad (57)$$

From the equations (53), (55), and (57), the following equation (58) is obtained.

$$Kc\_org(i) \cdot \uparrow Xc\_org(i) = Korg(i)\_1 \cdot \uparrow Xorg(i)\_1 + Korg(i)\_2 \cdot \uparrow Xorg(i)\_2 + \ldots + Korg(i)\_m(i) \cdot \uparrow Xorg(i)\_m(i) \quad (58)$$

The acting point Pt(i) of the total contact force ↑FMt(i) before the addition of the perturbation total contact force ↑ΔFMt(i) is assumed to be a total contact force central point, and the acting point P(i)_j of the j-th movable link contact force ↑FM(i)_j before the addition of the j-th movable link perturbation contact force ↑ΔFM(i)_j is assumed to be a contact force central point of the j-th movable link contact surface. A relation between a position vector (denoted by ↑Pt(i)) of the acting point Pt(i) and a position vector (denoted by ↑P(i)_j) of each acting point P(i)_j (j=1, 2, ..., m(i)) relative to an arbitrary reference point is given by the following equation (59).

Note that the total contact force central point is the acting point of the total contact force ↑FMt(i), where the component, parallel to the i-th contact target surface, of the total contact force moment ↑Mt(i) about the total contact force central point is zero. Likewise, the contact force central point of the j-th movable link contact surface is the acting point of the j-th movable link contact force ↑FM(i)_j, where the component, parallel to the i-th contact target surface, of the contact force moment ↑M(i)_j about the contact force central point is zero.

$$\uparrow Pt(i) = r(i)\_1 \cdot \uparrow P(i)\_1 + r(i)\_2 \cdot \uparrow P(i)\_2 + \ldots + r(i)\_m(i) \cdot \uparrow P(i)\_m(i) \quad (59)$$

In the equation (59), r(i)_j (j=1, 2, ..., m(i)) is a weight coefficient defined by r(i)_j≡Fn(i)_j/Fnt(i). Fn(i)_j (j=1, 2, ..., m(i)) is an absolute value of a normal force component (hereafter referred to as a contact surface normal force component), perpendicular to the i-th contact target surface, of the j-th movable link translational contact force ↑F(i)j, and Fnt(i) is an absolute value of a normal force component (contact surface normal force component), perpendicular to the i-th contact target surface, of the total translational contact force ↑Ft(i), where Fnt(i)=Fn(i)_1+Fn(i)_2+ ... +Fn(i)_m(i). Accordingly, the weight coefficient r(i)_j is a ratio of the contact surface normal force component Fn(i)_j of the j-th movable link translational contact force ↑F(i)_j to the contact surface normal force component Fnt(i) of the total translational contact force ↑Ft(i), where 0≦r(i)_j≦1.

The same relation as the equation (59) is assumed to hold between the spring translational displacement amount ↑Xc_org(i) of the position of the i-th representative contact surface and the spring translational displacement amount ↑Xorg(i)_j of the position of the j-th movable link contact surface, too. That is, the following equation (60) is assumed to hold.

$$\uparrow Xc\_org(i) = r(i)\_1 \cdot \uparrow Xorg(i)\_1 + r(i)\_2 \cdot \uparrow Xorg(i)\_2 + \ldots + r\_m(i) \cdot \uparrow Xorg(i)\_m(i) \quad (60)$$

The following equation (61) is derived from the equations (58) and (60).

$$Korg(i)\_j = r(i)\_j \cdot Kc\_org(i) \quad (61)$$

In the present invention in the case where the mobile object 201 contacts the plurality of contact target surfaces, the equation (60) is used as a basic equation representing the relation between the spring translational displacement amount ↑Xc_org(i) of the i-th representative contact surface and the spring translational displacement amount ↑Xorg(i)_j of the j-th movable link contact surface (j=1, 2, . . . , m(i)), and the equation (61) is used as a basic equation representing the relation between the translational spring constant matrix Kc_org(i) of the i-th representative contact surface and the translational spring constant matrix Korg(i)_j of the j-th movable link contact surface (j=1, 2, . . . , m(i)).

Thus, each diagonal component (spring constant relating to the translational displacement in each of the directions of the three axes) of the translational spring constant matrix Korg(i) j of the j-th movable link contact surface is proportional to the weight coefficient r(i)_j. When the weight coefficient r(i)_j is larger (closer to "1"), i.e. when the ratio of the contact surface normal force component Fn(i)_j of the j-th movable link translational contact force ↑F(i)_j to the contact surface normal force component Fnt(i) of the total translational contact force ↑Ft(i) is higher, each diagonal component of the translational spring constant matrix Korg(i)_j of the j-th movable link contact surface is larger. In other words, when the ratio of Fn(i)_j to Fnt(i) is higher, the sensitivity of change of the spring translational displacement amount ↑Xorg(i)_j of the j-th movable link contact surface to the required j-th movable link perturbation translational contact force is higher.

In a state where only one j-th movable link 203_j contacts the i-th contact target surface (r(i)_j=1), the j-th movable link contact surface and the i-th representative contact surface match each other, so that the translational spring constant matrix Korg(i)_j of the j-th movable link contact surface and the translational spring constant matrix Kc_org(i) of the i-th representative contact surface match each other. Moreover, since ↑ΔF(i)_j=↑ΔFt(i), the spring translational displacement amount ↑Xorg(i)_j of the j-th movable link contact surface and the spring translational displacement amount ↑Xc_org(i) of the i-th representative contact surface match each other.

In a state where two or more movable links 203 contact the i-th contact target surface, on the other hand, the spring translational displacement amount ↑Xc_org(i) of the i-th representative contact surface is a weighted mean value (weighted mean value with r(i)_j as the weight coefficient) of the spring translational displacement amounts ↑Xorg(i)_j of the j-th movable link contact surfaces corresponding to the movable links 203_j which contact the i-th contact target surface.

The following equation (62) is derived from the equation (52), with regard to the perturbation total contact force moment ↑ΔMt(i) that is added to the acting point Pt(i) of the total contact force ↑FMt(i) by adding the j-th movable link perturbation contact force moment ↑ΔM(i)_j to the acting point P(i)_j of each j-th movable link contact force ↑FM(i)_j (j=1, 2, . . . , m(i)) in a state where the respective translational contact forces ↑F(i)_1 to ↑F(i)_m(i) of the first to m(i)-th movable link contact forces ↑FM(i)_1 to ↑FM(i)_m(i) are fixed.

$$\uparrow \Delta Mt(i) = \uparrow \Delta M(i)\_1 + \uparrow \Delta M(i)\_2 + \ldots + \uparrow \Delta M(i)\_m(i) \quad (62)$$

From the equations (54), (56), and (62), the following equation (63) is obtained.

$$Kc\_rot(i) \cdot \uparrow Xc\_rot(i) = Krot(i)\_1 \cdot \uparrow Xrot(i)\_1 + Krot(i)\_2 \cdot \uparrow Xrot(i)\_2 + \ldots + Krot(i)\_m(i) \cdot \uparrow Xrot(i)\_m(i) \quad (63)$$

In the case where the acting point P(i)_j of the j-th movable link contact force ↑FM(i)_j matches the contact force central point of the j-th movable link contact surface, adding the j-th movable link perturbation contact force moment ↑ΔM(i) j to the acting point P(i)_j (contact force central point) of the j-th movable link contact force ↑FM(i)_j in a state where the respective translational contact forces ↑F(i)_1 to ↑F(i)_m(i) of the first to m(i)-th movable link contact forces ↑FM(i)_1 to ↑FM(i)_m(i) are fixed is equivalent to shifting the position of the contact force central point in the j-th movable link contact surface from the point P(i)_j on the i-th contact target surface.

Likewise, in the case where the acting point Pt(i) of the total contact force ↑FMt(i) matches the total contact force central point, adding the perturbation total contact force moment ↑ΔMt(i) to the acting point Pt(i) of the total contact force ↑FMt(i) is equivalent to shifting the position of the total contact force central point from the point Pt(i) on the i-th contact target surface.

This being the case, when the amount of displacement (two-component displacement amount vector) of the position of the contact force central point in the j-th movable link contact surface in the direction parallel to the i-th contact target surface is denoted by ↑ΔRpt(i)_j and the amount of displacement (two-component displacement amount vector) of the position of the total contact force central point in the direction parallel to the i-th contact target surface is denoted by ↑ΔRptt(i), the component about the axis parallel to the i-th contact target surface of ↑ΔRptt(i)·Fnt(i)=↑ΔMt(i) and the component about the axis parallel to the i-th contact target surface of ↑ΔRpt(i)_j·Fn(i)_j=↑ΔM(i)_j are obtained. Therefore, the following equation (64) is derived from the equation (62).

$$\uparrow \Delta Rptt(i) = r(i)\_1 \cdot \uparrow \Delta Rpt(i)\_1 + r(i)\_2 \cdot \uparrow \Delta Rpt(i)\_2 + \ldots + r(i)\_m(i) \cdot \uparrow \Delta Rpt(i)\_m(i) \quad (64)$$

In the equation (64), r(i)_j (j=1, 2, . . . , m(i)) is the above-mentioned weight coefficient r(i)_j (=Fn(i)_j/Fnt(i)).

Since the first to m(i)-th movable link contact surfaces are portions on the common contact target surface (i-th contact target surface), in the case where the same contact surface normal force component Fn(i)_j acts on each of the first to m(i)-th movable link contact surfaces, the same relation between the perturbation contact force moment (=↑ΔRpt(i)_j·Fn(i)_j) corresponding to the displacement amount ↑ΔRpt(i)_j of the position of the contact force central point of the j-th movable link contact surface in the direction parallel to the i-th contact target surface and the component about the axis parallel to the i-th contact target surface in the rotational displacement amount ↑Xrot(i)_j by the spring displacement of the j-th movable link contact surface holds for every j-th movable link contact surface.

This indicates that the following equation (65) holds in the case where the same contact surface normal force component Fn(i)_j (denoted by Fna(i)) acts on each of the first to m(i)-th movable link contact surfaces.

$$\uparrow \Delta Rpt(i)\_j \cdot Fna(i) = Krot(i) \cdot \uparrow Xrot(i)\_j\_ab \quad (65)$$

where ↑Xrot(i)_j_ab is the component about the two axes parallel to the i-th contact target surface in the spring rotational displacement amount ↑Xrot(i)_j of the j-th movable link contact surface, and Krot(i) is a two-dimensional diagonal matrix (spring constant matrix relating to the rotation about the two axes parallel to the i-th contact target surface).

Given that the equation (65) equally holds for the i-th representative contact surface, the following equation (66) is obtained.

$$\uparrow \Delta Rptt(i) \cdot Fna(i) = Krot(i) \cdot \uparrow Xc\_rot(i)\_ab \quad (66)$$

where $\uparrow Xc\_rot(i)\_ab$ is the component about the two axes parallel to the i-th contact target surface in the spring rotational displacement amount $\uparrow Xc\_rot(i)$ of the i-th representative contact surface.

From the equations (64) to (66), the following equation (67) is obtained.

$$Krot(i) \cdot \uparrow Xc\_rot(i)\_ab = \quad (67)$$
$$r(i)\_1 \cdot Krot(i) \cdot \uparrow Xrot(i)\_1\_ab + r(i)\_2 \cdot Krot(i) \cdot \uparrow Xrot(i)\_2\_ab +$$
$$\ldots + r(i)\_m(i) \cdot Krot(i) \cdot \uparrow Xrot(i)\_m(i)\_ab$$

From the equation (67), the following equation (68) is obtained.

$$\uparrow Xc\_rot(i)\_ab = r(i)\_1 \cdot \uparrow Xrot(i)\_1\_ab + r(i)\_2 \cdot \uparrow Xrot(i)\_2\_ab + \ldots + r(i)\_m(i) \cdot \uparrow Xrot(i)\_m(i)\_ab \quad (68)$$

In the present invention, it is assumed that the same relation as the equation (68) holds for all components (three components) between the spring rotational displacement amount $\uparrow Xc\_rot(i)$ of the i-th representative contact surface and the spring rotational displacement amount $\uparrow Xrot(i)\_j$ of the j-th movable link contact surface. That is, the following equation (69) is assumed to hold.

$$\uparrow Xc\_rot(i) = r(i)\_1 \cdot \uparrow Xrot(i)\_1 + r(i)\_2 \cdot \uparrow Xrot(i)\_2 + \ldots + r(i)\_m(i) \cdot \uparrow Xrot(i)\_m(i) \quad (69)$$

The following equation (70) is derived from the equations (63) and (69).

$$Krot(i)\_j = r(i)\_i \cdot Kc\_rot(i) \quad (70)$$

In the present invention, the equation (69) is used as a basic equation representing the relation between the spring rotational displacement amount $\uparrow Xc\_rot(i)$ of the i-th representative contact surface and the spring rotational displacement amount $\uparrow Xrot(i)\_j$ of the j-th movable link contact surface (j=1, 2, ..., m(i)), and the equation (70) is used as a basic equation representing the relation between the rotational spring constant matrix $Kc\_rot(i)$ of the i-th representative contact surface and the rotational spring constant matrix $Krot(i)\_j$ of the j-th movable link contact surface (j=1, 2, ..., m(i)).

Thus, each diagonal component (spring constant relating to the rotational displacement about each of the three axes) of the rotational spring constant matrix $Krot(i)\_j$ of the j-th movable link contact surface is proportional to the weight coefficient $r(i)\_j$. When the weight coefficient $r(i)\_j$ is larger (closer to "1"), i.e. when the ratio of the contact surface normal force component $Fn(i)\_j$ of the j-th movable link translational contact force $\uparrow F(i)\_j$ to the contact surface normal force component $Fnt(i)$ of the total translational contact force $\uparrow Ft(i)$ is higher, each diagonal component of the rotational spring constant matrix $Krot(i)\_j$ of the j-th movable link contact surface is larger. In other words, when the ratio of $Fn(i)\_j$ to $Fnt(i)$ is higher, the sensitivity of change of the spring rotational displacement amount $\uparrow Xrot(i)\ j$ of the j-th movable link contact surface to the required j-th movable link perturbation contact force moment is higher.

In a state where only one j-th movable link $203\_j$ contacts the i-th contact target surface ($r(i)\_j=1$), the j-th movable link contact surface and the i-th representative contact surface match each other, so that the rotational spring constant matrix $Krot(i)\_j$ of the j-th movable link contact surface and the rotational spring constant matrix $Kc\_rot(i)$ of the i-th representative contact surface match each other. Moreover, since $\uparrow \Delta M(i)\_j = \uparrow \Delta Mt(i)$, the spring rotational displacement amount $\uparrow Xrot(i)\_j$ of the j-th movable link contact surface and the spring rotational displacement amount $\uparrow Xc\_rot(i)$ of the i-th representative contact surface match each other.

In a state where two or more movable links 203 contact the i-th contact target surface, on the other hand, the spring rotational displacement amount $\uparrow Xc\_rot(i)$ of the i-th representative contact surface is a weighted mean value (weighted mean value with $r(i)\_j$ as the weight coefficient) of the spring rotational displacement amounts $\uparrow Xrot(i)\_j$ of the j-th movable link contact surfaces corresponding to the movable links $203\_j$ which contact the i-th contact target surface.

Next, applying the equations (53) to (56) to the equation (52) and further applying the equations (61) and (70) yields the following equation (71).

$$\begin{bmatrix} Kc\_org(i) & 0 \\ 0 & Kc\_rot(i) \end{bmatrix} \cdot \begin{bmatrix} \uparrow Xc\_org(i) \\ \uparrow Xc\_rot(i) \end{bmatrix} = \quad (71)$$
$$\sum_{j=1}^{m(i)} \left( r(i)\_j \cdot \begin{bmatrix} Kc\_org(i) & 0 \\ Kc\_org(i) \cdot VV(i)\_j & Kc\_rot(i) \end{bmatrix} \cdot \begin{bmatrix} \uparrow Xorg(i)\_j \\ \uparrow Xrot(i)\_j \end{bmatrix} \right)$$

The equations (61) and (70) are based on the premise that the acting point $Pt(i)$ of the total contact force $\uparrow FMt(i)$ is the total contact force central point and the acting point $P(i)\_j$ of the j-th movable link contact force $\uparrow FM(i)\_j$ is the contact force central point of the j-th movable link contact surface. Let $\uparrow V(i)\_j$ be the position vector of the contact force central point of the j-th movable link contact surface relative to the acting point $Pt(i)$ as the total contact force central point. Then, $VV(i)\_j$ (j=1, 2, ..., m(i)) in the equation (71) is a matrix defined as follows.

$VV(i)$ j: matrix such that $VV(i)\_j \cdot \uparrow F(i)\_j = V(i)\_j \times \uparrow F(i)\_j$ where $\uparrow V(i)\_j$ is the position vector of the contact force central point of the j-th movable link contact surface relative to the total contact force central point.

In more detail, the total contact force central point is the total contact force central point corresponding to the total contact force $\uparrow FMt(i)$ before the addition of the perturbation total contact force $\uparrow \Delta FMt(i)$, and the contact force central point of the j-th movable link contact surface is the contact force central point corresponding to the j-th movable link contact force $\uparrow FM(i)\_j$ before the addition of the j-th movable link perturbation contact force $\uparrow \Delta FM(i)\_j$.

The following equation (72) is derived from the equation (71).

$$\begin{bmatrix} \uparrow Xc\_org(i) \\ \uparrow Xc\_rot(i) \end{bmatrix} = \sum_{j=1}^{m(i)} \left( r(i)\_j \cdot A(i)\_j \cdot \begin{bmatrix} \uparrow Xorg(i)\_j \\ \uparrow Xrot(i)\_j \end{bmatrix} \right) \quad (72)$$

where $$A(i)\_j \equiv \begin{bmatrix} I & 0 \\ Rk(i) \cdot VV(i)\_j & I \end{bmatrix}$$

$$Rk(i) \equiv Kc\_rot(i)^{-1} \cdot Kc\_org(i)$$

Let $\uparrow q2$ be a generalized variable vector whose components are the position (position in the directions of the three axes) and posture (posture angle about the three axes) of the body 202 of the mobile object 201 and the amount of displacement of each joint of the mobile object 201, $\uparrow Xc(i)$ be a displacement amount vector $(=[\uparrow Xc\_org(i), \uparrow Xc\_rot(i)]^T)$ composed of the spring translational displacement amount $\uparrow Xc\_org(i)$ of the position and the spring rotational displacement amount $\uparrow Xc\_rot(i)$ of the posture of the representative contact surface (i-th representative contact surface), and TX(i)_j be a displacement amount vector $(=[\uparrow Xorg(i)\_j, \uparrow Xrot(i)\_j]^T)$ composed of the spring translational displacement amount $\uparrow Xorg(i)\_j$ of the position and the spring rotational displacement amount $\uparrow Xrot(i)\_j$ of the posture of the j-th movable link contact surface. Hereafter, $\uparrow Xc(i)$ is referred to as a spring translational/rotational displacement amount of the representative contact surface, and $\uparrow X(i)\_j$ is referred to as a spring translational/rotational displacement amount of the j-th movable link contact surface. In more detail, the generalized variable vector $\uparrow q2$ is a column vector formed by arranging the six components of the position and posture of the body 202 and the amount of displacement of each joint of the mobile object 201.

When the spring translational/rotational displacement amount $\uparrow Xc(i)$ of the i-th representative contact surface is regarded as the amount of displacement (temporal change rate) of the position and posture of the i-th representative contact surface per unit time, a Jacobian matrix representing a relation between the amount of displacement of the position and posture of the i-th representative contact surface per unit time and the amount of change (temporal change rate) $\uparrow \Delta q2$ of the generalized variable vector $\uparrow q2$ per unit time is expressed as a matrix Jc(i) that represents the relation between $\uparrow Xc(i)$ and $\uparrow \Delta q2$ by the following equation (73). Here, $\uparrow \Delta q2$ is a column vector formed by arranging the change amounts of the components of the generalized variable vector $\uparrow q2$ per unit time.

$$\uparrow Xc(i) = Jc(i) \cdot \uparrow \Delta q2 \tag{73}$$

Likewise, when the spring translational/rotational displacement amount $\uparrow X(i)\_j$ of the j-th movable link contact surface is regarded as the amount of displacement (temporal change rate) of the position and posture of the j-th movable link contact surface per unit time, a Jacobian matrix representing a relation between the amount of displacement of the position and posture of the j-th movable link contact surface per unit time and the amount of change (temporal change rate) $\uparrow \Delta q2$ of the generalized variable vector $\uparrow q2$ per unit time is expressed as a matrix J(i)_j that represents the relation between TX(i)_j and $\uparrow \Delta q2$ by the following equation (74).

$$\uparrow X(i)\_j = J(i)\_j \cdot \uparrow \Delta q2 \tag{74}$$

Let Jc_org(i) be a Jacobian matrix representing a relation between the amount of displacement of the position of the i-th representative contact surface per unit time and $\uparrow \Delta q2$ (i.e. matrix representing the relation between $\uparrow Xc\_org(i)$ and $\uparrow \Delta q2$ by the following equation (75a)), and Jc_rot(i) be a Jacobian matrix representing a relation between the amount of displacement of the posture of the i-th representative contact surface per unit time and $\uparrow \Delta q2$ (i.e. matrix representing the relation between $\uparrow Xc\_rot(i)$ and $\uparrow \Delta q2$ by the following equation (75b)). Then, $Jc(i) = [Jc\_org(i), Jc\_rot(i)]^T$, as shown in the equation (75c).

$$\uparrow Xc\_org(i) = Jc\_org(i) \cdot \uparrow \Delta q2 \tag{75a}$$

$$\uparrow Xc\_rot(i) = Jc\_rot(i) \cdot \uparrow \Delta q2 \tag{75b}$$

$$Jc(i) = [Jc\_org(i), Jc\_rot(i)]^T \tag{75c}$$

Likewise, let Jorg(i)_j be a Jacobian matrix representing a relation between the amount of displacement of the position of the j-th movable link contact surface per unit time and $\uparrow \Delta q2$ (i.e. matrix representing the relation between $\uparrow Xorg(i)\_j$ and $\uparrow \Delta q2$ by the following equation (76a)), and Jrot(i)_j be a Jacobian matrix representing a relation between the amount of displacement of the posture of the j-th movable link contact surface per unit time and $\uparrow \Delta q2$ (i.e. matrix representing the relation between $\uparrow Xrot(i)\_j$ and $\uparrow \Delta q2$ by the following equation (76b)). Then, $J(i)\_j = [Jorg(i)\_j, Jrot(i)\_j]^T$, as shown in the equation (76c).

$$\uparrow Xorg(i)\_j = Jorg(i)\_j \cdot \uparrow \Delta q2 \tag{76a}$$

$$\uparrow Xrot(i)\_j = Jrot(i)\_j \cdot \uparrow \Delta q2 \tag{76b}$$

$$J(i)\_j = [Jorg(i)\_j, Jrot(i)\_j]^T \tag{76c}$$

Differentiating both sides of the equation (72) and applying the equations (73) and (74) yields the following equation (77).

$$Jc(i) = \sum_{j=1}^{m(i)} (r(i)\_j \cdot A(i)\_j \cdot J(i)\_j) \tag{77}$$
$$= r(i)\_1 \cdot A(i)\_1 \cdot J(i)\_1 + r(i)\_2 \cdot A(i)\_2 \cdot J(i)\_2 + \ldots + r(i)\_m(i) \cdot A(i)\_m(i) \cdot J(i)\_m(i)$$

Thus, the Jacobian matrix Jc(i) (hereafter referred to as an i-th representative contact surface Jacobian matrix Jc(i) or a representative contact surface Jacobian matrix Jc(i)) relating to the displacement of the position and posture of the i-th representative contact surface can be determined from the Jacobian matrix J(i)_j (j=1, 2, . . . , m(i)) relating to the displacement of the position and posture of each movable link contact surface on the i-th contact target surface, according to the equation (77).

Since the position and posture of the j-th movable link contact surface are the position and posture of the distal end of the j-th movable link 203_*j*, the Jacobian matrix J(i)_j (hereafter referred to as a movable link Jacobian matrix J(i)_j) is a Jacobian matrix representing a relation between the amount of change of the position and posture of the distal end of the j-th movable link 203_*j* per unit time and $\uparrow \Delta q2$. Such a Jacobian matrix J(i)_j can be specified based on an observed value of an actual displacement amount of each joint of the mobile object 201 and its temporal change rate.

Once each movable link Jacobian matrix J(i)_j (j=1, 2, . . . , m(i)) is specified in this way, the i-th representative contact surface Jacobian matrix Jc(i) can be determined using J(i)_j according to the equation (77).

Consider the case where N (N≧2) different contact target surfaces (first to N-th contact target surfaces) exist in the mobile environment of the mobile object 201, and at least one movable link 203 of the mobile object 201 contacts each of the first to N-th contact target surfaces in an arbitrary motion state of the mobile object 201.

In this case, the above-mentioned matter relating to the i-th contact target surface applies to each of the first to N-th contact target surfaces.

In such a state where any of the movable links 203 of the mobile object 201 contacts each of the N contact target surfaces, when the perturbation total contact force $\uparrow \Delta FMt(i)$ of a certain value relating to the i-th contact target surface (i=1, 2, . . . , N) is given as a required manipulation amount for realizing a required state of the mobile object 201, $\uparrow \Delta FMt(i)$ can be converted to a required value of the spring translational/rotational displacement amount $\uparrow Xc(i)$ $(=[\uparrow Xc\_org(i), \uparrow Xc\_rot(i)]^T)$ of the i-th representative contact surface, according to the equations (55) and (56). This conversion is given by the following equation (78).

$$\uparrow Xc(i) = \begin{bmatrix} \uparrow Xc\_org(i) \\ \uparrow Xc\_rot(i) \end{bmatrix} \quad (78)$$

$$= \begin{bmatrix} Kc\_org(i)^{-1} & 0 \\ 0 & Kc\_rot(i)^{-1} \end{bmatrix} \cdot \uparrow \Delta FMt(i)$$

$$= \begin{bmatrix} Kc\_org(i)^{-1} & 0 \\ 0 & Kc\_rot(i)^{-1} \end{bmatrix} \cdot \begin{bmatrix} \uparrow \Delta Ft(i) \\ \uparrow \Delta Mt(i) \end{bmatrix}$$

A vector (column vector) formed by arranging the spring translational/rotational displacement amounts $\uparrow Xc(i)$ of the i-th representative contact surfaces (i=1, 2, ..., N) corresponding to the first to N-th contact target surfaces is set as an overall spring translational/rotational displacement amount $\uparrow Xc$ ($\equiv [\uparrow Xc(1), \uparrow Xc(2), \ldots, \uparrow Xc(N)]^T$), and a matrix (column vector) formed by arranging the i-th representative contact surface Jacobian matrices Jc(i) (i=1, 2, ..., N) corresponding to the first to N-th contact target surfaces is set as an overall Jacobian matrix Jc [Jc(1), Jc(2), ..., Jc(N)]$^T$). A relation between $\uparrow Xc$ and the temporal change rate $\uparrow \Delta q2$ of the generalized variable vector $\uparrow q2$ is given by the following equation (79).

$$\uparrow Xc = Jc \cdot \uparrow \Delta q2 \quad (79)$$

where $$\uparrow Xc \equiv \begin{bmatrix} \uparrow Xc(1) \\ \uparrow Xc(2) \\ \vdots \\ \uparrow Xc(N) \end{bmatrix}$$

$$Jc \equiv \begin{bmatrix} Jc(1) \\ Jc(2) \\ \vdots \\ Jc(N) \end{bmatrix}$$

Let $Jc^{-1}$ be a pseudo inverse matrix of the overall Jacobian matrix Jc. The amount of correction of the displacement amount of each joint of the mobile object 201 for realizing the required value of the perturbation total contact force $\uparrow \Delta FMt(i)$ (i=1, 2, ..., N) of each of the first to N-th contact target surfaces can be determined from the required value of the overall spring translational/rotational displacement amount $\uparrow Xc$ formed by arranging the required values of the spring translational/rotational displacement amounts $\uparrow Xc(i)$ of the i-th representative contact surfaces (i=1, 2, ..., N) corresponding to the first to N-th contact target surfaces, according to the following equation (80).

$$\uparrow \Delta q2 = Jc^{-1} \cdot \uparrow Xc \quad (80)$$

where $$\uparrow Xc \equiv \begin{bmatrix} \uparrow Xc(1) \\ \uparrow Xc(2) \\ \vdots \\ \uparrow Xc(N) \end{bmatrix}$$

$$Jc \equiv \begin{bmatrix} Jc(1) \\ Jc(2) \\ \vdots \\ Jc(N) \end{bmatrix}$$

Hence, when the required value of the perturbation total contact force $\uparrow \Delta FMt(i)$ is given as the required manipulation amount for controlling the total contact force acting on the mobile object 201 from the i-th contact target surface in the arbitrary motion state of the mobile object 201, the i-th representative contact surface Jacobian matrix Jc(i) is calculated according to the equation (77), and the pseudo inverse matrix $Jc^{-1}$ of the overall Jacobian matrix Jc composed of Jc(i) (i=1, 2, ... N) is determined.

The spring translational/rotational displacement amount $\uparrow Xc(i)$ of the i-th representative contact surface corresponding to the required value of $\uparrow \Delta FMt(i)$ is then calculated according to the equation (78). From the representative contact surface overall spring translational/rotational displacement amount $\uparrow Xc$ composed of $\uparrow Xc(i)$ and the pseudo inverse matrix $Jc^{-1}$ of the overall Jacobian matrix Jc, the amount of correction of the displacement amount of each joint for realizing every required value of the perturbation total contact force $\uparrow \Delta FMt(i)$ (i=1, 2, ..., N) can be collectively determined according to the equation (80).

Therefore, the displacement amount of each joint can be collectively determined without determining the amount of correction of the position and posture of the distal end of each movable link 203_j individually.

The above describes a third technical matter on which the present invention is based. Thus, the first technical matter described earlier with regard to the first invention (in the case where the mobile object 101 receives a floor reaction force) can be extended to the third technical matter concerning the case where the mobile object 202 receives a contact force (reaction force) not only from a floor surface but from a plurality of contact target surfaces.

The following describes the present invention in the case where a mobile object receives a reaction force from a plurality of contact target surfaces, on the basis of the above description.

A mobile object controller according to the present invention is a mobile object controller which performs motion control of a mobile object according to a desired motion and a desired total contact force, the mobile object including a body, a plurality of movable links connected to the body, and a joint actuator which drives a joint of each movable link, the desired motion being for moving the mobile object while at least one movable link contacts each of first to N-th contact target surfaces which are a plurality of mutually different contact target surfaces existing in a mobile environment of the mobile object where N is an integer equal to or more than 2, and the desired total contact force being a desired value of a total contact force to be applied to the mobile object from each of the first to N-th contact target surfaces to realize the desired motion, the mobile object controller comprising: a total contact force required correction amount determination element configured to determine an i-th total contact force required correction amount according to an error between an observed value of a total contact force actually acting on the mobile object from an i-th contact target surface and a desired total contact force corresponding to the i-th contact target surface where i=1, 2, ..., N, the i-th total contact force required correction amount being a required correction amount of the total contact force to be additionally applied to the mobile object from the i-th contact target surface so that the error approaches zero, the i-th contact target surface being each of the first to N-th contact target surfaces; a representative contact surface position/posture displacement amount calculation element configured to calculate, from the determined i-th total contact force required correction amount and a predetermined spring constant of an i-th representative contact surface corresponding to the i-th contact target surface where i=1, 2, ..., N, a required displacement amount of a position and posture of the i-th representative contact surface based on an assumption that the i-th total contact force required correction amount is generated by a spring displacement of the position and posture of the i-th representative contact surface, the i-th representative contact surface being a single virtual contact surface representative of all contact surfaces between the mobile object and the i-th contact target surface; a representative contact surface Jacobian matrix calculation element configured to calculate an i-th representative contact surface Jacobian matrix Jc(i) according to the equation (77) from a movable link Jacobian matrix J(i)_j for each movable link in an i-th contact movable link group where i=1, 2, ..., N, the spring constant of the i-th representative contact surface, a relative position of an actual contact force central point of a contact portion of each movable link in the i-th contact movable link group relative to a total contact force central point, and a contact force actually acting on each movable link in the i-th contact movable link group, the i-th representative contact surface Jacobian matrix Jc(i) being a Jacobian matrix representing a relation between a temporal change rate of the position and posture of the i-th representative contact surface and a temporal change rate of a generalized variable vector whose components are a position and posture of the body and a displacement amount of each joint of the mobile object, the movable link Jacobian matrix J(i)_j being a Jacobian matrix representing a relation between a temporal change rate of a position of a contact portion of the movable link in the i-th contact movable link group or a temporal change rate of a position and posture of the contact portion of the movable link in the i-th contact movable link group and the temporal change rate of the generalized variable vector, the total contact force central point being an acting point of the total contact force actually acting on the mobile object from the i-th contact target surface, and the i-th contact movable link group being a group of movable links contacting the i-th contact target surface; a joint displacement correction amount determination element configured to determine a joint displacement correction amount by multiplying an overall required displacement amount by a pseudo inverse matrix $Jc^{-1}$ of an overall Jacobian matrix Jc, the joint displacement correction amount being a correction amount of the displacement amount of each joint of the mobile object for realizing the required displacement amount of the position and posture of each of the first to N-th representative contact surfaces, the overall required displacement amount being formed by arranging calculated required displacement amounts of positions and postures of first to N-th representative contact surfaces, and the overall Jacobian matrix Jc being formed by arranging calculated first to N-th representative contact surface Jacobian matrices Jc(i) where i=1, 2, ..., N; and a joint displacement control element configured to control the joint actuator according to a corrected desired joint displacement amount obtained by correcting a desired joint displacement amount by the determined joint displacement correction amount, the desired joint displacement amount being the displacement amount of each joint of the mobile object defined by the desired motion of the mobile object (tenth invention).

The equation (77) and the meanings of the variables of the equation (77) are as follows.

$$Jc(i) = \sum_{j=1}^{m(i)} (r(i)\_j \cdot A(i)\_j \cdot J(i)\_j) \quad (77)$$

where
Jc(i) is an i-th representative contact surface Jacobian matrix,
j is an identification number of each movable link belonging to the i-th contact movable link group,
m(i) is a total number of movable links belonging to the i-th contact movable link group,
r(i)_j is a weight coefficient of a j-th movable link in the i-th contact movable link group determined by the following equation (77-1), $$r(i)\_j = Fn(i)\_j/(j) \quad (77\text{-}1)$$

Fn(i)_j is a normal force component of a contact force acting on the j-th movable link in the i-th contact movable link group,
A(i)_j is a matrix defined by the following equation (77-2), $$A(i)\_j \equiv \begin{bmatrix} I & 0 \\ Rk(i) \cdot VV(i)\_j & I \end{bmatrix} \quad (77\text{-}2)$$

Rk(i) is a coefficient matrix defined by the following equation (77-3), $$Rk(i) = Kc(i)\_rot^{-1} \cdot Kc(i)\_org \quad (77\text{-}3)$$

Kc(i)_org is a spring constant matrix relating to a translational displacement of the position of the i-th representative contact surface,
Kc(i)_rot is a spring constant matrix relating to a rotational displacement of the posture of the i-th representative contact surface,
VV(i)_j is a matrix such that VV(i)_j·↑F(i)_j=↑V(i)_j×↑F(i)_j,
↑F(i)_j is a contact force vector acting on the j-th movable link in the i-th contact movable link group,
↑V(i)_j is a position vector of a contact force central point of a contact portion of the j-th movable link in the i-th contact movable link group relative to the total contact force central point of the i-th contact target surface, and
J(i)_j is a movable link Jacobian matrix of the j-th movable link in the i-th contact movable link group.

In the tenth invention, the plurality of different contact target surfaces existing in the mobile environment of the mobile object are a plurality of contact target surfaces of which two arbitrary contact target surfaces (or planes respectively containing the two contact target surfaces) intersect with each other or face each other in parallel or substantially in parallel with a space therebetween.

Here, each contact target surface does not need to be a surface (such as an ordinary floor surface) having a larger area than the contact area of the movable link, and may be, for example, a local surface whose area is equal to or smaller than the contact area of the movable link.

According to the tenth invention, the total contact force required correction amount determination element determines each i-th total contact force required correction amount (i=1, 2, ..., N) by which the error between the observed value of the total contact force (hereafter also referred to as an actual total contact force) actually acting on the mobile object from the i-th contact target surface (i=1, 2, ..., N) and the desired total contact force corresponding to the i-th contact target surface approaches zero. That is, for each contact target surface, the i-th total contact force required correction amount is determined as a feedback manipulation amount (control input) by which the actual total contact force follows the desired total contact force. This i-th total contact force required correction amount corresponds to the required value of the perturbation total contact force ↑ΔFMt(i) (i=1, 2, ..., N) corresponding to the i-th contact target surface.

The total contact force acting on the mobile object from the i-th contact target surface (i=1, 2, ..., N) means a total reaction force which the mobile object receives from the i-th contact target surface when at least one movable link of the mobile object contacts the i-th contact target surface.

The desired total contact force in the tenth invention is, for instance, set as a desired value of a contact force (reaction force) acting on the mobile object from a supposed contact target surface as a model of each actual contact target surface. For example, the desired total contact force of each contact target surface may be generated so that their resultant force satisfies a kinetic relation of an appropriate kinetic model for the desired motion of the mobile object (e.g. a kinetic relation in which the resultant force of the desired total contact forces is balanced with a resultant force of gravity acting on the mobile object and an inertial force generated by the desired motion of the mobile object).

Alternatively, the desired total contact force may be a result of correcting a reference total contact force of each contact target surface, which is generated so as to satisfy the kinetic relation for the desired motion of the mobile object, according to an error between a desired value and an actual value of a predetermined state quantity relating to the motion of the mobile object (state quantity such as a position of an overall center of gravity of the mobile object, each momentum about the overall center of gravity, or a change rate of such position or momentum) so that the error approaches zero.

Basically, the desired total contact force may be set in any manner, so long as the desired motion of the mobile object is kinetically feasible.

In the tenth invention, the representative contact surface position/posture displacement amount calculation element calculates the required displacement amount of the position and posture of the i-th representative contact surface (i=1, 2, ..., N) corresponding to the determined i-th total contact force required correction amount.

Thus, the i-th total contact force required correction amount as the feedback manipulation amount (control input) by which the actual total contact force follows the desired total contact force is converted to the required displacement amount of the position and posture of the i-th representative contact surface as a single virtual surface corresponding to the i-th contact target surface.

Here, the displacement amount of the position and posture of the i-th representative contact surface corresponds to the spring translational/rotational displacement amount ↑Xc(i). ↑Xc(i) has the relation of the equation (73) represented by the i-th representative contact surface Jacobian matrix Jc(i), with the change amount ↑Δq2 of the generalized variable vector ↑q2 per unit time.

Moreover, the overall spring translational/rotational displacement amount ↑Xc formed by arranging the displacement amounts (spring translational/rotational displacement amounts ↑Xc(i)) of the positions and postures of the first to N-th representative contact surfaces has the relation of the equation (79) represented by the overall Jacobian matrix Jc formed by arranging the representative contact surface Jacobian matrices Jc(1) to Jc(N), with the change amount ↑Δq2 of the generalized variable vector ↑q2 per unit time.

Accordingly, by multiplying, by the pseudo inverse matrix $Jc^{-1}$ of the overall Jacobian matrix Jc, the overall required displacement amount (required value of the overall spring translational/rotational displacement amount ↑Xc) formed by arranging the required displacement amounts of the positions and postures of the i-th representative contact surfaces corresponding to the first to N-th total contact force required correction amount (i.e. according to the equation (80)), the joint displacement correction amount of the mobile object for realizing the overall required displacement amount (and realizing the first to N-th total contact force required correction amounts) can be determined.

Hence, in the tenth invention, the representative contact surface Jacobian matrix calculation element calculates the i-th representative contact surface Jacobian matrix Jc(i) (i=1, 2, ..., N). The i-th representative contact surface Jacobian matrix Jc(i) is calculated according to the equation (77), from each movable link Jacobian matrix J(i)_j which is the Jacobian matrix representing the relation between the temporal change rate of the position of the contact portion of each movable link in the i-th contact movable link group which is the group of movable links in contact with the i-th contact target surface or the temporal change rate of the position and posture of the contact portion of each movable link in the i-th contact movable link group and the temporal change rate of the generalized variable vector, the spring constant of the i-th representative contact surface, the relative position of the actual contact force central point of the contact portion of each movable link in the i-th contact movable link group relative to the total contact force central point as the acting point of the total contact force actually acting on the mobile object, and the value of the contact force actually acting on each movable link in the i-th contact movable link group.

Here, the total contact force central point on the i-th contact target surface is a point where the component about the axis parallel to the i-th contact target surface in the moment (contact force moment) generated about the point by the total contact force acting on the mobile object from the i-th contact target surface is zero.

Likewise, the contact force central point of the contact portion of each movable link in the i-th contact movable link group is a point where the component about the axis parallel to the i-th contact target surface in the moment (contact force moment) generated about the point by the contact force acting on the mobile link from the i-th contact target surface is zero.

For example, the value of the contact force actually acting on each movable link, the position of the contact force acting point, and the position of the total contact force acting point used for the calculation of the equation (77) may be observed values obtained by measurement by a force sensor or the like mounted in the mobile object. Alternatively, the value of the contact force and the acting point positions may be approximately estimated or predicted based on the desired contact force, an appropriate model, and the like, so long as the actual values can be accurately approximated.

Regarding the movable link Jacobian matrix J(i)_j, each movable link may be any of a movable link of a structure where the contact force moment acting on the contact portion on the contact target surface (moment about the acting point on the contact surface between the contact portion and the contact target surface) can be changed (e.g. a movable link whose contact portion contacts the contact target surface in a surface contact state, and can be changed in posture by an actuator) and a movable link of a structure where the contact force moment acting on the contact portion cannot be changed (e.g. a movable link whose contact portion contacts the contact target surface in a point contact state).

In the case where each movable link has the structure where the contact force moment on the contact portion can be changed, the movable link Jacobian matrix is a Jacobian matrix representing the relation between the temporal change rate of the position and posture of the contact portion of the movable link and the temporal change rate of the generalized variable vector.

In the case where each movable link has the structure where the contact force moment on the contact portion cannot be changed, on the other hand, the movable link Jacobian matrix is a Jacobian matrix representing the relation between the temporal change rate of the position of the contact portion of the movable link and the temporal change rate of the generalized variable vector.

These movable link Jacobian matrices can be calculated by a known method based on the observed value of the actual displacement amount of each joint of the mobile object.

In the tenth invention, the joint displacement correction amount determination element determines the joint displacement correction amount, by multiplying the overall required displacement amount formed by arranging the required displacement amounts of the positions and postures of the i-th representative contact surfaces by the pseudo inverse matrix $Jc^{-1}$ of the overall Jacobian matrix Jc formed by arranging the i-th representative contact surface Jacobian matrices Jc(i) calculated as described above. As a result, the joint displacement correction amount for realizing the first to N-th total contact force required correction amounts is determined.

The joint displacement control element then controls the joint actuator according to the corrected desired joint displacement amount obtained by correcting, by the joint displacement correction amount determined as described above, the desired joint displacement amount which is the displacement amount of each joint of the mobile object defined by the desired motion of the mobile object.

Thus, in the motion state where the mobile object contacts the plurality of contact target surfaces, the displacement amount of each joint of the mobile object is controlled so that the actual total contact force follows the desired total contact force for each contact target surface, thereby achieving compliance control for all contact target surfaces (first to N-th contact target surfaces).

According to the tenth invention, the i-th total contact force required correction amount for each contact target surface is converted to the required displacement amount of the position and posture of the i-th representative contact surface corresponding to the contact target surface. The joint displacement correction amount of each joint of the mobile object is then calculated from the overall required displacement amount formed by arranging these required displacement amounts, using the pseudo inverse matrix $Jc^{-1}$ of the overall Jacobian matrix. Hence, it is possible to collectively determine the amount of correction (joint displacement correction amount) of the displacement amount of each joint of the mobile object so that the actual total contact force follows the desired total contact force for each contact target surface, without executing a process of determining the amount of correction of the position and posture of the contact portion of the movable link on each contact target surface in consideration of the relation between the correction of the position and posture of the contact portion of the movable link on the contact target surface and the change of the actual total contact force or the interrelation between these factors. As a result, the process of determining the joint displacement correction amount can be efficiently performed in a short time.

Here, the weight coefficient r(i)_j of each movable link (each movable link in the i-th contact movable link group) in the equation (77) is set so that the movable link whose contact surface normal force component of the contact force is larger has a larger weight coefficient (closer to "1"). This means the i-th total contact force required correction amount is shared by each movable link in the i-th contact movable link group in such a manner that the movable link whose contact surface normal force component is larger has a larger correction amount. Accordingly, it is possible to determine such a joint displacement correction amount that ensures the first to N-th total contact force required correction amounts without needlessly correcting the position or posture of the contact portion of any movable link whose contact surface normal force component is relatively small.

In addition, since the weight coefficient r(i)_j of each movable link in the i-th contact movable link group continuously changes, the i-th representative contact surface Jacobian matrix Jc(i) has no discontinuous change. As a result, the displacement amount of each joint of the mobile object can be continuously changed smoothly. This enables the mobile object to move smoothly.

Therefore, according to the tenth invention, it is possible to perform appropriate motion control of the mobile object moving in contact with the plurality of contact target surfaces so that the total contact force actually acting on the mobile object from each contact target surface follows the desired value, with no need for a process of determining the amount of correction of the position and posture of each contact portion of the mobile object with the contact target surface from the desired motion.

In the tenth invention, the total contact force required correction amount determination element is configured to determine the i-th total contact force required correction amount by integrating the error on the i-th contact target surface where i=1, 2, . . . , N (eleventh invention).

More preferably, the total contact force required correction amount determination element is configured to determine the i-th total contact force required correction amount, by combining at least a proportional term proportional to the error and an integral term obtained by integrating the error on the i-th contact target surface, where i=1, 2, . . . , N (twelfth invention).

The error between the observed value of the total contact force (actual total contact force) actually acting on the mobile object from each contact target surface and the desired total contact force includes a steady-state error caused by a steady-state deviation of the whole position and posture of the actual contact target surface from the supposed contact target surface supposed upon generating the desired motion and a temporary error caused by the actual contact target surface's local unevenness or the like which is not included in the supposed contact target surface.

According to the eleventh invention, it is possible to compensate for the steady-state error. According to the twelfth invention, it is possible to compensate for the steady-state error by the integral term, and also compensate for the temporary error by the proportional term.

In the twelfth invention, for example, the i-th total contact force required correction amount may be determined by combining only the proportional term and the integral term. Alternatively, the i-th total contact force required correction amount may be determined by combining not only the proportional term and the integral term but also another term such as a derivative term.

In the eleventh or twelfth invention, the integral (hereafter denoted by $\uparrow\Delta FMt(i)\_int$) of the error between the observed value of the actual total contact force and the desired total contact force on the i-th contact target surface (i=1, 2, ..., N) is related to a steady-state difference between the position and posture of the supposed i-th contact target surface supposed in the desired motion of the mobile object in correspondence with the i-th contact target surface and the position and posture of the actual i-th contact target surface. This suggests that $\uparrow Xc(i)$ calculated by converting the integral $\uparrow\Delta FMt(i)$ int of the error according to the equation (78), i.e. $\uparrow Xc(i)$ int calculated from $\uparrow\Delta FMt(i)\_int$ according to the following equation (78-1), corresponds to the steady-state error between the position and posture of the supposed i-th contact target surface and the position and posture of the actual i-th contact target surface.

$$\uparrow Xc(i)\_int = \begin{bmatrix} \uparrow Xc\_org(i)\_int \\ \uparrow Xc\_rot(i)\_int \end{bmatrix} \quad (78\text{-}1)$$
$$= \begin{bmatrix} Kc\_org(i)^{-1} & 0 \\ 0 & Kc\_rot(i)^{-1} \end{bmatrix} \cdot \uparrow\Delta FMt(i)\_int$$
$$= \begin{bmatrix} Kc\_org(i)^{-1} & 0 \\ 0 & Kc\_rot(i)^{-1} \end{bmatrix} \cdot \begin{bmatrix} \uparrow\Delta Ft(i)\_int \\ \uparrow\Delta Mt(i)\_int \end{bmatrix}$$

In the equation (78-1), a translational displacement amount component and a rotational displacement amount component of $\uparrow Xc(i)$ int are respectively denoted by $\uparrow Xc\_org(i)\_int$ and $\uparrow Xc\_rot(i)\_int$, and a translational force component and a moment component of $\uparrow\Delta FMt(i)\_int$ are respectively denoted by $\uparrow\Delta Ft(i)\_int$ and $\uparrow\Delta Mt(i)\_int$.

Therefore, the position and posture of the actual i-th contact target surface can be estimated by correcting the position and posture of the supposed i-th contact target surface by $\uparrow Xc(i)$ int.

Note that the position and posture of the supposed i-th contact target surface or the actual i-th contact target surface are the position and posture of the i-th contact target surface in or near the contact surface between the movable link (each movable link in the i-th contact movable link group) of the mobile object and the i-th contact target surface.

In view of this, in the eleventh invention, the mobile object controller may further comprise a contact target surface estimation element configured to estimate a position and posture of an actual h-th contact target surface by correcting a position and posture of a supposed h-th contact target surface according to a required displacement amount of an h-th representative contact surface calculated by the representative contact surface position/posture displacement amount calculation element, the supposed h-th contact target surface being a contact target surface supposed in the desired motion in correspondence with an h-th contact target surface which is a predetermined specific contact target surface of the first to N-th contact target surfaces (thirteenth invention).

Moreover, in the twelfth invention, the mobile object controller may further comprise a contact target surface estimation element configured to estimate a position and posture of an actual h-th contact target surface by correcting a position and posture of a supposed h-th contact target surface, the supposed h-th contact target surface being a contact target surface supposed in the desired motion in correspondence with an h-th contact target surface which is a predetermined specific contact target surface of the first to N-th contact target surfaces, wherein the contact target surface estimation element is configured to estimate the position and posture of the actual h-th contact target surface by: calculating an h-th representative contact surface steady-state displacement amount from an integral term included in an h-th total contact force required correction amount corresponding to the h-th contact target surface and a spring constant of an h-th representative contact surface corresponding to the h-th contact target surface; and correcting the position and posture of the supposed h-th contact target surface according to the h-th representative contact surface steady-state displacement amount, the h-th representative contact surface steady-state displacement amount being a displacement amount of a position and posture of the h-th representative contact surface corresponding to the integral term (fourteenth invention).

In the thirteenth and fourteenth inventions, the h-th contact target surface may be one or a part of the first to N-th contact target surfaces, or all of the first to N-th contact target surfaces.

In the thirteenth invention, in a state where compliance control is performed on the mobile object as described above, the h-th total contact force required correction amount determined by the total contact force required correction amount determination element for the h-th contact target surface which is an arbitrary one of the first to N-th contact target surfaces is the integral (integral term) of the error between the observed value of the actual total contact force and the desired total contact force on the h-th contact target surface. Therefore, the required displacement amount of the position and posture of the h-th representative contact surface calculated by the representative contact surface position/posture displacement amount calculation element from the h-th total contact force required correction amount and the spring constant of the h-th representative contact surface corresponds to the steady-state difference between the position and posture of the supposed h-th contact target surface which is the h-th contact target surface supposed in the desired motion and the position and posture of the actual h-th contact target surface. That is, the required displacement amount corresponds to $\uparrow Xc(k)\_int$ in the equation (78-1).

Hence, in the thirteenth invention, the position and posture of the actual h-th contact target surface can be estimated by correcting the position and posture of the supposed h-th contact target surface according to the required displacement amount of the h-th representative contact surface calculated by the representative contact surface position/posture displacement amount calculation element.

In the fourteenth invention, in a state where compliance control is performed on the mobile object as described above, the displacement amount (displacement amount of the position and posture of the h-th representative contact surface calculated using the integral term instead of the h-th total contact force required correction amount) of the position and posture of the h-th representative contact surface calculated by the same calculation as the representative contact surface position/posture displacement amount calculation element from the spring constant of the h-th representative contact surface and the integral term of the h-th total contact force required correction amount determined by the total contact force required correction amount determination element for the h-th contact target surface as one arbitrary contact target surface corresponds to the steady-state difference between the position and posture of the supposed h-th contact target surface and the position and posture of the actual h-th contact target surface, namely, $\uparrow Xc(k)\_int$ in the equation (78-1).

Hence, in the fourteenth invention, the position and posture of the actual h-th contact target surface can be estimated by calculating, from the integral term corresponding to the h-th total contact force required correction amount and the spring constant of the h-th representative contact surface, the h-th representative contact surface steady-state displacement amount corresponding to the integral term and correcting the position and posture of the supposed h-th contact target surface according to the h-th representative contact surface steady-state displacement amount.

Since the joint displacement correction amount that ensures the h-th total contact force required correction amount can be determined to control the motion of the mobile object by the above-mentioned compliance control, each of the h-th total contact force required manipulation amount in the thirteenth invention and the h-th representative contact surface steady-state displacement amount in the fourteenth invention reliably corresponds to the steady-state difference between the position and posture of the supposed h-th contact target surface and the position and posture of the actual h-th contact target surface. This enables the position and posture of the actual h-th contact target surface to be accurately estimated.

In the tenth to fourteenth inventions, the pseudo inverse matrix $Jc^{-1}$ of the overall Jacobian matrix Jc may be calculated by a known appropriate method. It is, however, desirable to determine the pseudo inverse matrix $Jc^{-1}$ by the same method as in the fifth invention.

That is, in the tenth to fourteenth inventions, preferably, the pseudo inverse matrix $Jc^{-1}$ of the calculated overall Jacobian matrix Jc is a matrix obtained according to the equation (30) from a weight matrix W set beforehand and the calculated overall Jacobian matrix Jc, wherein the mobile object controller further comprises a pseudo inverse matrix calculation parameter determination element configured to determine a value of k in the equation (30) so that a determinant DET expressed by the equation (31) is equal to or more than a predetermined positive threshold, and wherein the pseudo inverse matrix calculation parameter determination element is configured to: repeatedly perform a process of setting a provisional value of k by gradually increasing the provisional value from a predetermined initial value, calculating the determinant DET using the set provisional value, and determining whether or not an absolute value of the calculated determinant DET is equal to or more than the predetermined threshold, and determine the provisional value of k in the case where a result of the determination is true as the value of k used for calculating the pseudo inverse matrix $Jc^{-1}$ according to the equation (30); and set an increment of the provisional value of k in the case where the result of the determination is false, to a value proportional to an n-th root of an absolute value of an error between the absolute value of the determinant DET calculated using the provisional value before the increment and the predetermined threshold, where n is an order of $Jc \cdot W^{-1} \cdot Jc^T$ (fifteenth invention).

According to the fifteenth invention, the same advantageous effects as the fifth invention can be attained. That is, the appropriate value of k (the value of k such that the absolute value of DET is equal to or more than the predetermined threshold) used for calculating the pseudo inverse matrix $Jc^{-1}$ can be efficiently determined in a short time in each control cycle of the mobile object controller, and also the pseudo inverse matrix $Jc^{-1}$ can be changed smoothly. This allows the joint displacement correction amount to be determined so as to smoothly change the displacement amount of each joint of the mobile object.

Moreover, according to the fifteenth invention, the weight coefficient matrix W makes it possible to adjust, for each joint, the degree of correction of the displacement amount of the joint for realizing the required displacement amount of the position and posture of each representative contact surface in consideration of, for example, responsiveness of a change of the position and posture of the representative contact surface to a change of the displacement amount of the joint.

BRIEF DESCRIPTION OF THE DRAWINGS

FIG. 14 is a diagram showing an motion example of the mobile object shown in FIG. 10.

FIG. 15 is a diagram showing another example of the mobile object to which the present invention is applied.

FIG. 16 is a diagram showing another example of the mobile object to which the present invention is applied.

DESCRIPTION OF THE PREFERRED EMBODIMENTS

First Embodiment

The following describes a first embodiment of the present invention with reference to FIGS. 2 to 5.

Figure 1:
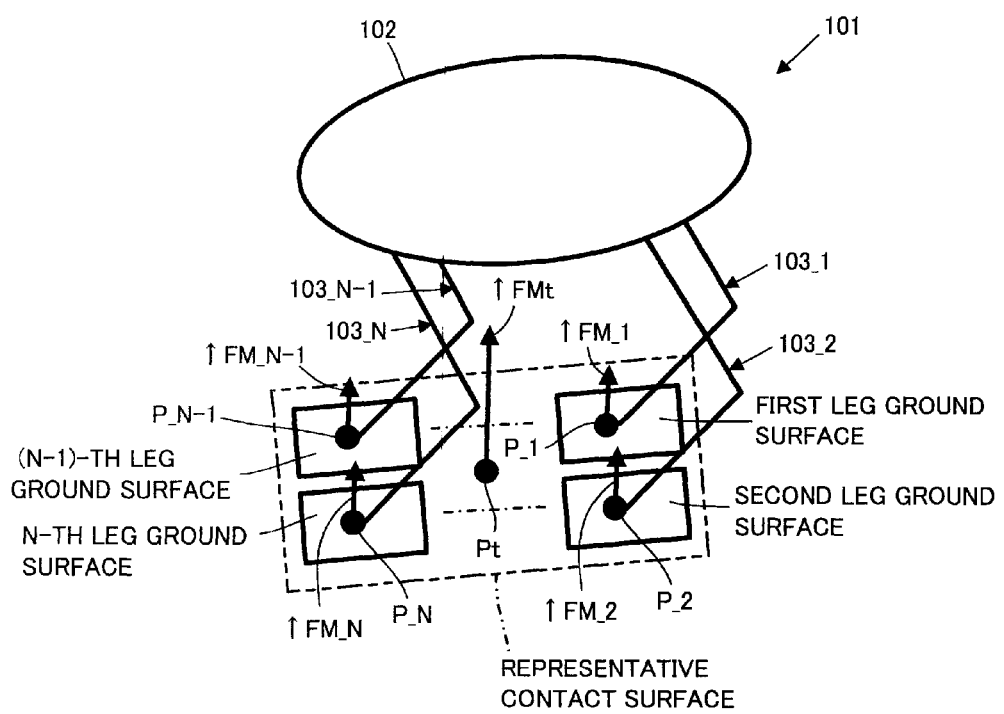
FIG. 1 is a diagram schematically showing a typical example of a mobile object for illustrating the present invention and a floor reaction force acting on the mobile object.
Figure 2:
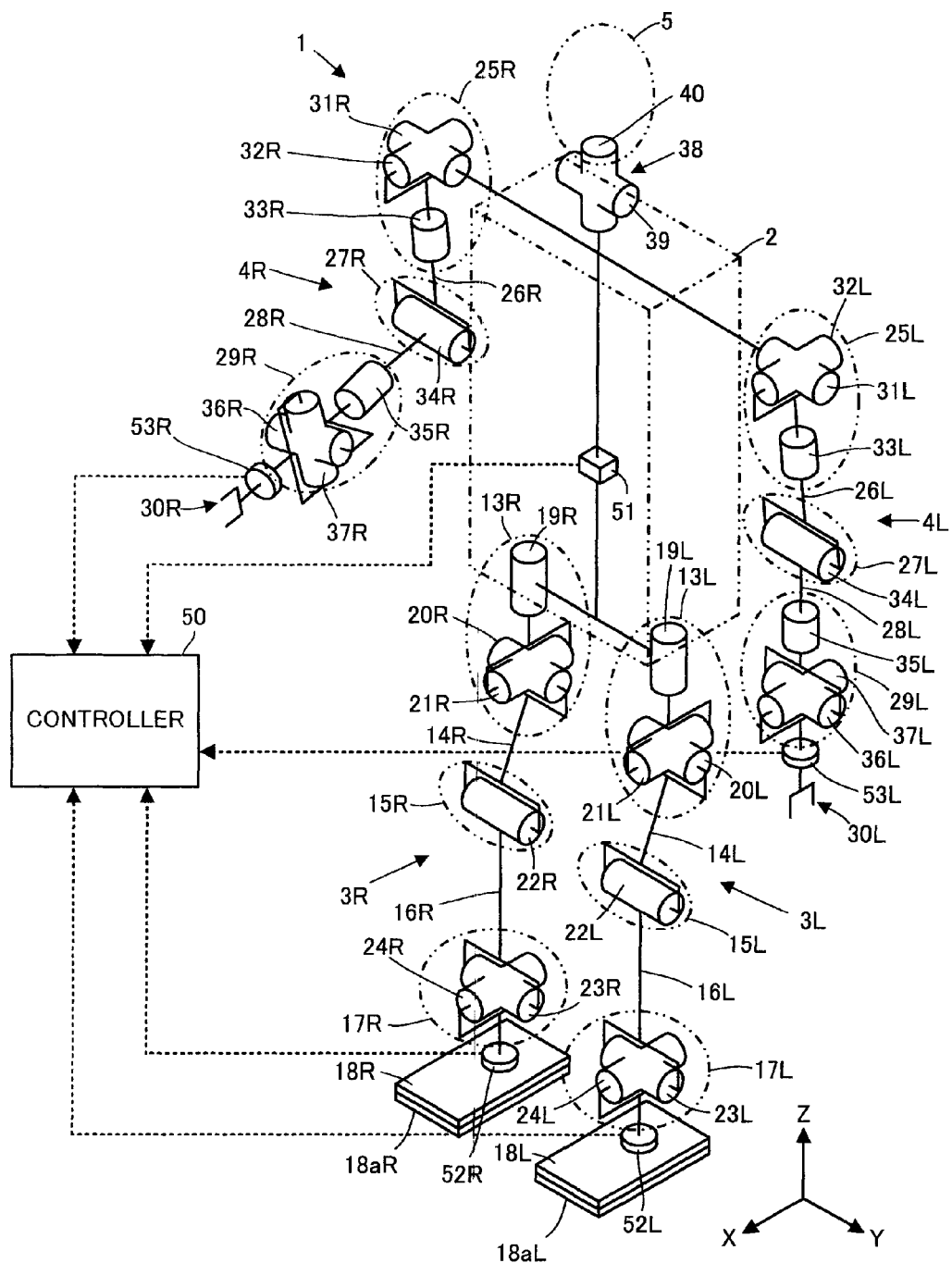
FIG. 2 is a diagram showing a schematic structure of a mobile object in first and second embodiments of the present invention.
Figure 3:
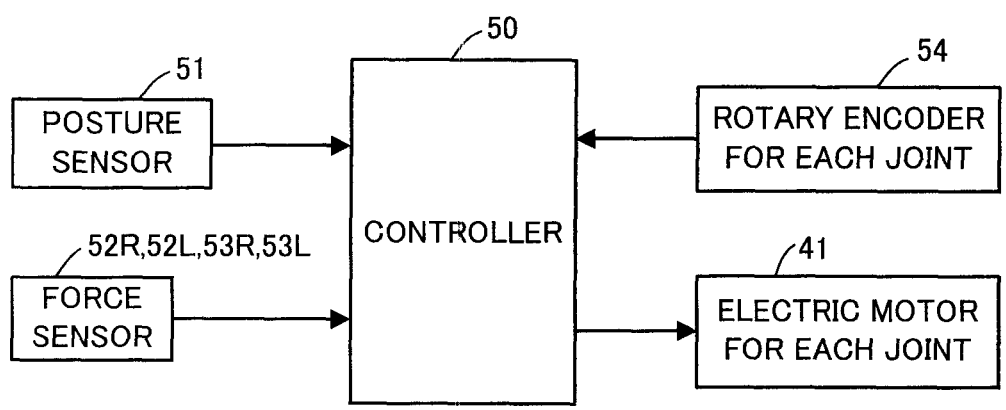
FIG. 3 is a block diagram showing a structure relating to control of the mobile object shown in FIG. 2.

In FIG. 2, a mobile object 1 exemplified in this embodiment is a legged mobile robot having two leg links as an example. The mobile object 1 includes an upper body 2 as a body, one pair of right and left leg links 3R and 3L, one pair of right and left arm links 4R and 4L, and a head 5.

In the description of this embodiment, the sign "R" is added to each variable indicating a member or a quantity related to the member on the right side of the mobile object 1 when the mobile object 1 is viewed from the rear, and the sign "L" is added to each variable indicating a member or a quantity related to the member on the left side of the mobile object 1 when the mobile object 1 is viewed from the rear. When it is not particularly necessary to distinguish right from left, however, the signs "R" and "L" may be omitted.

The pair of right and left leg links 3R and 3L have the same structure. In detail, each leg link 3 includes a thigh 14 connected to the upper body 2 via a hip joint 13, a crus 16 connected to the thigh 14 via a knee joint 15, and a foot 18 connected to the crus 16 via an ankle joint 17, as a plurality of element links constituting the leg link 3.

An elastic member 18a is attached to the bottom of the foot 18 which is a distal end of each leg link 3. When the mobile object 1 moves on a floor surface, each foot 18 grounds (lands) on the floor surface via the elastic member 18a.

In each leg link 3, the hip joint 13 is composed of three joints 19, 20, and 21 that have rotational freedom about a yaw axis (Z axis in FIG. 2), a pitch axis (Y axis in FIG. 2), and a roll axis (X axis in FIG. 2), respectively. The knee joint 15 is composed of a joint 22 that has rotational freedom about the pitch axis. The ankle joint 17 is composed of two joints 23 and 24 that have rotational freedom about the pitch axis and the roll axis, respectively.

Thus, in this embodiment, each leg link 3 has 6 degrees of freedom of movement relative to the upper body 2 (body). Note that the rotating axes (roll axis, pitch axis, and yaw axis) of the joints 19 to 24 of each leg link 3 in the above description are rotating axes in a state where the leg link 3 is vertically extended.

The pair of right and left arm links 4R and 4L have the same structure. In detail, each arm link 4 includes an upper arm 26 connected to the upper body 2 via a shoulder joint 25, a forearm 28 connected to the upper arm 26 via an elbow joint 27, and a hand 30 connected to the forearm 28 via a wrist joint 29, as a plurality of element links constituting the arm link 4.

The shoulder joint 25 is composed of three joints 31, 32, and 33 that have rotational freedom about the pitch axis, the roll axis, and the yaw axis, respectively. The elbow joint 27 is composed of a joint 34 that has rotational freedom about the pitch axis. The wrist joint 29 is composed of three joints 35, 36, and 37 that have rotational freedom about the yaw axis, the pitch axis, and the roll axis, respectively.

Thus, in this embodiment, each arm link 4 has 7 degrees of freedom of movement relative to the upper body 2. Note that the rotating axes (roll axis, pitch axis, and yaw axis) of the joints 31 to 37 of each arm link 4 in the above description are rotating axes in a state where the arm link 4 is vertically extended.

The head 5 is positioned above the upper body 2, and connected to the upper body 2 via a neck joint 38. The neck joint 38 is composed of two joints 39 and 40 that have rotational freedom about the pitch axis and the yaw axis, respectively. Thus, the head 5 has 2 degrees of freedom of movement relative to the upper body 2. Note that the rotating axes (pitch axis and yaw axis) of the joints 39 and 40 in the above description are rotating axes in a state where the neck joint 38 is vertically extended.

Though not shown in FIG. 2, the mobile object 1 is provided with a plurality of electric motors 41 (shown in FIG. 3) as joint actuators for driving the respective joints mentioned above. Each electric motor 41 is connected to the corresponding joint so as to transmit drive power (rotating drive power) through a power transmission mechanism (not shown) including a reducer.

Each joint actuator may be an actuator other than an electric motor, such as a hydraulic actuator.

In the mobile object 1 having the above-mentioned structure, each leg link 3 is spatially moved by driving the six joints 19 to 24 of the leg link 3 by the electric motors 41. This motion enables the mobile object 1 to move on the floor. For example, moving the leg links 3R and 3L in the same pattern (gait) as human walking enables the mobile object 1 to walk.

The mobile object 1 in this embodiment is a humanoid robot having the arm links 4R and 4L and the head 5. However, the mobile object may not have the arm links 4R and 4L or the head 5. Moreover, for example, the upper body 2 may be composed of a lower part and an upper part which are connected to each other via a joint.

In this embodiment, a controller 50 made of an electronic circuit unit including a CPU, a RAM, a ROM, and the like and various sensors are provided to perform motion control of the mobile object 1 having the above-mentioned structure.

As the sensors, a posture sensor 51 mounted in the upper body 2 for measuring a posture angle (one or both of an inclination angle in the vertical direction and an azimuth angle about the yaw axis) of the upper body 2 as the body of the mobile object 1, a temporal change rate (angular velocity) of the posture angle, or the like, a force sensor 52 (52R, 52L) disposed between the ankle joint 24 and the foot 18 of each leg link 3 for measuring an external force (floor reaction force) acting on the foot 18 when grounded, and a force sensor 53 (53R, 53L) disposed between the wrist joint 29 and the hand 30 of each arm link 4 for measuring an external force acting on the hand 30 from its contact target object are provided as shown in FIG. 2.

The posture sensor 51 is composed of, for example, a gyroscope for detecting an angular velocity about the three axes and an accelerometer for detecting acceleration in the directions of the three axes. Each of the force sensors 52 and 53 is composed of, for example, a six-axis force sensor for detecting a translational force in the directions of the three axes and a moment about the three axes.

Since the output of the force sensor 53 (53R, 53L) of each arm link 4 is unnecessary for the walking motion of the mobile object 1 mainly described in this embodiment, the force sensor 53 may be omitted.

Though not shown in FIG. 2, the mobile object 1 is also provided with, for example, a rotary encoder 54 (shown in FIG. 3) as a sensor for detecting the amount of displacement (rotating angle) of each joint. Alternatively, another sensor such as a potentiometer may be used as the sensor for detecting the amount of displacement (rotating angle) of each joint.

The output of each of the above-mentioned sensors is input to the controller 50. Through the use of observed values (such as a measured value of the posture angle of the upper body 2 or its temporal change rate (angular velocity), a measured value of the moving velocity of the upper body 2, a measured value of the floor reaction force acting on each foot 18, and a measured value of the amount of displacement of each joint or its temporal change rate) of a motion state of the mobile object 1 recognized from these input values, the controller 50 determines a desired value (hereafter referred to as a joint displacement command) of the amount of displacement of each joint for realizing a desired motion of the mobile object 1. The controller 50 controls the actual amount of displacement (actual displacement amount) of each joint via the corresponding electric motor 41, according to the joint displacement command.

Figure 4:
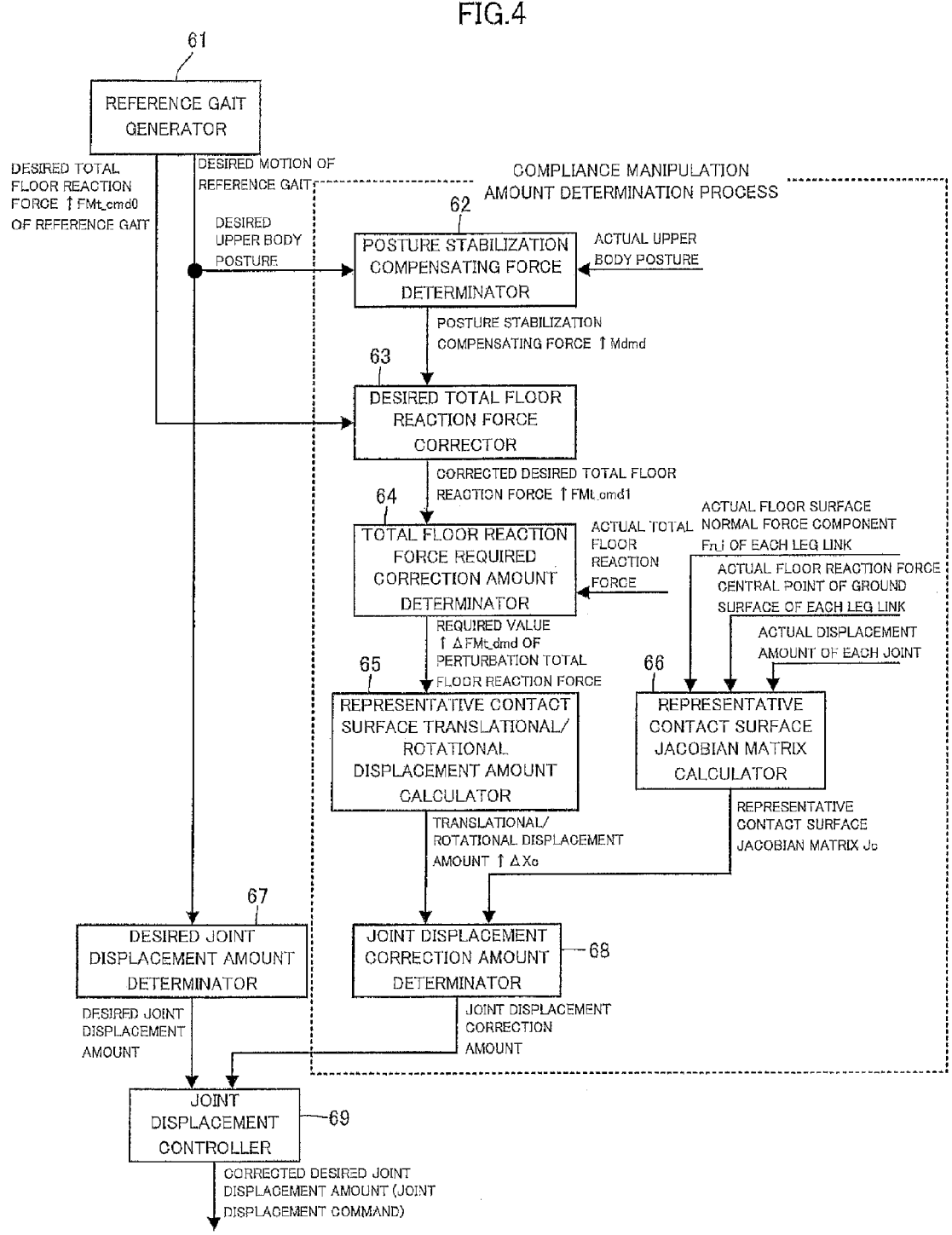
FIG. 4 is a block diagram showing functions of a controller shown in FIG. 2 in the first embodiment.

To execute such control, the controller 50 includes, as main functions realized by an implemented program, a reference gait generator 61, a posture stabilization compensating force determinator 62, a desired total floor reaction force corrector 63, a total floor reaction force required correction amount determinator 64, a representative contact surface translational/rotational displacement amount calculator 65, a representative contact surface Jacobian matrix calculator 66, a desired joint displacement amount determinator 67, a joint displacement correction amount determinator 68, and a joint displacement controller 69, as shown in FIG. 4.

The controller 50 sequentially executes the processes of these functional units in a predetermined processing cycle, thereby sequentially determining the joint displacement command of each joint. The controller 50 controls the corresponding electric motor 41 via a motor drive circuit not shown, according to the joint displacement command.

The controller 50 may include a plurality of CPUs. Moreover, the controller 50 may not be a single unit. For instance, the controller 50 may be made up of a plurality of units each of which includes a CPU, a processor, or the like.

All or part of the above-mentioned functional units of the controller 50 may be realized by hardware.

The following describes the control process of the controller 50 including the detailed process of each of the functional units, using an example where the mobile object 1 performs a walking motion.

[Process of the Reference Gait Generator 61]

In this embodiment, the controller 50 generates a reference gait as a reference desired gait of the mobile object 1 by the reference gait generator 61.

The reference gait includes a desired motion defining a trajectory of a spatial position and spatial posture (spatial orientation) desired for each portion of the mobile object 1 (thus defining a trajectory of a displacement amount desired for each joint of the mobile object 1), and a desired total floor reaction force defining a trajectory of a floor reaction force total (total floor reaction force) to be applied to the mobile object 1 from a floor surface. The term "trajectory" means time series of an instantaneous value.

The desired motion of the reference gait is generated so as to enable the mobile object 1 to move on a supposed floor surface. The supposed floor surface is a floor surface model whose shape is set beforehand to match or approximate a shape (position and posture of each floor surface portion) of an actual floor surface in the mobile environment of the mobile object 1.

In the mobile object 1 in this embodiment, the desired motion includes: a desired foot position/posture trajectory which is a trajectory of a desired position and desired posture of the foot 18 of each leg link 3; a desired upper body position/posture trajectory which is a trajectory of a desired position and desired posture of the upper body 2 (body); a desired arm posture trajectory which is a trajectory of a desired whole posture of each arm link 4 relative to the upper body 2; and a desired head posture trajectory which is a trajectory of a desired posture of the head 5 relative to the upper body 2.

Here, the "position" of the foot 18 means a position of a representative point (e.g. a point of a specific position of the bottom of the foot 18) of the foot 18 arbitrarily set to represent a spatial position of the foot 18. The same applies to the "position" of the upper body 2. The "posture" of the foot 18 means a spatial orientation of the foot 18. The same applies to the "posture" of the upper body 2.

The desired foot position and posture and the desired upper body position and posture are expressed as a position and a posture in a global coordinate system as an inertial coordinate system fixed with respect to the floor surface. As the global coordinate system, a supporting leg coordinate system whose origin is a point in a ground surface (a contact surface with the floor) of one leg link 3 as a supporting leg (leg that supports the gravity of the mobile object 1 on the floor) of the mobile object 1, whose X axis is a horizontal axis in the front-back direction of the foot 18 of the leg link 3, whose Z axis is an axis in the vertical direction, and whose Y axis is a horizontal axis in a direction orthogonal to the X axis and the Z axis is used as an example.

In this case, in the walking motion of the mobile object 1, the position of the origin and the directions of the X axis and the Y axis of the global coordinate system are updated each time the supporting leg changes. Alternatively, the global coordinate system may be, for example, a coordinate system steadily fixed with respect to the floor surface. In the following description, unless otherwise specified, the X axis, the Y axis, and the Z axis denote the three axes of the supporting leg coordinate system, for convenience's sake.

In this embodiment, the reference gait generator 61 generates the constituents of the desired motion such as the desired foot position/posture trajectory, by a known gait generation method such as the method proposed by the applicant of the present application in Japanese Patent No. 3726081 and the like.

In detail, in the desired motion for realizing the walking motion of the mobile object 1, the desired arm posture trajectory and the desired head posture trajectory are determined so that, for example, the desired arm posture and the desired head posture relative to the upper body 2 are steadily maintained constant. The desired foot position/posture trajectory and the desired upper body position/posture trajectory are then generated by, for example, the method proposed by the applicant of the present application in Japanese Patent No. 3726081 and the like.

The process of generating the desired foot position/posture trajectory and the desired upper body position/posture trajectory is briefly described below. Parameters defining the desired foot position/posture trajectory, such as a scheduled landing position and a scheduled landing time of each foot 18 on the supposed floor surface, are determined according to a requested moving direction or moving velocity, a motion schedule, or the like of the mobile object 1 provided to the controller 50 from outside the mobile object 1. The parameters may be input to the controller 50 from outside, or stored in a storage device of the controller 50 beforehand.

A desired ZMP trajectory as a desired position of the ZMP (Zero Moment Point) is determined according to the desired foot position/posture trajectory defined by the parameters. The desired ZMP trajectory is determined so that the desired ZMP stays as much as possible at or near a central position in a supporting polygon on the supposed floor surface defined according to the desired foot position/posture trajectory and also undergoes a smooth displacement (without step change).

Further, the desired upper body position/posture trajectory is determined so as to satisfy the desired ZMP trajectory, using an appropriate kinetic model representing the kinetics (relation between the floor reaction force as an external force and the motion of the mobile object 1) of the mobile object 1. Satisfying the desired ZMP trajectory means that a horizontal component (component about the X axis and the Y axis) of a moment generated about the desired ZMP by a resultant force of an inertial force generated by the motion of the mobile object 1 and gravity acting on the mobile object 1 is zero.

The method of generating the desired motion may be a known method other than the method proposed by the applicant of the present application in Japanese Patent No. 3726081 and the like, as long as it is possible to generate the feasible desired motion of the mobile object 1 on the supposed floor surface.

The desired arm posture or the desired head posture relative to the upper body 2 may be changed in a desired pattern according to need. For instance, both arm links 4R and 4L may be swung back and forth with the walking motion of the mobile object 1.

In such a case, the desired upper body position/posture trajectory may be generated using a kinetic model that takes into consideration a change in overall center of gravity of the mobile object 1 or a change in angular momentum about the overall center of gravity of the mobile object 1 associated with a change in desired arm posture or desired head posture.

The constituents of the desired motion are not limited to the above-mentioned constituents. For example, in the case where the mobile object 1 does not include the arm links 4R and 4L or the head 5, the desired arm posture trajectory or the desired head posture trajectory are unnecessary. In the case where the mobile object 1 includes a movable portion relative to the upper body 2 other than the arm links 4R and 4L and the head 5, a trajectory of a desired position and desired posture of the portion is added to the desired motion.

In the case where each leg link 3 has 7 degrees of freedom or more, not only the desired foot position/posture trajectory but also a desired position/posture trajectory of an intermediate part of each leg link 3 may be added to the desired motion, as an example.

The constituents of the desired motion may be appropriately set according to the structure of the mobile object 1 and the like, so long as the trajectory of the displacement amount of each joint of the mobile object 1 can be defined.

The desired total floor reaction force of the reference gait defines the trajectory of the total floor reaction force that needs to be kinetically applied to the mobile object 1 from the supposed floor surface in order to move the mobile object 1 on the supposed floor surface according to the desired motion.

The desired total floor reaction force includes: a trajectory of a desired total floor reaction force central point which is a desired position of a total floor reaction force central point (COP) as an acting point of the total floor reaction force; a trajectory of a desired translational floor reaction force which is a desired translational force (vector) to be applied to the mobile object 1 from the supposed floor surface with the desired total floor reaction force central point as an acting point; and a trajectory of a desired floor reaction force moment which is a desired moment (vector) to be applied to the mobile object 1 from the supposed floor surface about the desired total floor reaction force central point.

In the following description, unless otherwise specified, the term "desired total floor reaction force" denotes the combination of the desired translational floor reaction force and the desired floor reaction force moment, and is distinguished from the desired total floor reaction force central point, for convenience's sake.

The reference gait generator 61 determines the desired total floor reaction force central point trajectory so as to match the desired ZMP trajectory. The reference gait generator 61 also determines the desired translational floor reaction force trajectory so that the desired translational floor reaction force is balanced with a resultant force of an inertial force generated by the translational motion of the overall center of gravity of the mobile object 1 in the desired motion of the mobile object 1 and gravity acting on the mobile object 1.

The reference gait generator 61 further determines the desired floor reaction force moment trajectory so that the desired floor reaction force moment about the desired total floor reaction force central point is balanced with a moment generated about the desired total floor reaction force central point by the resultant force of the inertial force (inertial force by the translational motion of the overall center of gravity and inertial force by the rotational motion about the overall center of gravity) generated by the desired motion of the mobile object 1 and the gravity acting on the mobile object 1. In this case, the component about the horizontal axis (component about the X axis and the Y axis) in the desired floor reaction force moment is zero.

Hereafter, the desired translational floor reaction force (vector) and the desired floor reaction force moment (vector) in the desired total floor reaction force of the reference gait are respectively denoted by ↑Ft_cmd0 and ↑Mt_cmd0. In this embodiment, each of ↑Ft_cmd0 and ↑Mt_cmd0 is a column vector composed of three components that are an X-axis component, a Y-axis component, and a Z-axis component. The combination of ↑Ft_cmd0 and ↑Mt_cmd0 is referred to as a desired total floor reaction force ↑FMt_cmd0. ↑FMt_cmd0 is a column vector (six-component column vector) formed by arranging the components of ↑Ft_cmd0 and ↑Mt_cmd0. That is, ↑FMt_cmd0=[↑Ft_cmd0, ↑Mt_cmd0]$^T$.

The reference gait does not need to be generated during the movement of the mobile object 1. For example, the reference gait may be generated before the mobile object 1 starts to move, and stored in the storage device of the controller 50 beforehand or input to the controller 50 from outside by wireless communication according to need. In such a case, the controller 50 does not need to include the reference gait generator 61.

[Process of the Desired Joint Displacement Amount Determinator 67]

The controller 50 inputs the desired motion of the reference gait generated as described above to the desired joint displacement amount determinator 67, and executes the process of the desired joint displacement amount determinator 67.

The desired joint displacement amount determinator 67 is a functional unit which calculates a reference desired joint displacement amount that is the amount of displacement of each joint of the mobile object 1 defined by the desired motion of the reference gait. The desired joint displacement amount determinator 67 calculates the reference desired joint displacement amount of each joint of the mobile object 1 by inverse kinetic calculation, from the input desired motion.

In the case where the reference gait is generated beforehand, the reference desired joint displacement amount of each joint corresponding to the desired motion of the reference gait may be generated beforehand, too. In such a case, the controller 50 does not need to include the desired joint displacement amount determinator 67.

[Process of the Posture Stabilization Compensating Force Determinator 62]

The controller 50 executes the processes of the posture stabilization compensating force determinator 62, the desired total floor reaction force corrector 63, the total floor reaction force required correction amount determinator 64, the representative contact surface translational/rotational displacement amount calculator 65, the representative contact surface Jacobian matrix calculator 66, and the joint displacement correction amount determinator 68, simultaneously with (or before or after) the process of the desired joint displacement amount determinator 67.

These processes are a process for determining a manipulation amount (control input) for compliance control. This process is hereafter referred to as a compliance manipulation amount determination process. By the compliance manipulation amount determination process, the controller 50 determines a joint displacement correction amount for correcting the reference desired joint displacement amount of each joint corresponding to the reference gait.

In the compliance manipulation amount determination process, the controller 50 first executes the process of the posture stabilization compensating force determinator 62. The posture stabilization compensating force determinator 62 is a functional unit which determines, as a correction amount for correcting the desired total floor reaction force of the reference gait, a posture stabilization compensating force ↑Mdmd which is a perturbation floor reaction force to be additionally applied to the mobile object 1 so that an error between the desired upper body posture of the reference gait and the observed value of the actual posture (actual upper body posture) of the upper body 2 of the mobile object 1 approaches zero.

In this embodiment, the posture stabilization compensating force ↑Mdmd is made of a perturbation moment about the horizontal axis (the X axis and the Y axis) to be added about the desired total floor reaction force central point of the reference gait. Accordingly, the posture stabilization compensating force ↑Mdmd is a manipulation amount for correcting the component about the horizontal axis in the desired floor reaction force moment, in the desired total floor reaction force of the reference gait. In other words, the posture stabilization compensating force ↑Mdmd is a manipulation amount that serves to shift the desired value of the total floor reaction force central point from the desired total floor reaction force central point of the reference gait.

The posture stabilization compensating force determinator 62 determines the posture stabilization compensating force ↑Mdmd by a predetermined feedback control law, from the error between the observed value of the actual upper body posture indicated by the output of the posture sensor 51 and the desired upper body posture of the reference gait. For example, a PD law is used as the feedback control law.

In detail, in this embodiment, the posture stabilization compensating force (moment) ↑Mdmd is determined by adding (combining) a proportional term obtained by multiplying the error between the observed value of the actual upper body posture and the desired upper body posture by a predetermined gain and a derivative term obtained by multiplying a temporal change rate of the error by a predetermined gain. In this case, the component about the X axis in ↑Mdmd is determined according to the component about the X axis in the error, and the component about the Y axis in ↑Mdmd is determined according to the component about the Y axis in the error.

The error between the observed value of the actual upper body posture and the desired upper body posture is substantially proportional to a horizontal positional error between the actual overall center of gravity of the mobile object 1 and the overall center of gravity in the desired motion of the reference gait. This being so, the posture stabilization compensating force (moment) ↑Mdmd may be determined by the feedback control law such as the PD law by using, as an index indicating the degree of deviation of the actual upper body posture from the desired upper body posture, the error between the observed value of the horizontal position of the actual overall center of gravity of the mobile object 1 and the horizontal position of the overall center of gravity of the mobile object 1 in the desired motion of the reference gait. In such a case, the position of the actual overall center of gravity of the mobile object 1 may be estimated through the use of, for example, an observed (measured) value of an actual displacement amount of each joint of the mobile object 1 and a rigid link model of the mobile object 1.

In this embodiment, ↑Mdmd is composed of the two components that are the component about the X axis and the component about the Y axis. However, the component about the Z axis may also be included in ↑Mdmd. For example, the component about the Z axis in ↑Mdmd may be determined by the feedback control law such as the PD law, based on an error between the component about the Z axis in the desired upper body posture of the reference gait and the component about the Z axis in the observed value of the actual upper body posture.

[Process of the Desired Total Floor Reaction Force Corrector 63]

Next, the controller 50 executes the process of the desired total floor reaction force corrector 63. The desired total floor reaction force corrector 63 is a functional unit which corrects the desired total floor reaction force ↑FMt_cmd0 of the reference gait by the posture stabilization compensating force ↑Mdmd determined as described above. The desired total floor reaction force corrector 63 determines the corrected desired total floor reaction force, by adding the posture stabilization compensating force ↑Mdmd determined as described above to the desired total floor reaction force ↑FMt_cmd0 of the reference gait. Here, the corrected desired total floor reaction force is a result of correcting only the component about the X axis and the component about the Y axis in the desired floor reaction force moment about the desired total floor reaction force central point of the reference gait, in the desired total floor reaction force ↑FMt_cmd0 of the reference gait.

Hereafter, a translational floor reaction force (three-component column vector) and a floor reaction force moment (three-component column vector) of the corrected desired total floor reaction force are respectively denoted by ↑Ft_cmd1 and ↑Mt_cmd1. A six-component column vector (=[↑Ft_cmd1, ↑Mt_cmd1]$^T$) that combines ↑Ft_cmd1 and ↑Mt_cmd1 is referred to as a corrected desired total floor reaction force ↑FMt_cmd1. Here, ↑Ft_cmd1=↑Ft_cmd0, and ↑Mt_cmd1=↑Mt_cmd0+↑Mdmd (note that the component about the Z axis in ↑Mdmd is zero in this embodiment).

[Process of the Total Floor Reaction Force Required Correction Amount Determinator 64]

Next, the controller 50 executes the process of the total floor reaction force required correction amount determinator 64. The total floor reaction force required correction amount determinator 64 is a functional unit which determines a required correction amount of the total floor reaction force so that the observed value of the total floor reaction force (actual total floor reaction force) actually acting on the mobile object 1 follows the corrected desired total floor reaction force ↑FMt_cmd1 determined as described above.

The required correction amount of the total floor reaction force corresponds to a required value of the perturbation total floor reaction force ↑ΔFMt in the equation (2). Hence, the required correction amount of the total floor reaction force is composed of: a required value of the perturbation total translational floor reaction force ↑ΔFt as a required correction amount (three-component column vector) of the translational floor reaction force in the total floor reaction force; and a required value of the perturbation total floor reaction force moment ↑ΔMt as a required correction amount (three-component column vector) of the floor reaction force moment about the desired total floor reaction force central point.

Hereafter, the required value of the perturbation total translational floor reaction force ↑ΔFt is denoted by ↑ΔFt_dmd, and the required value of the perturbation total floor reaction force moment ↑ΔMt is denoted by ↑ΔMt_dmd. The required value of the perturbation total floor reaction force ↑ΔFMt as a six-component column vector that combines ↑ΔFt_dmd and ↑ΔMt_dmd is denoted by ↑ΔFMt_dmd (=[↑ΔFt_dmd, ↑ΔMt_dmd]$^T$).

In addition, the observed value (three-component column vector) of the translational floor reaction force in the actual total floor reaction force acting on the mobile object 1 is denoted by ↑Ft_act, and the observed value (three-component column vector) of the floor reaction force moment in the actual total floor reaction force is denoted by ↑Mt_act. The observed value of the actual total floor reaction force as a six-component column vector that combines ↑Ft_act and ↑Mt_act is denoted by ↑FMt_act (=[↑Ft_act, ↑Mt_act]$^T$).

The total floor reaction force required correction amount determinator 64 determines the required value ↑ΔFMt_dmd of the perturbation total floor reaction force ↑ΔFMt by the following process.

First, the total floor reaction force required correction amount determinator 64 calculates an error ↑Dfmt (=↑FMt_cmd1−↑FMt_act) between the corrected desired total floor reaction force ↑FMt_cmd1 and the observed actual total floor reaction force ↑FMt_act. The observed actual total floor reaction force ↑FMt_act is calculated by combining the observed value of the floor reaction force (six-axis force) of each leg link 3 indicated by the outputs of the force sensors 52R and 52L with the desired total floor reaction force central point as the acting point.

Note that, in this embodiment, in order to prevent an excessive variation of the error ↑Dfmt, the total floor reaction force required correction amount determinator 64 calculates the observed actual total floor reaction force ↑FMt_act acting on the desired total floor reaction force central point, by performing low-pass filtering on the actual total floor reaction force obtained by combining the observed value of the floor reaction force (six-axis force) of each leg link 3 indicated by the outputs of the force sensors 52R and 52L.

As an alternative, the observed actual total floor reaction force ↑FMt_act may be calculated by combining the low-pass filtering result of the observed value of the floor reaction force (six-axis force) of each leg link 3.

The total floor reaction force required correction amount determinator 64 then determines the required value ↑ΔFMt_dmd of the perturbation total floor reaction force ↑ΔFMt by adding a proportional term (the first term in the right side of the equation (41)) and an integral term (the second term in the right side of the equation (41)) determined according to the error ↑Dfmt, as shown in the following equation (41).

The proportional term is a result of multiplying the error ↑Dfmt by a predetermined gain Kcmp. The integral term is a result of integrating a value obtained by multiplying a low-pass filtering result ↑Dfmt_filt of the error ↑Dfmt by a predetermined gain Kestm.

The low-pass filtering process used to calculate ↑Dfmt_filt is a filtering process whose cutoff frequency on the high frequency side is lower than the cutoff frequency on the high frequency side of the low-pass filtering process used to calculate the error ↑Dfmt.

$$\uparrow\Delta FMt\_dmd = Kcmp \cdot \uparrow Dfmt + \int (Kestm \cdot \uparrow Dfmt\_Tilt) \quad (41)$$

Each of the gains Kcmp and Kestm is a scalar or a diagonal matrix.

The integral term in the equation (41) corresponds to a steady-state error between the corrected desired total floor reaction force ↑FMt_cmd1 and the observed actual total floor reaction force ↑FMt_act, i.e. a steady-state error of the position and posture of the supposed floor surface from the actual floor surface.

Though the required value ↑ΔFMt_dmd of the perturbation total floor reaction force ↑ΔFMt is calculated according to the equation (41) in this embodiment, the required value ↑ΔFMt_dmd may be calculated while omitting the proportional term or the integral term. Besides, the integral term may be calculated using ↑Dfmt itself, instead of ↑Dfmt_Tilt.

[Process of the Representative Contact Surface Translational/Rotational Displacement Amount Calculator 65]

The controller 50 executes the process of the representative contact surface translational/rotational displacement amount calculator 65, after executing the process of the total floor reaction force required correction amount determinator 64 as described above. The representative contact surface translational/rotational displacement amount calculator 65 is a functional unit which converts the required value ↑ΔFMt_dmd of the perturbation total floor reaction force ↑ΔFMt determined as described above to the spring translational/rotational displacement amount ↑Xc (=[↑Xc_org, ↑Xc_rot]$^T$) of the virtual representative contact surface, according to the equation (28).

In this embodiment, each diagonal component (spring constant of each component relating to the translational displacement of the representative contact surface in the directions of the three axes) of the translational spring constant matrix Kc_org of the representative contact surface representative of the ground surfaces of the leg links 3R and 3L of the mobile object 1 and each diagonal component (spring constant of each component relating to the rotational displacement of the representative contact surface about the three axes) of the rotational spring constant matrix Kc_rot of the representative contact surface are predetermined constants.

The representative contact surface translational/rotational displacement amount calculator 65 calculates the spring translational/rotational displacement amount ↑Xc of the representative contact surface using these spring constant matrices Kc_org and Kc_rot, according to the equation (28). In detail, the representative contact surface translational/rotational displacement amount calculator 65 calculates the spring translational/rotational displacement amount ↑Xc of the representative contact surface, according to the following equation (42) that substitutes ↑ΔFMt_dmd for ↑ΔFMt in the right side of the equation (28).

$$\uparrow Xc = \begin{bmatrix} Kc\_org^{-1} & 0 \\ 0 & Kc\_rot^{-1} \end{bmatrix} \cdot \uparrow FMt\_dmd \quad (42)$$

In the equation (42), Kc_org$^{-1}$ is an inverse matrix (matrix whose diagonal components are the inverses of the diagonal components of Kc_org) of the translational spring constant matrix Kc_org, and Kc_rot$^{-1}$ is an inverse matrix (matrix whose diagonal components are the inverses of the diagonal components of Kc_rot) of the rotational spring constant matrix Kc_rot. Kc_org$^{-1}$ and Kc_rot$^{-1}$ are respectively calculated from the translational spring constant matrix Kc_org and the rotational spring constant matrix Kc_rot by the controller 50. Alternatively, Kc_org$^{-1}$ and Kc_rot$^{-1}$ may be stored in the storage device of the controller 50 beforehand.

[Process of the Representative Contact Surface Jacobian Matrix Calculator 66]

In the compliance manipulation amount determination process, the controller 50 executes the process of the representative contact surface Jacobian matrix calculator 66, simultaneously with (or before or after) the calculation of the spring translational/rotational displacement amount TXc of the representative contact surface as described above.

The representative contact surface Jacobian matrix calculator 66 is a functional unit which calculates the representative contact surface Jacobian matrix Jc representing the relation of the equation (23). In this embodiment, the generalized variable vector ↑q1 is more specifically a column vector formed by arranging the six components of the position and posture of the upper body 2 as the body and the amount of displacement of each joint of the mobile object 1. A column vector formed by arranging the change amounts of the components of ↑q1 per unit time is ↑Δq1 in the equation (24).

In this embodiment, the representative contact surface Jacobian matrix calculator 66 calculates the representative contact surface Jacobian matrix Jc, according to the following equation (43) where N=2 in the equation (27). One of the leg links 3R and 3L in this embodiment corresponds to the first leg link and the other one of the leg links 3R and 3L corresponds to the second leg link in the equation (27). In the following description, the leg link 3R is set as the first leg link and the leg link 3L is set as the second leg link as an example, for convenience's sake.

$$Jc = \sum_{i=1}^{2} (r\_i \cdot A\_i \cdot J\_i) \qquad (43)$$
$$= r\_1 \cdot A\_1 \cdot J\_1 + r\_2 \cdot A\_2 \cdot J\_2$$

where $$r\_i \equiv Fn\_i / Fnt = Fn\_i / (Fn\_1 + Fn\_2) \qquad (43\text{-}1)$$

$$A\_i \equiv \begin{bmatrix} I & 0 \\ Rk \cdot VV\_i & I \end{bmatrix} \qquad (43\text{-}2)$$

$$Rk \equiv Kc\_rot^{-1} \cdot Kc\_org \qquad (43\text{-}3)$$

VV_i is a matrix such that VV_i·↑F_i=↑V_i×↑F_i, and ↑V_i is a position vector of the floor reaction force central point of the ground surface of the i-th leg link relative to the total floor reaction force central point.

Here, the variables necessary for calculating the right side of the equation (43) are determined as follows.

Regarding the weight coefficient r_i (i=1, 2), first the observed value of the current actual posture of the foot 18 of each leg link 3 relative to the floor surface is determined based on the observed (measured) value of the actual displacement amount (actual joint displacement amount) of each joint indicated by the output of the rotary encoder 54.

Further, the observed value of the current actual floor surface normal force component Fn_1, Fn_2 (actual floor surface normal force component Fn_1, Fn_2) of each leg link 3 is calculated based on the observed value of the actual posture of the foot 18 of each leg link 3 and the output of each of the force sensors 52R and 52L.

The weight coefficient r_i (i=1, 2) is then determined from the observed value of the actual floor surface normal force component Fn_1, Fn_2 of each leg link 3, according to the definition shown in the equation (43-1). Here, filtering such as low-pass filtering may be performed on the observed value of Fn_i, in order to prevent a frequent variation of the weight coefficient r_i.

Though it is desirable to determine the weight coefficient r_i based on the observed value of the actual floor surface normal force component Fn_i of each leg link 3, the weight coefficient r_i may be determined using an approximate estimated value or predicted value of the actual floor surface normal force component Fn_i instead of the observed value.

For example, in the case where the desired floor reaction force of each leg link 3 is included in the reference gait and also the actual floor reaction force of each leg link 3 approximately matches the desired floor reaction force, the weight coefficient r_i may be determined using the desired value instead of the observed value of the actual floor surface normal force component Fn_i.

The coefficient matrix Rk relating to the matrix A_i (i=1, 2) is determined from the translational spring constant matrix Kc_org and the rotational spring constant matrix Kc_rot (or its inverse matrix Kc_rot$^{-1}$) set beforehand with respect to the representative contact surface, according to the equation (43-3). The coefficient matrix Rk may be stored in the storage device of the controller 50 beforehand.

The position vector ↑V_i necessary for determining the matrix VV_i relating to the matrix A_i (i=1, 2) is determined in the following manner, as an example.

A position vector (hereafter denoted by ↑Va_i (i=1, 2)) of the current actual floor reaction force central point (actual floor reaction force central point) of the ground surface of each leg link 3 is specified based on the observed (measured) value of the current actual displacement amount of each joint indicated by the output of the rotary encoder 54 and the output of each of the force sensors 52R and 52L. A reference point of this position vector may be an arbitrary point.

Next, a position vector ↑Vc (=r_1·↑Va_1+r_2·↑Va_2) of an internally dividing point obtained by internally dividing a line segment connecting the actual floor reaction force central points of the respective leg links 3R and 3L by a ratio of the weight coefficients r_i (i=1, 2) is calculated as a position vector of the actual total floor reaction force central point.

The position vector ↑V_1, ↑V_2 of the actual floor reaction force central point of the ground surface of each leg link relative to the actual total floor reaction force central point is then determined according to ↑V_i=↑Va_i−↑Vc (i=1, 2).

Here, ↑V_1=↑Va_1−↑Vc=r_2·(↑Va_1−↑Va_2), and ↑V_2=↑Va_2−↑Vc=r_1·(↑Va_2−↑Va_1). The position vectors ↑V_1 and ↑V_2 may be determined according to these equations. In this case, there is no need to calculate ↑Vc.

The matrix VV_i relating to the matrix A_i (i=1, 2) is determined so that VV_i·↑F_i=↑V_i×↑F_i, according to the definition.

With regard to any leg link 3 that is ungrounded (leg link 3 where Fn_i=0), there is no actual floor reaction force central point, and so ↑V_i corresponding to this leg link 3 is indefinite. In this case, the weight coefficient r_i corresponding to the leg link 3 where Fn_i=0 is zero, so that r_i·A_i·J_i=0 regardless of the components of A_i or J_i. Therefore, there is no need to determine the matrix VV_i (and the matrix A_i) corresponding to the ungrounded leg link 3. The same applies to the leg link Jacobian matrix J_i described below.

Of the variables necessary for calculating the right side of the equation (43), the leg link Jacobian matrix J_i relating to the i-th leg link 3 is determined as follows. The leg link Jacobian matrix J_i is a matrix that represents the relation between the spring translational/rotational displacement amount ↑X_i (=[↑Xorg_i, ↑Xrot_i]$^T$) of the i-th leg contact surface and the change amount ↑Δq1 of the generalized variable vector ↑q1 per unit time, by the equation (24).

The spring translational displacement amount ↑Xorg_i of ↑X_i corresponds to the translational displacement amount of the i-th leg ground surface per unit time, and so can be regarded as matching the temporal change rate (translational velocity) of the position of the current ground portion of the foot 18 of the i-th leg link 3. The spring rotational displacement amount ↑Xrot_i of TX_i corresponds to the rotational displacement amount of the i-th leg ground surface per unit time, and so can be regarded as matching the temporal change rate (angular velocity) of the current posture of the foot 18 of the i-th leg link 3

In view of this, in this embodiment, the leg link Jacobian matrix J_i of the i-th leg link 3 is determined on the ground that the change amount (temporal change rate) of the position of the current ground portion and the posture of the foot 18 of the i-th leg link 3 (in more detail, the column vector whose components are the components of the position and posture) per unit time matches ↑X_i in the left side of the equation (24). As the position of the current ground portion of the foot 18 of the i-th leg link 3, the position of the point of the foot 18 corresponding to the actual floor reaction force central point of the ground surface (i-th leg ground surface) of the i-th leg link 3 is used as an example.

In this case, the leg link Jacobian matrix J_i is determined by a known method, using the current motion state (specified by the measured value of the current actual displacement amount of each joint) of the mobile object 1 as the starting point of the minute change (perturbation) of ↑q1.

For instance, the leg link Jacobian matrix J_i is determined by calculating the change in ground portion position and posture of the foot 18 of the i-th leg link 3 with the minute change (minute change from the current state) of each component of the generalized variable vector ↑q1, by using a geometric model (rigid link model) of the mobile object 1 or by analytical calculation.

Here, the current ground portion position of the foot 18 of the i-th leg link 3 is assumed to match the observed value of the position of the current actual floor reaction force central point of the ground surface of the i-th leg link 3. The change of the position of this point (change with the minute change of each component of ↑q1) is calculated as the change in ground portion position of the foot 18.

Meanwhile, the current posture of the foot 18 of the i-th leg link 3 is assumed to match the observed value of the current actual posture of the foot 18 calculated based on the observed (measured) value of the actual displacement amount of each joint indicated by the output of the rotary encoder 54, and accordingly the change in posture of the foot 18 (change with the minute change of each component of ↑q1) is calculated.

In this embodiment, the representative contact surface Jacobian matrix calculator 66 calculates the representative contact surface Jacobian matrix Jc, by calculating the right side of the equation (43) using the weight coefficients r_1 and r_2, the matrices VV_1 and VV_2, and the leg link Jacobian matrices J_1 and J_2 determined as described above.

[Process of the Joint Displacement Correction Amount Determinator 68]

In the compliance manipulation amount determination process, the controller 50 executes the process of the joint displacement correction amount determinator 68, after calculating the spring translational/rotational displacement amount ↑Xc of the representative contact surface and the representative contact surface Jacobian matrix Jc as described above.

The joint displacement correction amount determinator 68 is a functional unit which determines a joint displacement correction amount as is the amount of correction (the amount of correction from the desired joint displacement amount corresponding to the desired motion of the reference gait) of the displacement amount of each joint corresponding to the spring translational/rotational displacement amount ↑Xc of the representative contact surface.

First, the joint displacement correction amount determinator 68 calculates the pseudo inverse matrix $Jc^{-1}$ of the representative contact surface Jacobian matrix Jc. Since the number of components of the generalized variable vector ↑q1, i.e. the number of components of ↑Δq1, is larger than the number of components of the spring translational/rotational displacement amount ↑Xc, the representative contact surface Jacobian matrix Jc is not a square matrix. That is, there is no inverse matrix of Jc. The joint displacement correction amount determinator 68 accordingly calculates the pseudo inverse matrix $Jc^{-1}$ of the representative contact surface Jacobian matrix Jc. The joint displacement correction amount determinator 68 calculates a generalized variable required correction amount vector ↑Δq1 dmd whose components are the required correction amounts (required perturbation amounts) of the components of the generalized variable vector ↑q1, by multiplying the spring translational/rotational displacement amount ↑Xc of the representative contact surface by the pseudo inverse matrix $Jc^{-1}$ as shown by the equation (29). The joint displacement correction amount determinator 68 then determines the component representing the required correction amount of the displacement amount of each joint among the components of the generalized variable required correction amount vector ↑Δq1_dmd, as the joint displacement correction amount.

Here, the joint displacement correction amount determinator 68 calculates the pseudo inverse matrix $Jc^{-1}$ according to the equation (30).

In this embodiment, the pseudo inverse matrix $Jc^{-1}$ is calculated as a weighted pseudo inverse matrix (weighted SR-Inverse).

Figure 5:
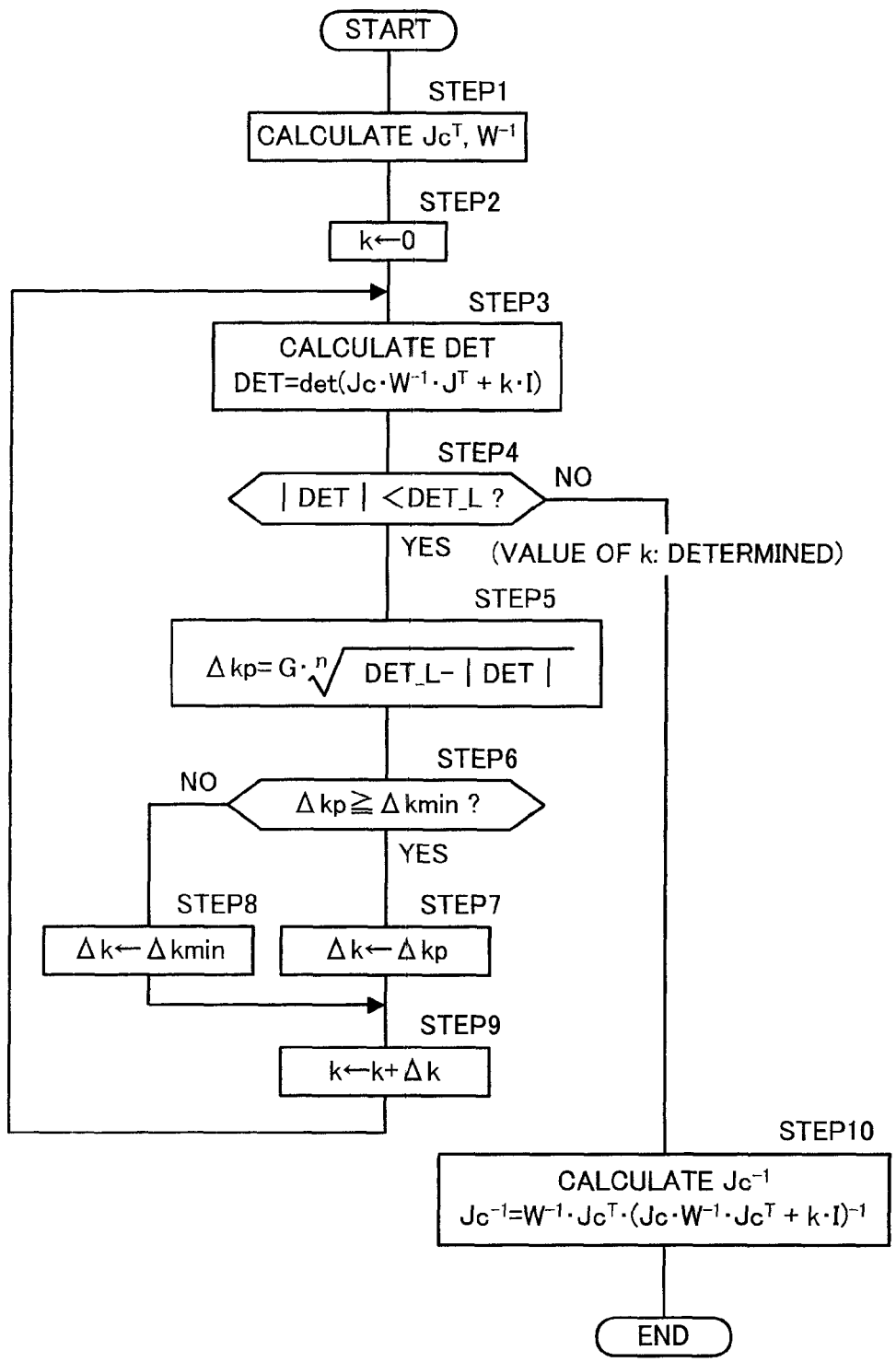
FIG. 5 is a flowchart showing a process of a joint displacement correction amount determinator shown in FIG. 4.

In detail, the process of calculating the pseudo inverse matrix $Jc^{-1}$, including the determination process of the adjustment parameter k, is executed as shown in a flowchart of FIG. 5.

First, in STEP 1, the transposed matrix $Jc^T$ of the representative contact surface Jacobian matrix Jc and the inverse matrix $W^{-1}$ of the weight coefficient matrix W are calculated. The weight coefficient matrix W is a matrix whose diagonal components (weight coefficients) are set beforehand, in this embodiment. Alternatively, the diagonal components of the weight coefficient matrix W may be appropriately changed according to the motion state of the mobile object 1.

Next, in STEP 2, 0 which is a standard value of k is set as an initial candidate value of the adjustment parameter k.

Next, in STEP 3, the determinant DET is calculated using the current candidate value of the adjustment parameter k, according to the equation (31).

Next, in STEP 4, it is determined whether or not the magnitude (absolute value) of the determinant DET is less than a predetermined lower threshold DET_L (>0) (whether or not the magnitude of DET is excessively small).

In the case where the result of the determination in STEP 4 is false (the magnitude of DET is not excessively small but appropriate), STEP 10 is executed. In STEP 10, the current candidate value of k is determined as the adjustment parameter k. The pseudo inverse matrix $Jc^{-1}$ is calculated using this adjustment parameter k according to the equation (30).

In the case where the result of the determination in STEP 4 is true (the magnitude of DET is excessively small), STEPS 5 to 8 (described in detail later) are executed to determine the increment Δk (>0) of the candidate value of the adjustment parameter k. In STEP 9, the candidate value of the adjustment parameter k is updated to a value obtained by increasing the current value by the increment Δk.

Subsequently, STEPS 3 to 9 are repeated until the result of the determination in STEP 4 is false. Thus, the adjustment parameter k such that the determinant DET has an appropriate magnitude equal to or more than the predetermined lower threshold DET_L is determined in an exploratory manner.

The process of determining the increment Δk is described below. In the process of exploratory determination of the adjustment parameter k such that the determinant DET has an appropriate magnitude equal to or more than the predetermined lower threshold DET_L, a method of updating the candidate value of the adjustment parameter k using, for example, a predetermined fixed value as the increment Δk of the candidate value of the adjustment parameter k is usually employed.

In this case, however, if the increment Δk is relatively large, in a situation where the magnitude of the determinant DET calculated with k=0 is excessively small, the value of k sequentially determined in each processing cycle of the controller 50 is a discrete value with a step size equivalent to an integral multiple of Δk, which tends to be excessively large relative to a minimum value of k where DET≧DET_L.

This tends to cause a variation in difference between the magnitude of the determinant DET corresponding to the value of k sequentially determined in each processing cycle of the controller 50 and the lower threshold DET_L. As a result, in the case where the joint displacement correction amount is determined by the equation (29) using the pseudo inverse matrix $Jc^{-1}$ determined by the equation (30), there is a high possibility that the joint displacement correction amount changes discontinuously, which can impair the smooth motion of the mobile object 1.

This problem may be solved by setting the increment Δk to a sufficiently small value. In this case, however, it is likely to take long to determine the appropriate adjustment parameter k such that the result of the determination in STEP 4 is false. This raises a possibility that the appropriate adjustment parameter k cannot be determined within the period of each processing cycle of the controller 50.

In view of this, in this embodiment, the increment Δk of the candidate value of the adjustment parameter k is variably set according to the error between the magnitude of the determinant DET calculated in STEP 3 and the lower threshold DET_L, in STEPS 5 to 8.

In detail, in STEP 5, a value calculated according to the following equation (44) is set as a provisional value Δkp of the increment Δk of the adjustment parameter k.

$$\Delta kp = G \cdot (DET\_L - |DET|)^{1/n} \qquad (44)$$

That is, a value (value proportional to the n-th root of the error (=DET_L−|DET|) obtained by multiplying, by a predetermined gain G (>0), the n-th root of the error (=DET_L−|DET|) generated by subtracting the absolute value of the determinant DET from the lower threshold DET_L is set as the provisional value Δkp of the increment Δk. Here, n is the order of the matrix $(Jc \cdot W^{-1} \cdot Jc^{-1})$. The gain G is a predetermined constant.

The provisional value Δkp of the increment Δk is determined in this manner, for the following reason. The difference between the value (the value of DET where k=0) of a determinant det $(Jc \cdot W^{-1} \cdot Jc^{T})$ and the value of the determinant DET $(=\det(Jc \cdot W^{-1} \cdot Jc^{T} + k \cdot I))$ is a function of n-th order of k (function in the form of $k^n + a \cdot k^{n-1} + \ldots$). This suggests that the change of the value of the determinant DET with the change of the value of k is substantially proportional to $k^n$ (n-th power of k). For this reason, the value calculated according to the equation (44) is set as the provisional value Δkp of the increment Δk in this embodiment.

In STEPS 6 to 8, a limiting process is performed on the provisional value Δkp to prevent the increment Δk from becoming excessively small, as a result of which the increment Δk is determined. In detail, In STEP 6, the provisional value Δkp of the increment Δk is compared with a predetermined lower limit Δkmin (>0). In the case where Δkp≧Δkmin, the provisional value Δkp is determined as the increment Δk in STEP 7. In the case where Δkp<Δkmin, Δkmin is determined as the increment Δk in STEP 8.

In so doing, the increment Δk is determined at the value calculated by the equation (44) according to the error between the magnitude of the determinant DET and the lower threshold DET_L, with Δkmin as its lower limit.

The joint displacement correction amount determinator 68 calculates the generalized variable required correction amount vector ↑Δq1_dmd, by calculating the right side of the equation (29) using the pseudo inverse matrix $Jc^{-1}$ calculated as described above. The joint displacement correction amount determinator 68 then determines the component representing the required correction amount of the displacement amount of each joint among the components of the generalized variable required correction amount vector ↑Δq1_dmd, as the joint displacement correction amount. The joint displacement correction amount determined in this way is the compliance manipulation amount as the required correction amount of the displacement amount of each joint such that the actual total floor reaction force approaches the corrected desired total floor reaction force ↑FMt_cmd1.

[Process of the Joint Displacement Controller 69]

The controller 50 executes the process of the joint displacement controller 69, after executing the compliance manipulation amount determination process (the processes of the posture stabilization compensating force determinator 62, the desired total floor reaction force corrector 63, the total floor reaction force required correction amount determinator 64, the representative contact surface translational/rotational displacement amount calculator 65, the representative contact surface Jacobian matrix calculator 66, and the joint displacement correction amount determinator 68) and the process of the desired joint displacement amount determinator 67 described above.

The joint displacement controller 69 determines the corrected desired joint displacement amount as the eventual joint displacement command of each joint, by adding the joint displacement correction amount determined by the desired joint displacement amount corrector 68 to the desired joint displacement amount (desired joint displacement amount corresponding to the desired motion of the reference gait) of each joint determined by the desired joint displacement amount determinator 67.

The joint displacement controller 69 controls the corresponding electric motor 41 (joint actuator) via a motor drive circuit such as a servo amplifier not shown, so as to match the actual displacement amount of each joint to the corrected desired joint displacement amount determined as described above.

The above describes the detailed process of the controller 50 in this embodiment.

The correspondence relation between this embodiment and the present invention is as follows. The total floor reaction force required correction amount determination element in the present invention (more specifically, the first, second, fourth, fifth, seventh, or ninth invention) is realized by the total floor reaction force required correction amount determinator 64 in this embodiment. The corrected desired total floor reaction force ↑FMt_cmd1 in this embodiment corresponds to the desired total floor reaction force in the present invention.

Moreover, the representative contact surface position/posture displacement amount calculation element, the representative contact surface Jacobian matrix calculation element, the joint displacement correction amount determination element, and the joint displacement control element in the present invention (more specifically, the first, second, fourth, fifth, seventh, or ninth invention) are realized respectively by the representative contact surface translational/rotational displacement amount calculator 65, the representative contact surface Jacobian matrix calculator 66, the joint displacement correction amount determinator 68, and the joint displacement controller 69 in this embodiment.

Furthermore, the pseudo inverse matrix calculation parameter determination element in the present invention (more specifically, the fifth or ninth invention) is realized by STEPS 2 to 9 in FIG. 5 in the process executed by the joint displacement correction amount determinator 68 in this embodiment.

According to this embodiment, in each control cycle, the controller 50 converts the required value ↑ΔFMt_dmd of the perturbation total floor reaction force ↑ΔFMt as the manipulation amount (control input) by which the actual total floor reaction force follows the corrected desired total floor reaction force ↑FMt_cmd1, to the spring translational/rotational displacement amount ↑Xc of the representative contact surface.

The controller 50 also determines the joint displacement correction amount of each joint of the mobile object 1 as the compliance manipulation amount for realizing ↑Xc (so that the actual total floor reaction force follows the corrected desired total floor reaction force ↑FMt_cmd1), by multiplying ↑Xc by the pseudo inverse matrix $Jc^{-1}$ of the representative contact surface Jacobian matrix Jc.

The controller 50 controls the displacement amount of each joint via the corresponding electric motor 41 (joint actuator) according to the corrected desired joint displacement amount obtained by correcting, by the joint displacement correction amount, the desired joint displacement amount of each joint corresponding to the desired motion of the reference gait.

Thus, according to this embodiment, the joint displacement correction amount of each joint by which the actual total floor reaction force follows the corrected desired total floor reaction force ↑FMt_cmd1 can be collectively determined, without executing a process of determining the amount of correction of the position and posture of the distal end of each leg link 3 in consideration of the relation between the correction of the position and posture of the distal end (foot 18) of each individual leg link 3 and the change of the actual total floor reaction force or the interrelation between these factors. As a result, the process of determining the joint displacement correction amount for compliance control can be efficiently performed in a short time.

Here, the weight coefficient r_i of each leg link 3_i in the equation (43) for calculating the representative contact surface Jacobian matrix Jc is set so that the leg link 3_i whose floor surface normal force component Fn_i is larger has a larger weight coefficient (closer to "1").

This means the required value ↑ΔFMt_dmd of the perturbation total floor reaction force ↑ΔFMt is shared by each leg link 3_i in such a manner that the leg link 3_i whose floor surface normal force component Fn_i is larger has a larger correction amount.

In other words, the representative contact surface Jacobian matrix Jc is determined so that the required value ↑ΔFMt_dmd of the perturbation total floor reaction force ↑ΔFMt can be realized by correcting, to a larger degree, the position or posture of the distal end of the leg link whose floor surface normal force component Fn_i is relatively large.

Accordingly, it is possible to determine such a joint displacement correction amount that ensures the required value ↑ΔFMt_dmd of the perturbation total floor reaction force ↑ΔFMt without needlessly correcting the position or posture of the distal end of any leg link 3_i whose floor surface normal force component Fn_i is relatively small, i.e. an appropriate joint displacement correction amount by which the actual total floor reaction force follows the corrected desired total floor reaction force ↑ΔFMt_cmd1.

In addition, since the weight coefficient r_i of each leg link 3_i continuously changes, the representative contact surface Jacobian matrix Jc has no discontinuous change. As a result, the displacement amount of each joint of the mobile object 1 can be continuously changed smoothly. This enables the mobile object 1 to move smoothly.

In this embodiment, in the process (STEPS 2 to 9 in FIG. 5) of searching for the adjustment parameter k for preventing the determinant DET from becoming excessively small, the joint displacement correction amount determinator 68 sets the increment Δk of the adjustment parameter k to a value proportional to the n-th root of the error (=DET_L−|DET|) generated by subtracting the absolute value of the determinant DET from the lower threshold DET_L.

Therefore, the appropriate adjustment parameter k such that |DET|≧DET_L can be efficiently determined in a short time in each control cycle of the controller 50, without causing a discontinuous change of the value of k. As a result, the pseudo inverse matrix $Jc^{-1}$ for determining the joint displacement correction amount from the representative contact surface translational/rotational displacement amount ↑Xc can be smoothly changed. This allows the joint displacement correction amount to be determined so as to smoothly change the displacement amount of each joint of the mobile object 1.

Second Embodiment

Figure 6:
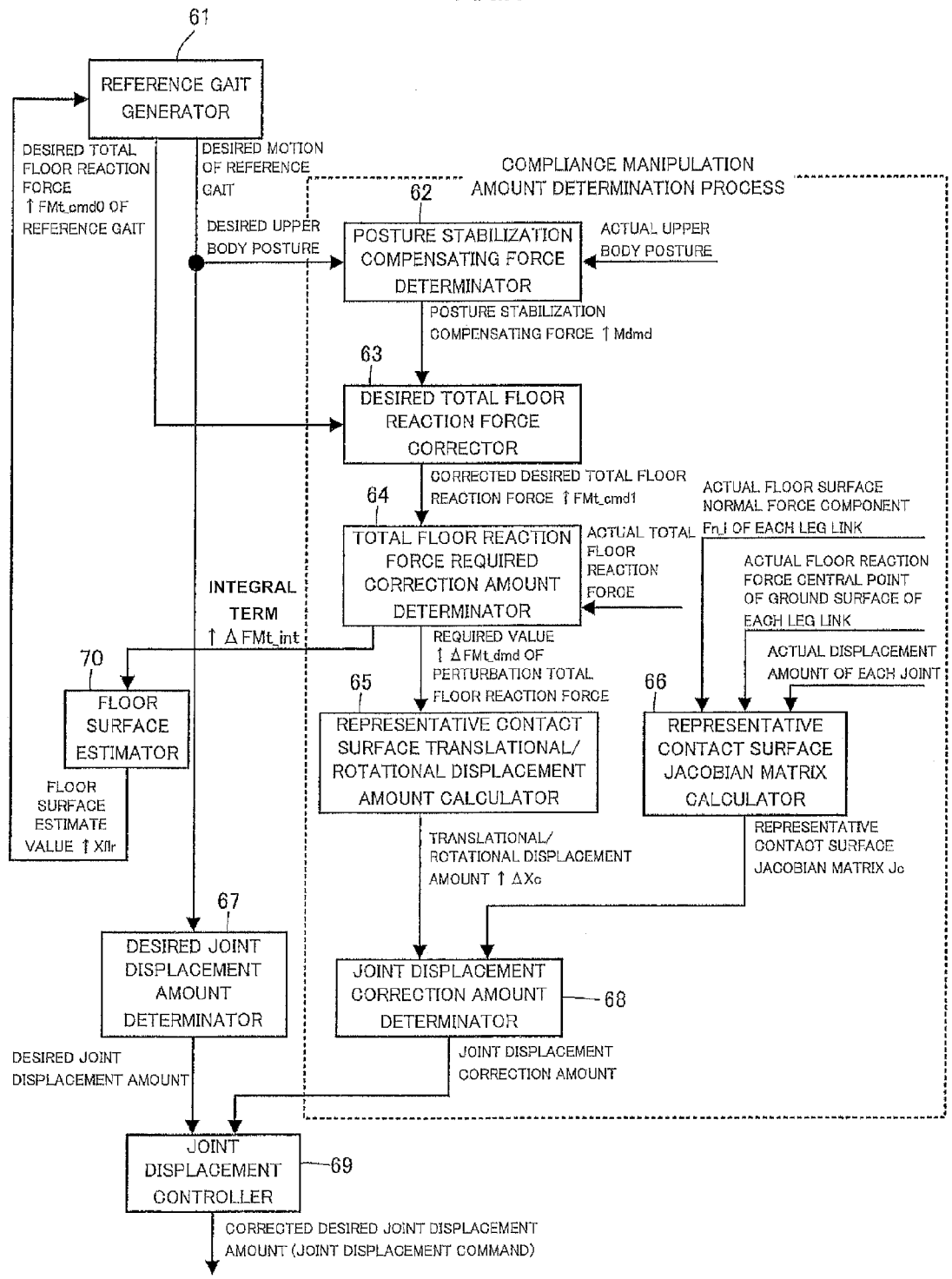
FIG. 6 is a block diagram showing functions of the controller shown in FIG. 2 in the second embodiment.

The following describes a second embodiment of the present invention with reference to FIG. 6. This embodiment differs from the first embodiment only in part of the process of the controller 50. Accordingly, the difference from the first embodiment is mainly described below, while omitting the description of the same matter as the first embodiment.

In this embodiment, the controller 50 further includes a function of estimating the position and posture of the actual floor surface in the mobile environment of the mobile object 1 using the parameter calculated for the motion control of the mobile object 1, simultaneously with the motion control of the mobile object 1.

In detail, as shown in FIG. 6, the controller 50 includes a floor surface estimator 70 which estimates the position and posture of the actual floor surface, in addition to the reference gait generator 61, the posture stabilization compensating force determinator 62, the desired total floor reaction force corrector 63, the total floor reaction force required correction amount determinator 64, the representative contact surface translational/rotational displacement amount calculator 65, the representative contact surface Jacobian matrix calculator 66, the desired joint displacement amount determinator 67, the joint displacement correction amount determinator 68, and the joint displacement controller 69 described in the first embodiment.

The floor surface estimator 70 is a functional unit realized by a program (or hardware structure) implemented in the controller 50, as with the other functional units. The process of the floor surface estimator 70 is as follows.

[Process of the Floor Surface Estimator 70]

The controller 50 executes the process of the floor surface estimator 70, simultaneously with the drive control of each joint of the mobile object 1 described in the first embodiment. The floor surface estimator 70 is a functional unit which calculates a floor surface estimate value that is an estimated value of the position and posture of the actual floor surface on which each leg link 3 of the mobile object 1 is grounded.

For this process, the value of the integral term (second term) of the right side of the equation (41) as the component of the required value ↑ΔFMt_dmd of the perturbation total floor reaction force ↑ΔFMt is input to the floor surface estimator 70 from the total floor surface force required correction amount determinator 64. That is, the integral (=∫(Kestm·↑Dfmt_filt)) of the value obtained by multiplying the low-pass filtering result ↑Dfmt_filt of the error ↑Dfmt (=↑FMt_cmd1−↑FMt_act) between the corrected desired total floor reaction force ↑FMt_cmd1 and the observed actual total floor reaction force ↑FMt_act by the predetermined gain Kestm (scalar or diagonal matrix) is input to the floor surface estimator 70 from the total floor surface force required correction amount determinator 64. Hereafter, this value of the integral term is denoted by ↑ΔFMt_int, as shown in the following equation (45).

$$\uparrow \Delta FMt\_int = \int(Kestm \cdot \uparrow Dfmt\_filt) \quad (45)$$

By the drive control of each joint of the mobile object 1 mentioned earlier, the displacement amount of each joint is controlled so that the observed actual total floor reaction force ↑FMt_act follows the corrected desired total floor reaction force ↑FMt_cmd1 (i.e. so that the error ↑Dfmt approaches zero). This being so, the value ↑ΔFMt_int of the integral term is induced by the steady-state error of the position and posture of the supposed floor surface used for the generation of the reference gait from the actual floor surface.

This indicates that the spring translational/rotational displacement amount of the representative contact surface corresponding to ↑ΔFMt_int corresponds to the steady-state error of the position and posture of the supposed floor surface used for the generation of the desired motion of the reference gait from the actual floor surface.

In view of this, the floor surface estimator 70 obtains the result (↑Xc_int) of converting the input value ↑ΔFMt_int of the integral term to the spring translational/rotational displacement amount according to the equation (28-1), as the error of the position and posture of the supposed floor surface.

In more detail, the result (=Kc_org$^{-1}$·↑ΔFt_int) of multiplying the translational force component ↑ΔFt_int in the integral term value ↑ΔFMt_int by the inverse matrix Kc_ore$^{-1}$ of the translational spring constant matrix Kc_org of the representative contact surface is set as the error ↑Xc_org_int of the position of the supposed floor surface.

Likewise, the result (=Kc_rot$^{-1}$·↑ΔMt_int) of multiplying the moment component ↑ΔMt_int in the integral term value ↑ΔFMt_int by the inverse matrix Kc_rot$^{-1}$ of the rotational spring constant matrix Kc_rot of the representative contact surface is set as the error ↑Xc_rot_int of the posture of the supposed floor surface.

The floor surface estimator 70 then corrects the position and posture of the supposed floor surface according to the error TXc int calculated in the above manner, thereby determining the floor surface estimate value as the estimated value of the position and posture of the actual floor surface.

In this embodiment, the floor surface estimate value determined by the floor surface estimator 70 in this way is provided to the reference gait generator 61. The reference gait generator 61 updates the supposed floor surface used for the generation of the reference gait according to the floor surface estimate value, on a regular basis (e.g. each time the mobile object 1 takes one step or each time the mobile object 1 takes a plurality of steps during the walking motion).

The supposed floor surface used for the generation of the reference gait is not necessarily determined according to only the floor surface estimate value. For example, in the case where the position and posture of the actual floor surface can be estimated based on floor information provided from a vision sensor mounted in the mobile object 1 or from outside, the floor surface estimate value may be used for reliability evaluation of the position and posture of the estimated floor surface or complementary correction of the position and posture of the estimated floor surface.

This embodiment is the same as the first embodiment, except for the matter described above.

The correspondence relation between this embodiment and the present invention is as follows. The total floor reaction force required correction amount determination element, the representative contact surface position/posture displacement amount calculation element, the representative contact surface Jacobian matrix calculation element, the joint displacement correction amount determination element, and the joint displacement control element in the present invention (more specifically, the first, second, fourth, fifth, seventh, or ninth invention) are realized respectively by the total floor reaction force required correction amount determinator 64, the representative contact surface translational/rotational displacement amount calculator 65, the representative contact surface Jacobian matrix calculator 66, the joint displacement correction amount determinator 68, and the joint displacement controller 69 in this embodiment, as in the first embodiment.

Moreover, the pseudo inverse matrix calculation parameter determination element in the present invention (more specifically, the fifth or ninth invention) is realized by STEPS 2 to 9 in FIG. 5 in the process executed by the joint displacement correction amount determinator 68 in this embodiment, as in the first embodiment.

Furthermore, the floor surface estimation element in the present invention (more specifically, the fourth invention) is realized by the floor surface estimator 70 in this embodiment. The controller 50 including the floor surface estimator 70 functions as the floor surface estimator in the seventh invention.

The floor surface estimator 70 includes the function of the representative contact surface steady-state displacement amount calculation element in the present invention (more specifically, the fourth or seventh invention). In more detail, the representative contact surface steady-state displacement amount calculation element is realized by the process whereby the floor surface estimator 70 calculates the error ↑Xc_int of the position and posture of the supposed floor surface from the integral term value ↑ΔFMt_int according to the equation (28-1). This error ↑ΔXc_int corresponds to the representative contact surface steady-state displacement amount in present invention.

According to this embodiment, the same advantageous effects as the first embodiment can be attained with regard to the drive control of each joint of the mobile object 1.

In addition, in this embodiment, while performing the drive control of each joint of the mobile object 1 so that the actual total floor reaction force follows the corrected desired total floor reaction force ↑ΔFMt_cmd1, the translational/rotational displacement amount ↑Xc_int of the representative contact surface corresponding to the integral term value ↑ΔFMt_int as the component of the required value ↑ΔFMt_dmd of the perturbation total floor reaction force ↑ΔFMt is calculated according to the equation (28-1), in order to estimate the position and posture of the actual floor surface.

Thus, ↑Xc_int as the steady-state error of the position and posture of the supposed floor surface from the actual floor surface can be calculated with high reliability. This contributes to accurate estimation of the position and posture of the actual floor surface.

[Modifications of the First and Second Embodiments]

The following describes modifications of the first and second embodiments described above.

Though each of the above embodiments describes the case where the mobile object 1 is a legged mobile robot having two leg links 3R and 3L, the mobile object may instead be, for example, a robot having three or more leg links. In such a case, the process of the controller 50 is the same as that in the embodiment, except for the process of the representative contact surface Jacobian matrix calculator 66. In the process of the representative contact surface Jacobian matrix calculator 66, the representative contact surface Jacobian matrix Jc is calculated using an equation where the value of N in the equation (27) is set to the number of leg links. Here, the weight coefficient r_i, the matrix A_i, and the leg link Jacobian matrix J_i necessary for the calculation are calculated in the same way as in the embodiment.

Though each of the above embodiments describes the case where the distal end of each leg link 3 of the mobile object 1 is made of the foot 18 where the floor reaction force moment acting thereon can be changed (the floor reaction force central point can be changed on the ground surface of the distal end), the distal end of each leg link may have a structure where the floor reaction force moment cannot be changed.

Figure 7:
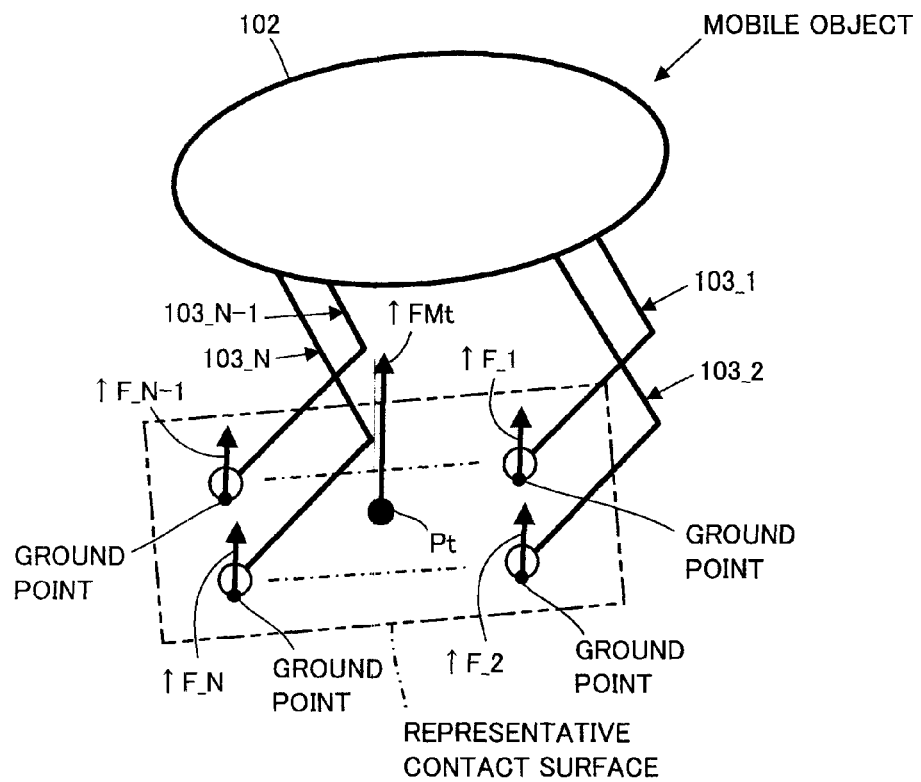
FIG. 7 is a diagram showing another example of the mobile object to which the present invention is applied.

For example, the distal end of each leg link 103_i (i=1, 2, ... N) may be spherical (more typically, a structure whose contact surface with the floor surface is substantially a point (including a structure whose contact surface with the floor surface has a minute area)), as shown in FIG. 7.

In such a case, the point contact surface (ground point) of each leg link 103_i with the floor surface coincides with the floor reaction force central point. This makes it substantially impossible to apply (and change) the floor reaction force moment to the leg link 103_i.

Since the perturbation floor reaction force moment ↑M_i that can be added to the leg link 103_i is constantly zero, the spring rotational displacement amount ↑Xrot_i (=Krot_i·↑M_i) of the ground surface of the leg link 103_i is constantly zero, too. Accordingly, the Jacobian matrix Jrot_i representing the relation between the spring displacement amount ↑Xrot_i and the change amount ↑Δq1 of the generalized variable vector ↑q1 per unit time is constantly a zero matrix.

The leg link Jacobian matrix J_i in this case is J_i=[Jorg_i, 0]$^T$, according to the equation (26c). Thus, the process of calculating the representative contact surface Jacobian matrix Jc by the equation (27) is equivalent to the process of calculating Jc by the following equation (27a).

$$Jc = \sum_{i=1}^{N} \left( r\_i \cdot \begin{bmatrix} I \\ Rk \cdot VV\_i \end{bmatrix} \cdot \text{Jorg\_i} \right) \quad (27a)$$

In the equation (27a), r_i, Rk, and VV_i are the same as those in the equation (22). Jorg_i is the Jacobian matrix shown in the equation (26a), i.e. the Jacobian matrix representing the relation between the spring translational displacement amount ↑Xorg_i of the i-th leg ground surface and the change amount ↑Δq1 of the generalized variable vector ↑q1 per unit time.

The values of r_i, Rk, and VV_i for calculating the equation (27a) can be determined in the same way as in each of the above embodiments. Moreover, since J_i=[Jorg_i, 0]$^T$, Jorg_i can be calculated in the same way as the calculation of the leg link Jacobian matrix J_i in each of the above embodiments.

Figure 8:
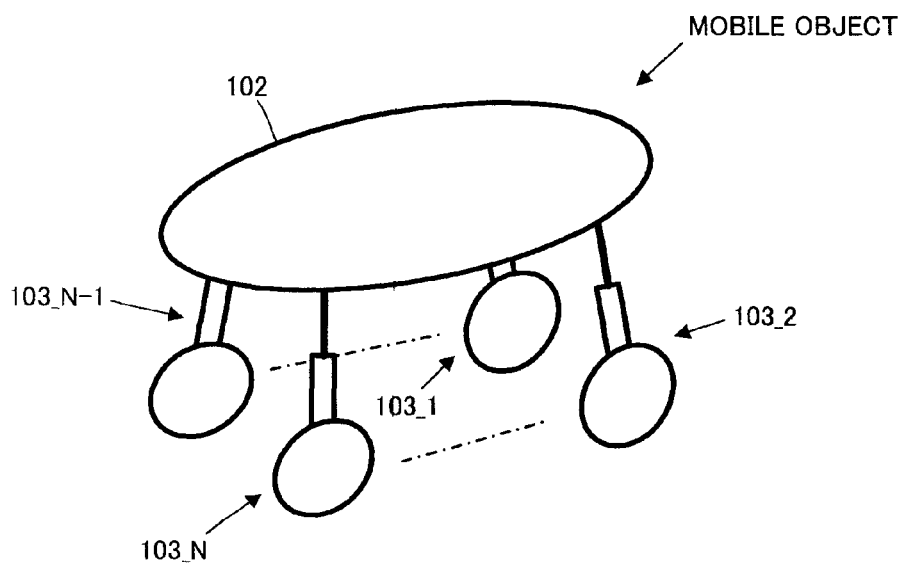
FIG. 8 is a diagram showing another example of the mobile object to which the present invention is applied.
Figure 9:
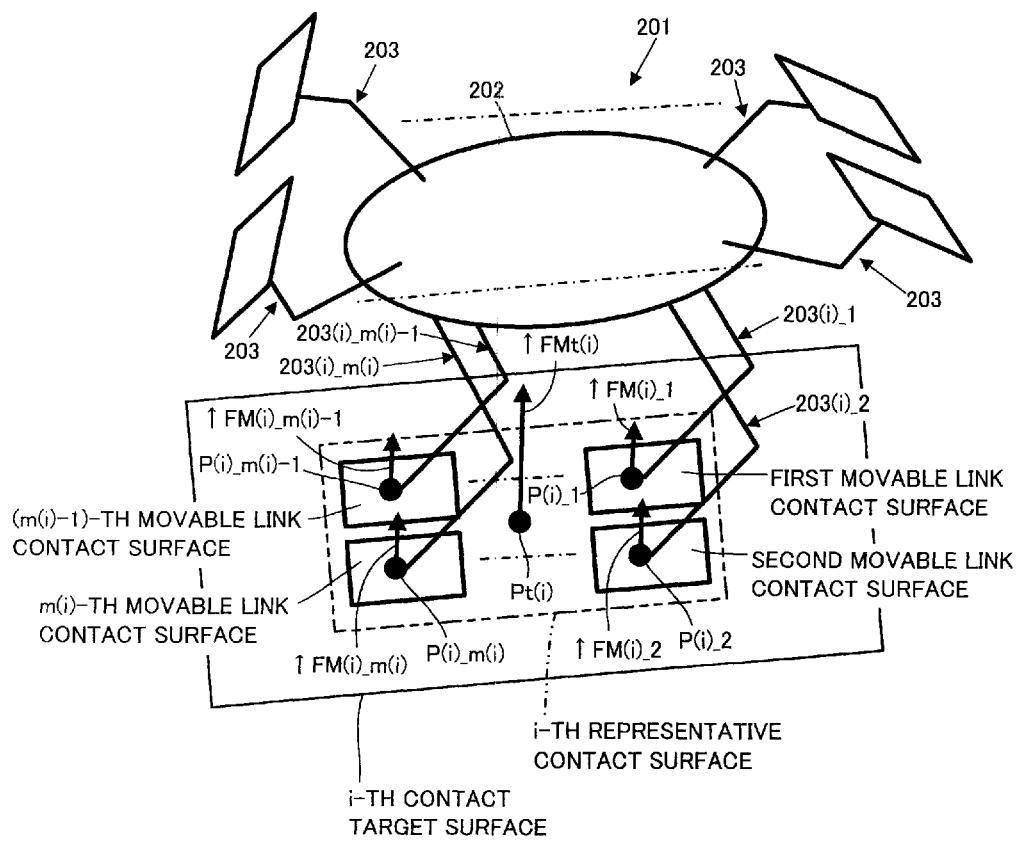
FIG. 9 is a diagram schematically showing a typical example of a mobile object for illustrating the present invention and a contact force acting on the mobile object from an arbitrary contact target surface.

The mobile object may be a mobile object of a structure in which the distal end of each leg link 103_i (i=1, 2, ... , N) is wheeled, as shown in FIG. 8 as an example.

Though each of the above embodiments describes the case where the corrected desired total floor reaction force ↑FMt_cmd1 obtained by correcting the desired total floor reaction force of the reference gait by the posture stabilization compensating force (floor reaction force moment) ↑Mdmd determined based on the error between the desired upper body posture and the actual upper body posture is set as the desired value to be followed by the actual total floor reaction force, the desired total floor reaction force ↑FMt_cmd0 of the reference gait may instead be set as the desired value to be followed by the actual total floor reaction force. In such a case, the posture stabilization compensating force determinator 62 and the desired total floor reaction force corrector 63 are unnecessary, and the total floor reaction force required correction amount determinator 64 determines the required value ↑ΔFMt_dmd of the perturbation total floor reaction force ↑ΔFMt using the desired total floor reaction force ↑FMt_cmd0 of the reference gait instead of the corrected desired total floor reaction force ↑FMt_cmd1.

Though the second embodiment describes the case where the required value ↑ΔFMt_dmd of the perturbation total floor reaction force ↑ΔFMt is determined by combining (adding) the integral term and the proportional term according to the error ↑Dfmt (=↑FMt_cmd1−↑FMt_act) between the corrected desired total floor reaction force ↑FMt_cmd1 and the observed actual total floor reaction force ↑FMt_act, the integral term (=↑ΔFMt_int) itself may be determined as the required value ↑ΔFMt_dmd of the perturbation total floor reaction force ↑ΔFMt.

In this case, the spring translational/rotational displacement amount ↑ΔXc of the representative contact surface calculated from ↑ΔFMt_dmd by the representative contact surface translational/rotational displacement amount calculator 65 corresponds to the steady-state error ↑Xc_int of the position and posture of the supposed floor surface from the actual floor surface.

Accordingly, the floor surface estimator 70 does not need to calculate ↑Xc_int by the equation (28-1). The floor surface estimator 70 determines the floor surface estimate value, by correcting the position and posture of the supposed floor surface based on the spring translational/rotational displacement amount ↑ΔXc of the representative contact surface calculated by the representative contact surface translational/rotational displacement amount calculator 65. This corresponds to an embodiment of the third or sixth invention.

Third Embodiment

The following describes a third embodiment of the present invention with reference to FIGS. 10 to 14.

Figure 10:
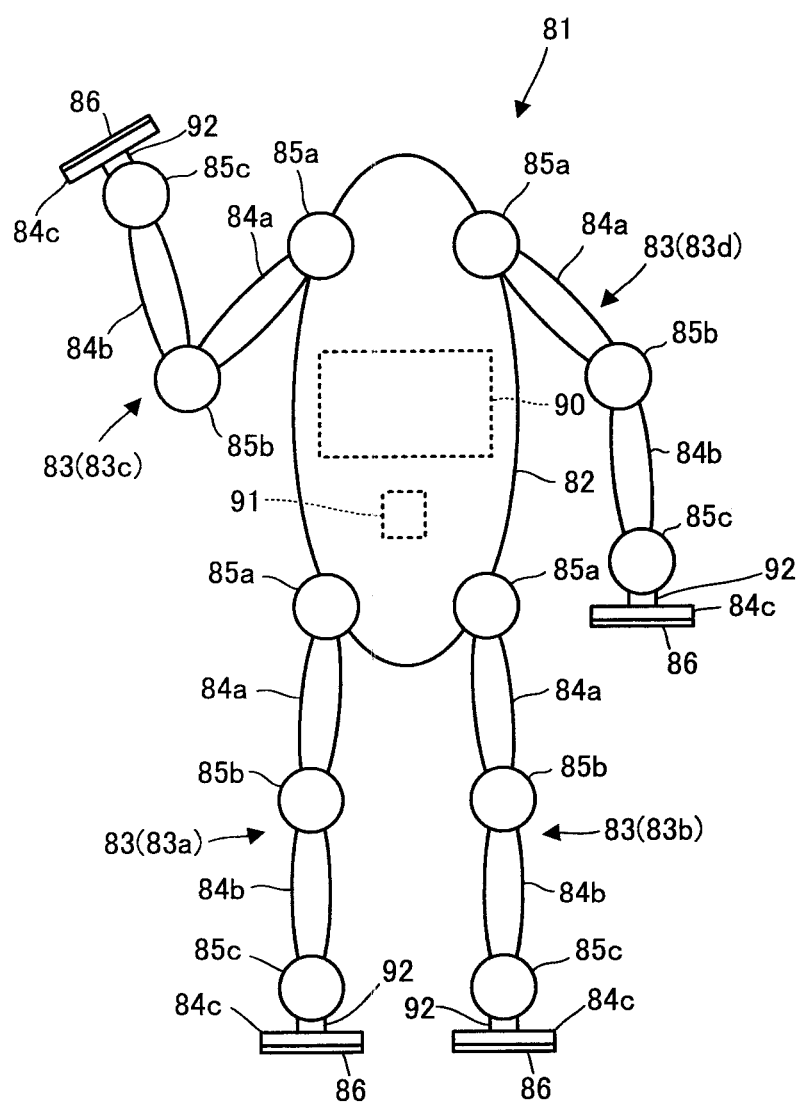
FIG. 10 is a diagram showing a schematic structure of a mobile object in a third embodiment of the present invention.

In FIG. 10, a mobile object 81 exemplified in this embodiment is a mobile robot that includes a body 82 and a plurality of movable links 83a to 83d (hereafter also generically referred to as movable links 83) extending from the body 82. In this embodiment, the number of movable links 83 is four, as an example.

Each movable link 83 is a link mechanism capable of functioning as a leg or an arm of the mobile object 81. Each movable link 83 includes a plurality of element links 84a to 84c (hereafter also generically referred to as element links 84) and a plurality of joints 85a to 85d (hereafter also generically referred to as joints 85) that connect the element links 84 in sequence from the body 82 side.

In this embodiment, each of the number of element links 84 and the number of joints 85 constituting each movable link 83 is three, as an example. Of the three element links 84a to 84c, the element link 84a is connected to the body 82 via the joint 85a, the element link 84b is connected to the element link 84a via the joint 85b, and the element link 84c is connected to the element link 84b via the joint 85c.

Of the element links 84a to 84c, the element link 84c forming the distal end of the movable link 83 is a portion (i.e. a portion corresponding to a foot or a hand) that contacts a contact target surface such as a floor surface or a wall surface existing in a mobile environment of the mobile object 81 while the mobile object 81 is in motion.

In this embodiment, the element link 84c (hereafter also referred to as the distal end 84c of the movable link 83) is substantially plate-like, and has a flat surface as a contact surface that contacts the floor surface, the wall surface, or the like. An elastic member 86 made of rubber or the like is attached to the contact surface of the element link 84c. The element link 84c contacts the contact target surface such as the floor surface or the wall surface, via the elastic member 86.

Figure 11:
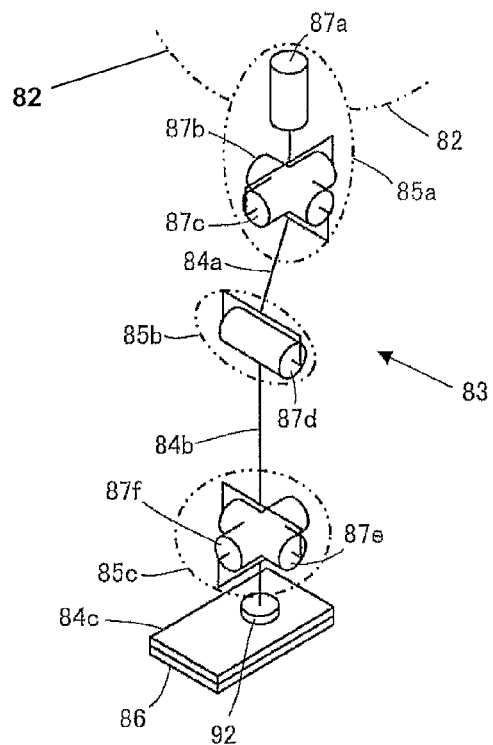
FIG. 11 is a diagram showing a structure of each movable link of the mobile object shown in FIG. 10.

Each of the joints 85a to 85c is composed of one or more joints, as shown in FIG. 11 as an example.

In detail, the joint 85a is, for example, composed of three joints 87a, 87b, and 87c, and has rotational freedom about three axes. The joint 85b is, for example, composed of one joint 87d, and has rotational freedom about one axis. The joint 85c is, for example, composed of two joints 87e and 87f, and has rotational freedom about two axes. Accordingly, each movable link 83 has a total of 6 degrees of freedom of movement, and so is capable of moving spatially.

The structure of each movable link 83 is not limited to the above-mentioned structure. For instance, each movable link 83 may include not only a rotational joint but also a prismatic joint. Besides, each movable link 83 may have 7 degrees of freedom of movement or more.

Moreover, the structure (the size of each element link 84 or the number of element links 84, the structure of each joint 85 or the number of joints 85) of each movable link 83 may not necessarily be the same. As an example, in the case where the movable links 83a and 83b are mainly used as legs while the movable links 83c and 83d are mainly used as arms, the structure of the movable links 83a and 83b may be different from the structure of the movable links 83c and 83d.

Though not shown in FIGS. 10 and 11, the mobile object 81 is provided with a plurality of electric motors 88 (shown in FIG. 12) as joint actuators for driving the respective joints 87a to 87f (hereafter also generically referred to as joints 87) described above. Each electric motor 88 is connected to the corresponding joint 87 so as to transmit drive power (rotating drive power) through a power transmission mechanism (not shown) including a reducer.

Each joint actuator may be an actuator other than an electric motor, such as a hydraulic actuator.

In the mobile object 81 having the above-mentioned structure, each movable link 83 is spatially moved by driving each joint 87 of the movable link 83 by the corresponding electric motor 88. This motion enables the mobile object 81 to move (including travel).

For example, moving the two movable links 83a and 83b as leg links out of the movable links 83a to 83d in the same pattern (gait) as human walking enables the mobile object 81 to walk.

Moreover, moving the movable link 83c or 83d as an arm link enables the mobile object 81 to perform a motion such as pushing the wall surface.

Alternatively, moving the four movable links 83a to 83d as leg links in the same pattern as a quadrupedal animal enables the mobile object 81 to move on the floor surface.

Not only the movable links 83 but also a head or the like may be connected to the body 82 of the mobile object 81. Moreover, for example, the body 82 may be composed of two half bodies which are connected to each other via a joint.

In this embodiment, a controller 90 made of an electronic circuit unit including a CPU, a RAM, a ROM, and the like and various sensors are provided to perform motion control of the mobile object 81 having the above-mentioned structure.

Figure 12:
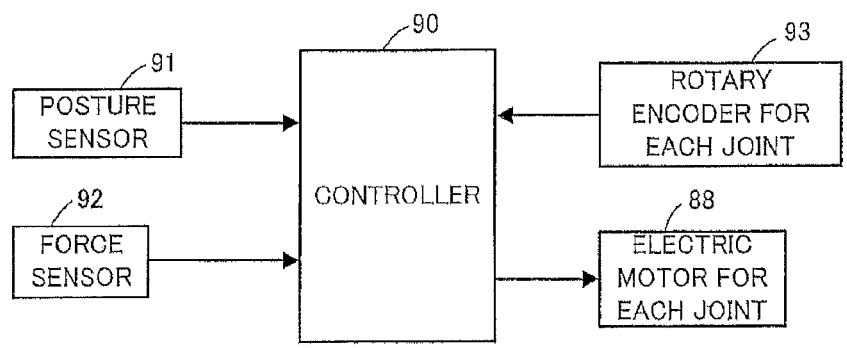
FIG. 12 is a block diagram showing a structure relating to control of the mobile object shown in FIG. 10.

As the sensors, a posture sensor 91 mounted in the body 82 for measuring a posture angle (one or both of an inclination angle in the vertical direction and an azimuth angle about the yaw axis) of the body 82 of the mobile object 81, a temporal change rate (angular velocity) of the posture angle, or the like and a force sensor 92 disposed between the joint 85c and the distal end (element link) 84c of each movable link 83 for measuring a contact force (reaction force) received from an external contact target surface in a state where the distal end 84c of the movable link 83 contacts the contact target surface are provided as shown in FIG. 12.

The posture sensor 91 is composed of, for example, a gyroscope for detecting an angular velocity about the three axes and an accelerometer for detecting acceleration in the directions of the three axes. Each force sensor 92 is composed of, for example, a six-axis force sensor for detecting a translational force in the directions of the three axes and a moment about the three axes.

Though not shown in FIGS. 10 and 11, the mobile object 81 is also provided with, for example, a rotary encoder 93 (shown in FIG. 12) as a sensor for detecting the amount of displacement (rotating angle) of each joint 87. Alternatively, another sensor such as a potentiometer may be used as the sensor for detecting the amount of displacement (rotating angle) of each joint 87.

The output of each of the above-mentioned sensors 91, 92, and 93 is input to the controller 90. Through the use of observed values (such as a measured value of the posture angle of the body 82 or its temporal change rate (angular velocity), a measured value of the moving velocity of the body 82, a measured value of the contact force acting on the distal end 84c of each movable link 83, and a measured value of the amount of displacement of each joint 87 or its temporal change rate) of a motion state of the mobile object 81 recognized from these input values, the controller 90 determines a desired value (hereafter referred to as a joint displacement command) of the amount of displacement of each joint 87 for realizing a desired motion of the mobile object 81. The controller 90 controls the actual amount of displacement (actual displacement amount) of each joint 87 via the corresponding electric motor 88, according to the joint displacement command.

Figure 13:
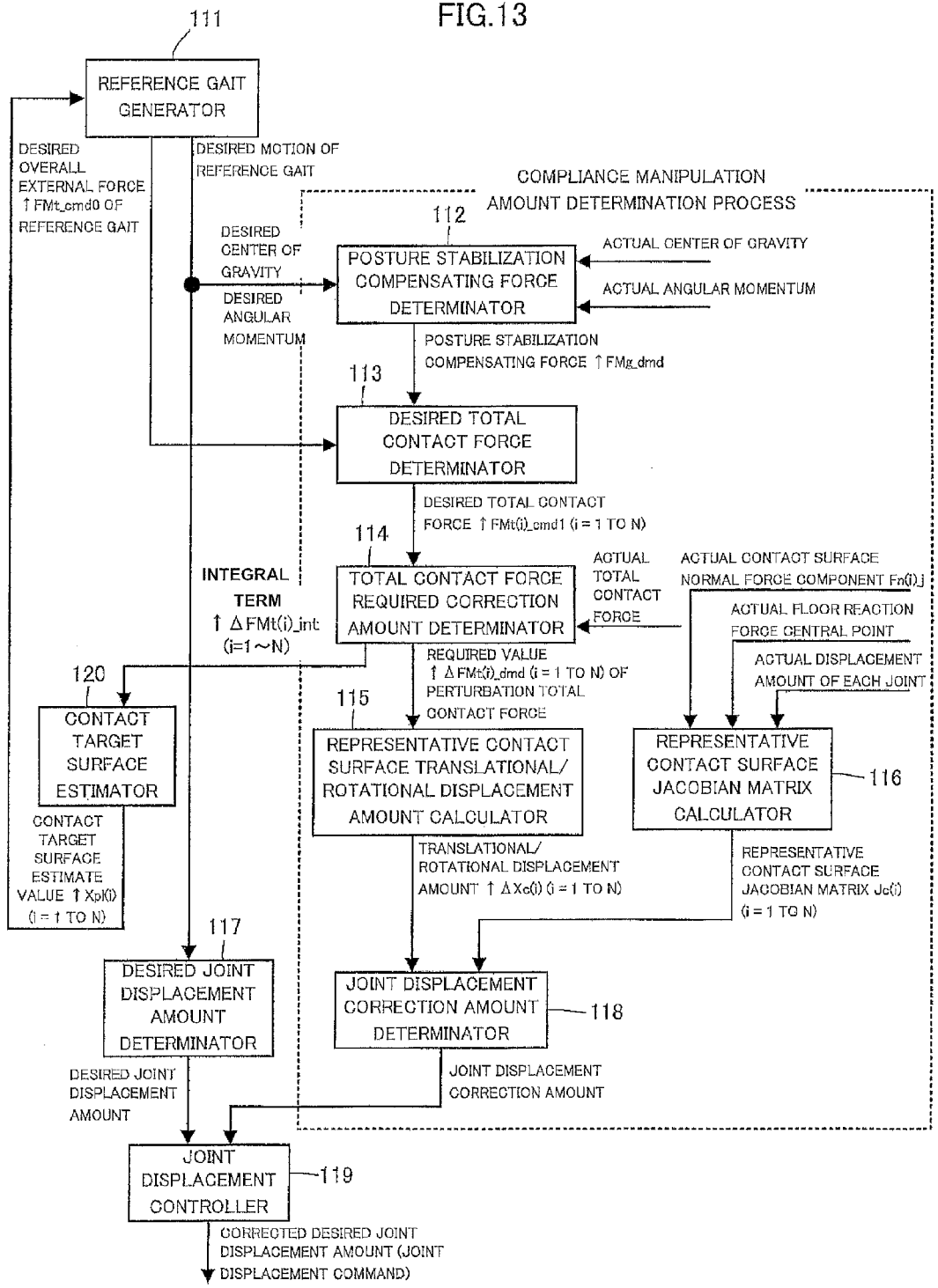
FIG. 13 is a block diagram showing functions of a controller shown in FIG. 10.

To execute such control, the controller 90 includes, as main functions realized by an implemented program, a reference gait generator 111, a posture stabilization compensating force determinator 112, a desired total contact force determinator 113, a total contact force required correction amount determinator 114, a representative contact surface translational/rotational displacement amount calculator 115, a representative contact surface Jacobian matrix calculator 116, a desired joint displacement amount determinator 117, a joint displacement correction amount determinator 118, a joint displacement controller 119, and a contact target surface estimator 120, as shown in FIG. 13.

The controller 90 sequentially executes, in a predetermined processing cycle, the processes of the reference gait generator 111, the posture stabilization compensating force determinator 112, the desired total contact force determinator 113, the total contact force required correction amount determinator 114, the representative contact surface translational/rotational displacement amount calculator 115, the representative contact surface Jacobian matrix calculator 116, the desired joint displacement amount determinator 117, the joint displacement correction amount determinator 118, and the joint displacement controller 119, thereby sequentially determining the joint displacement command of each joint. The controller 90 controls the corresponding electric motor 88 via a motor drive circuit not shown, according to the joint displacement command.

Simultaneously with the above-mentioned control process, the controller 90 also executes the process of the contact target surface estimator 120, thereby estimating the position and posture of a specific contact target surface out of the actual contact target surfaces existing in the mobile environment of the mobile object 81.

The controller 90 may include a plurality of CPUs. Moreover, the controller 90 may not be a single unit. For instance, the controller 90 may be made up of a plurality of units each of which includes a CPU, a processor, or the like.

All or part of the above-mentioned functional units of the controller 90 may be realized by hardware.

The following describes the process of the controller 90 including the detailed process of each of the functional units, using an example where the mobile object 81 moves as shown in FIG. 14.

[Process of the Reference Gait Generator 111]

In this embodiment, the controller 90 generates a reference gait as a reference desired gait of the mobile object 81 by the reference gait generator 111.

The reference gait includes a desired motion defining a trajectory of a spatial position and spatial posture (spatial orientation) desired for each portion of the mobile object 81 (thus defining a trajectory of a displacement amount desired for each joint of the mobile object 81), and a desired overall external force defining a trajectory of an overall external force as a total external force to be applied to the mobile object 81 from a contact target surface in order to realize the desired motion. The term "trajectory" means time series of an instantaneous value.

In this embodiment, the desired motion of the reference gait generated by the reference gait generator 111 is a desired motion of moving the mobile object 81 in a mobile environment in which a plurality of contact target surfaces including a floor surface exist. The desired motion includes a motion state in which at least one movable link 83 contacts each of the plurality of contact target surfaces and as a result the mobile object 81 receives a contact force as a reaction force from the plurality of contact target surfaces.

As an example of such a desired motion, a desired motion of moving the mobile object 81 as shown in FIG. 14 is used in this embodiment.

In this desired motion, the mobile object 81 basically performs a walking motion of moving the two movable links 83a and 83b as legs on a floor surface FL as a contact target surface existing in the mobile environment, to move on the floor surface FL along a travel path indicated by the dashed line A.

Here, the travel path A is a path through an opening WLa of a wall WL to which a door D that can be pushed open is attached. In the desired motion, the mobile object 81 performs a motion of pushing the door D open, when passing through the opening WLa.

In this motion, the mobile object 81 brings the distal end 84c of one of the movable links 83c and 83d, e.g. the movable link 83d, into contact with a surface Da (hereafter referred to as a door surface Da) of the door D in a state of facing the door D in close proximity, and pushes the door D by the movable link 83d in the contact state, thereby opening the door D. After opening the door D, the mobile object 81 moves through the opening WLa.

In such a desired motion, when pushing the door D open, the mobile object 81 contacts the floor surface FL and the door surface Da as two different contact target surfaces, and receives a contact force as a reaction force from the floor surface FL and the door surface Da.

The desired motion for causing the mobile object 81 to perform the above-mentioned motion is generated so as to bring the movable link 83 of the mobile object 81 into contact with a supposed contact target surface. The supposed contact target surface is a contact target surface model whose position and posture are set beforehand to match or approximate a shape (position and posture of each contact target surface portion) of an actual contact target surface such as a floor surface existing in the mobile environment of the mobile object 81.

In this embodiment, the supposed contact target surface used for generating the desired motion is updated according to a contact target surface (estimated contact target surface) estimated as representing an actual contact target surface by the contact target surface estimator 120, on a regular basis (each time the mobile object 81 takes one step or each time the mobile object 81 takes a plurality of steps during travel, or at fixed time intervals).

In the mobile object 81 in this embodiment, the desired motion includes: a desired movable link position/posture trajectory which is a trajectory of a desired position and desired posture of the distal end (element link) 84c of each movable link 83; a desired body position/posture trajectory which is a trajectory of a desired position and desired posture of the body 82; a desired center-of-gravity trajectory which is a trajectory of a desired position of the overall center of gravity of the mobile object 81; and a desired angular momentum trajectory which is a trajectory of a desired value of an angular momentum about the overall center of gravity of the mobile object 81.

Here, the "position" of the distal end (element link) 84c of the movable link 83 means a position of a representative point of the distal end 84c (e.g. a point of a specific position of a contact surface of the distal end 84c) arbitrarily set to represent a spatial position of the distal end 84c. The same applies to the "position" of the body 82. The "posture" of the distal end 84c of the movable link 83 means a spatial orientation of the distal end 84c. The same applies to the "posture" of the body 82.

The desired movable link position and posture and the desired body position and posture are expressed as a position and a posture in a global coordinate system as an inertial coordinate system fixed with respect to an arbitrary stationary object such as the floor surface in the mobile environment of the mobile object 81. As the global coordinate system, a supporting leg coordinate system whose origin is a point in a ground surface (contact surface with the floor surface) of one movable link 83 as a supporting leg (leg that supports the gravity of the mobile object 81 on the floor) of the mobile object 81, whose X axis is a horizontal axis in the front-back direction of the distal end (element link) 84c of the movable link 83, whose Z axis is an axis in the vertical direction, and whose Y axis is a horizontal axis in a direction orthogonal to the X axis and the Z axis is used as an example.

In this case, in the walking motion of the mobile object 81, the position of the origin and the directions of the X axis and the Y axis of the global coordinate system are updated each time the supporting leg changes. Alternatively, the global coordinate system may be, for example, a coordinate system steadily fixed with respect to the arbitrary stationary object such as the floor surface. In the following description, unless otherwise specified, the X axis, the Y axis, and the Z axis denote the three axes of the supporting leg coordinate system, for convenience's sake.

The desired center-of-gravity trajectory and the desired angular momentum trajectory are dependent on the desired movable link position/posture trajectory and the desired body position/posture trajectory of each movable link 3, and do not directly define the amount of displacement of each joint 87 of the mobile object 81. Accordingly, the desired center-of-gravity trajectory and the desired angular momentum trajectory may not necessarily be included in the desired motion of the reference gait generated by the reference gait generator 111.

In this embodiment, the reference gait generator 111 generates the desired center-of-gravity trajectory and the desired angular momentum trajectory, because the desired center-of-gravity trajectory and the desired angular momentum trajectory are used in the process of the posture stabilization compensating force determinator 112 described later.

In this embodiment, the reference gait generator 111 generates the desired motion of the reference gait for moving the mobile object 81 as shown in FIG. 14 in the following manner as an example.

In the process of generating the desired motion for the walking motion of the mobile object 81 before and after the motion of pushing the door D open, the desired movable link position/posture trajectory relating to the movable links 83c and 83d is determined so that, for example, the overall relative posture of the movable links 83c and 83d relative to the body 82 is steadily maintained constant. Meanwhile, the desired movable link position/posture trajectory and the desired body position/posture trajectory relating to the movable links 83a and 83b as legs are generated by, for example, the method proposed by the applicant of the present application in Japanese Patent No. 3726081 and the like.

The process of generating the desired movable link position/posture trajectory and the desired body position/posture trajectory of the movable links 83a and 83b is briefly described below. Parameters defining the desired movable link position/posture trajectory, such as a scheduled landing position and a scheduled landing time of the distal end 84c corresponding to the foot of each of the movable links 83a and 83b on a supposed floor surface (supposed contact target surface corresponding to the floor surface), are determined according to a requested moving direction or moving velocity, a motion schedule, or the like of the mobile object 81 provided to the controller 90 from outside the mobile object 81. The parameters may be input to the controller 90 from outside, or stored in a storage device of the controller 90 beforehand.

A desired ZMP trajectory as a desired position of the ZMP (Zero Moment Point) is determined according to the desired movable link position/posture trajectory of the movable links 83a and 83b defined by the parameters. The desired ZMP trajectory is determined so that the desired ZMP stays as much as possible at or near a central position in a supporting polygon on the supposed floor surface defined according to the desired movable link position/posture trajectory of the movable links 83a and 83b and also undergoes a smooth displacement (without step change).

Moreover, the desired body position/posture trajectory is determined so as to satisfy the desired ZMP (i.e. so that a horizontal component (component about the X axis and the Y axis) of a moment generated about the desired ZMP by a resultant force of an inertial force generated by the motion of the mobile object 81 and gravity acting on the mobile object 81 is zero), using an appropriate kinetic model representing the kinetics (relation between the floor reaction force as an external force and the motion of the mobile object 81) of the mobile object 81.

Further, the desired center-of-gravity trajectory and the desired angular momentum trajectory about the desired center of gravity are calculated from the desired movable link position/posture trajectory of each movable link 83 and the desired body position/posture trajectory, using a geometric model (rigid link model) of the mobile object 81. The rigid link model of the mobile object 81 is a model in which one or both of the mass and the inertia are set at each element link.

In the process of generating the desired motion for the motion of pushing the door D open, the desired movable link position/posture trajectory relating to the movable links 83a and 83b as legs is determined so that, for example, the distal end 84c of each of the movable links 83a and 83b is maintained in a state of being stationary while contacting (grounding on) the supposed floor surface in front of the door D. The desired ZMP trajectory is determined so that the desired ZMP stays substantially at or near a central position in a supporting polygon on the supposed floor surface.

Meanwhile, the desired movable link position/posture trajectory relating to the movable link 83c is determined so that, for example, the whole relative posture of the movable link 83c relative to the body 82 is steadily maintained constant.

The desired movable link position/posture trajectory relating to the movable link 83d for pushing the door D open is determined so that the distal end 84c of the movable link 83d is brought into contact with a predetermined portion of the door surface D and then moved so as to follow a motion of opening the door D (rotating motion about hinges) in a predetermined opening motion pattern.

An estimated value of a reaction force (contact force) which the mobile object 81 receives during the opening motion of the door D is further calculated using an appropriate kinetic model representing the relation between the opening motion of the door D and an external force acting on the door surface Da (or reaction force acting on the mobile object 81 from the door surface Da).

Moreover, the desired body position/posture trajectory is determined so as to satisfy the desired ZMP (i.e. so that a horizontal component (component about the X axis and the Y axis) of a moment generated about the desired ZMP by a resultant force of the inertial force generated by the motion of the mobile object 81 and the contact force applied to the mobile object 81 from the door surface Da is zero), using an appropriate kinetic model representing the kinetics (relation between the contact force (reaction force) acting on the mobile object 81 from the floor surface FL and the door surface Da as the contact target surfaces and the motion of the mobile object 81) of the mobile object 81.

Further, the desired center-of-gravity trajectory and the desired angular momentum trajectory about the desired center of gravity of the mobile object 81 are calculated from the desired movable link position/posture trajectory of each movable link 83 and the desired body position/posture trajectory using a geometric model (rigid link model) of the mobile object 81, as in the case of the walking motion of the mobile object 81.

The method of generating the desired motion of the mobile object 81 may be a known method other than the above-mentioned method, as long as it is possible to generate the feasible desired motion of the mobile object 81 in the mobile environment where the supposed contact target surface is set.

Moreover, the relative postures of the movable links 83c and 83d relative to the body 82 in the walking motion of the mobile object 81 may be changed in a desired pattern according to need. For instance, both movable links 83c and 83d may be swung back and forth with the walking motion of the mobile object 81.

In such a case, the desired body position/posture trajectory may be generated using a kinetic model that takes into consideration a change in overall center of gravity of the mobile object 81 or a change in angular momentum about the overall center of gravity of the mobile object 81 associated with a change in relative postures of the movable links 83c and 83d relative to the body 82.

For example, the desired movable link position/posture trajectories of the movable links 83a and 83b may be determined so that one or both of the movable links 83a and 83b as legs approach the door D with the opening motion of the door D.

Alternatively, the desired motion may be determined so that the opening motion of the door D is performed while the movable links 83c and 83d are both in contact with the door surface Da.

The constituents of the desired motion are not limited to the above-mentioned constituents. For example, in the case where the mobile object 81 includes a movable portion (e.g. head) relative to the body 82 other than the movable links 83, a trajectory of a desired position and desired posture of the portion is added to the desired motion.

In the case where each movable link 83 has 7 degrees of freedom or more, not only the desired movable link position/posture trajectory but also a desired position/posture trajectory of an intermediate part of each movable link 83 may be added to the desired motion, as an example.

The constituents of the desired motion may be appropriately set according to the structure of the mobile object 81 and the like, so long as the trajectory of the displacement amount of each joint of the mobile object 81 can be defined.

The desired overall external force of the reference gait defines the trajectory of the total external force (except the gravity) that needs to be kinetically applied to the mobile object 81 in order to move the mobile object 81 according to the desired motion. The desired overall external force includes: a desired overall translational external force which is a desired total translational force to be applied to the mobile object 81; and a desired overall moment external force which is a desired total moment to be applied to the mobile object 81. In more detail, the desired overall moment external force is expressed as a moment about an arbitrary reference point in the inertial coordinate system (e.g. the origin of the supporting leg coordinate system).

Hereafter, the desired overall translational external force (vector) and the desired overall moment external force (vector) in the desired overall external force of the reference gait are respectively denoted by $\uparrow$Ft_cmd0 and $\uparrow$Mt_cmd0. In this embodiment, each of $\uparrow$Ft_cmd0 and $\uparrow$Mt_cmd0 is a column vector composed of three components that are an X-axis component, a Y-axis component, and a Z-axis component.

The desired overall external force composed of $\uparrow$Ft_cmd0 and $\uparrow$Mt_cmd0 is denoted by $\uparrow$FMt_cmd0. $\uparrow$FMt_cmd0 is a column vector (six-component column vector) formed by arranging the components of $\uparrow$Ft_cmd0 and $\uparrow$Mt_cmd0. That is, $\uparrow$FMt_cmd0=[$\uparrow$Ft_cmd0, $\uparrow$Mt_cmd0]$^T$.

The desired overall translational external force $\uparrow$Ft_cmd0 in the desired overall external force $\uparrow$FMt_cmd0 is determined as a translational force (translational force obtained by inverting the sign of the resultant force) that is balanced with the resultant force of the gravity (product of a total mass of the mobile object 81 and a gravity acceleration vector) acting on the overall center of gravity of the mobile object 81 and the inertial force (result of inverting the sign of the product of the total mass and the translational acceleration vector of the overall center of gravity of the mobile object 81) generated by the motion (translational motion) of the overall center of gravity of the mobile object 81. Here, the inertial force is calculated using the desired center-of-gravity trajectory of the mobile object 81 and the total mass (predefined value) of the mobile object 81.

The desired overall moment external force $\uparrow$Mt_cmd0 in the desired overall external force $\uparrow$FMt_cmd0 is determined as a moment (moment obtained by inverting the sign of the resultant moment) that is balanced with the resultant moment of the inertial moment generated about the reference point in the inertial coordinate system by the translational motion of the overall center of gravity of the mobile object 81 and the inertial moment generated about the overall center of gravity of the mobile object 81 by the desired motion of the mobile object 81.

Here, the inertial moment generated about the reference point by the translational motion of the overall center of gravity of the mobile object 81 is calculated using the trajectory of the position vector of the desired center of gravity of the mobile object 81 relative to the reference point and the total mass of the mobile object 81.

Meanwhile, the inertial moment generated about the overall center of gravity of the mobile object 81 by the desired motion of the mobile object 81 is calculated using the desired motion of the mobile object 81 and the rigid link model (model in which one or both of the mass and the inertial force are set at each element link) of the mobile object 81.

The above describes the process of the reference gait generator 111. Note that the reference gait does not need to be generated during the movement of the mobile object 81. For example, the reference gait may be generated before the mobile object 81 starts to move, and stored in the storage device of the controller 90 beforehand or input to the controller 90 from outside by wireless communication according to need. In such a case, the controller 90 does not need to include the reference gait generator 111.

[Process of the Desired Joint Displacement Amount Determinator 117]

The controller 90 inputs the desired motion (in more detail, the desired movable link position/posture trajectory of each movable link 83 and the desired body position/posture trajectory in the desired motion) of the reference gait generated as described above to the desired joint displacement amount determinator 117, and executes the process of the desired joint displacement amount determinator 117.

The desired joint displacement amount determinator 117 is a functional unit which calculates a reference desired joint displacement amount that is the amount of displacement of each joint of the mobile object 81 defined by the desired motion of the reference gait. The desired joint displacement amount determinator 117 calculates the desired joint displacement amount of each joint of the mobile object 81 by inverse kinetic calculation, from the input desired motion.

In the case where the reference gait is generated beforehand, the desired joint displacement amount of each joint corresponding to the desired motion of the reference gait may be generated beforehand, too. In such a case, the controller 90 does not need to include the desired joint displacement amount determinator 117.

[Process of the Posture Stabilization Compensating Force Determinator 112]

The controller 90 executes the processes of the posture stabilization compensating force determinator 112, the desired total contact force determinator 113, the total contact force required correction amount determinator 114, the representative contact surface translational/rotational displacement amount calculator 115, the representative contact surface Jacobian matrix calculator 116, and the joint displacement correction amount determinator 118, simultaneously with (or before or after) the process of the desired joint displacement amount determinator 117.

These processes are a process for determining a manipulation amount (control input) for compliance control. This process is hereafter referred to as a compliance manipulation amount determination process. By the compliance manipulation amount determination process, the controller 90 determines a joint displacement correction amount for correcting the reference desired joint displacement amount of each joint corresponding to the reference gait.

In the compliance manipulation amount determination process, the controller 90 first executes the process of the posture stabilization compensating force determinator 112. The posture stabilization compensating force determinator 112 is a functional unit which determines, as a correction amount for correcting the desired overall external force ↑FMt_cmd0 of the reference gait, a posture stabilization compensating force that is an external force to be additionally applied to the mobile object 81 so that an error between a desired value of a required motion state quantity in the desired motion of the mobile object 81 and a value of an actual motion state quantity approaches zero.

The motion state quantity is a state quantity of a type set beforehand, as a quantity for stabilizing the posture of the mobile object 81. In this embodiment, the position of the overall center of gravity of the mobile object 81 and the angular momentum about the overall center of gravity of the mobile object 81 are employed as such a motion state quantity.

The posture stabilization compensating force determinator 112 determines, as the posture stabilization compensating force, a combination of a translational external force ↑Fg_dmd (hereafter referred to as a compensating translational external force ↑Fg_dmd) to be additionally applied to the mobile object 81 so that the error between the desired center of gravity of the reference gait and the observed value of the actual center of gravity of the mobile object 81 approaches zero and a moment external force ↑Mg_dmd (hereafter referred to as a compensating moment external force ↑Mg_dmd) to be additionally applied to the mobile object 81 so that the error between the desired angular momentum of the reference gait and the observed value of the actual angular momentum about the center of gravity of the mobile object 81 approaches zero.

Hereafter, a vector formed by arranging the compensating translational external force ↑Fg_dmd and the compensating moment external force ↑Mg_dmd is denoted by ↑FMg_dmd (=[↑Fg_dmd, ↑Mg_dmd]$^T$), and referred to as the posture stabilization compensating force.

The compensating translational external force ↑Fg_dmd of the posture stabilization compensating force ↑FMg_dmd is determined from the error between the desired center of gravity of the reference gait and the observed value of the actual center of gravity of the mobile object 81, by a predetermined feedback control law. For example, a PD law is used as the feedback control law.

In detail, in this embodiment, the compensating translational external force ↑Fg_dmd is determined by adding a proportional term obtained by multiplying, by a predetermined gain Kp, the error between the desired center of gravity ↑Pg_cmd of the reference gait generated by the reference gait generator 111 and the observed value of the actual center of gravity ↑Pg_act of the mobile object 81 and a derivative term obtained by multiplying, by a predetermined gain Kv, the error between the temporal change rate ↑Pg'_cmd of the desired center of gravity ↑Pg_cmd and the observed value of the temporal change rate ↑Pg'_act (i.e. temporal change rate of the observed value of ↑Pg_act) of the actual center of gravity ↑Pg_act of the mobile object 81, according to the following equation (34).

$$\uparrow Fg\_dmd = Kp \cdot (\uparrow Pg\_cmd - \uparrow Pg\_act) + Kv \cdot (\uparrow Pg'\_cmd - \uparrow Pg'\_act) \qquad (34)$$

↑Fg_dmd, ↑Pg_cmd, ↑Pg_act, ↑Pg'_cmd, and ↑Pg'_act are each a vector of three components (components in the directions of the three axes). The observed value of the actual center of gravity ↑Pg_act and its temporal change rate are calculated using the measured value of the actual displacement amount of each joint 87 indicated by the output of the rotary encoder 93, the measured value of the actual posture of the body 82 indicated by the output of the posture sensor 91, and the geometric model (rigid link model) of the mobile object 81.

The compensating moment external force ↑Mg_dmd of the posture stabilization compensating force ↑FMg_dmd is determined from the error between the desired angular momentum of the reference gait and the observed value of the angular momentum about the actual center of gravity of the mobile object 81, by a predetermined feedback control law. For example, a proportion law is used as the feedback control law in this embodiment In detail, in this embodiment, the compensating moment external force ↑Mg_dmd is determined by multiplying, by a predetermined gain KL, the error between the desired angular momentum ↑Lg_cmd of the reference gait generated by the reference gait generator 111 and the observed value of the actual angular momentum ↑Lg_act about the actual center of gravity of the mobile object 81, according to the following equation (35).

$$\uparrow Mg\_dmd = KL \cdot (\uparrow Lg\_cmd - \uparrow Lg\_act) \qquad (35)$$

↑Mg_cmd, ↑Lg_cmd, and ↑Lg_act are each a vector of three components (components about the three axes). The observed value of the actual angular momentum ↑Lg_act is calculated using the measured value of the actual displacement amount of each joint 87 indicated by the output of the rotary encoder 93, the measured value of the actual posture of the body 82 indicated by the output of the posture sensor 91, and the geometric model (rigid link model) of the mobile object 81.

The compensating translational external force ↑Fg_dmd may be determined by a feedback control law (e.g. the proportion law) other than the PD law. The compensating moment external force ↑Mg_dmd may be determined by a feedback control law (e.g. the PD law) other than the proportion law.

Though this embodiment describes the case where the posture stabilization compensating force determinator 112 receives the desired center of gravity ↑Pg_cmd and the desired angular momentum ↑Lg_cmd from the reference gait generator 111, the posture stabilization compensating force determinator 112 may calculate the desired center of gravity ↑Pg_cmd and the desired angular momentum ↑Lg_cmd from the desired motion of the reference gait.

[Process of the Desired Total Contact Force Determinator 113]

Next, the controller 90 executes the process of the desired total contact force determinator 113. The desired total contact force determinator 113 is a functional unit which corrects the desired overall external force ↑FMt_cmd0 of the reference gait by the posture stabilization compensating force ↑FMg_dmd determined as described above, and determines a desired total contact force ↑FMt(i)_cmd1 (i=1, 2, . . . , N) to be applied to the mobile object 81 from each of the N (N>1) contact target surfaces in contact with the mobile object 81 in order to realize the corrected desired overall external force (hereafter referred to as a corrected desired overall external force ↑FMt_cmd1).

In detail, the desired total contact force determinator 113 determines the corrected desired overall external force ↑FMt_cmd1, by adding the posture stabilization compensating force ↑FMg_dmd determined by the posture stabilization compensating force determinator 112 to the desired overall external force ↑FMt_cmd0 generated by the reference gait generator 111. That is, ↑FMt_cmd0+↑FMg_dmd is determined as ↑FMt_cmd1.

The corrected desired overall external force ↑FMt_cmd1 is a vector (=[↑Ft_cmd1, ↑Mt_cmd1]$^T$) composed of a translational external force ↑Ft_cmd1 and a moment external force ↑Mt_cmd1. ↑Ft_cmd1 (hereafter referred to as a corrected desired overall translational external force) is a result (=↑Ft_cmd0+↑Fg_dmd) of adding the desired overall translational external force ↑Ft_cmd0 of the reference gait and the compensating translational external force ↑Fg_dmd. ↑Mt_cmd1 (hereafter referred to as a corrected desired overall moment external force) is a result (=↑Mt_cmd0+↑Mg_dmd) of adding the desired overall moment external force ↑Mt_cmd0 of the reference gait and the compensating moment external force ↑Mg_dmd.

The desired total contact force determinator 113 distributes the corrected desired overall external force ↑FMt_cmd1 to all contact target surfaces (first to N-th contact target surfaces) currently in contact with the mobile object 81 according to a predetermined rule, and determines the desired total contact force ↑FMt(i)_cmd1 (i-th desired total contact force ↑FMt(i)_cmd1) (i=1, 2, . . . , N) to be applied to the mobile object 81 from each contact target surface (i-th contact target surface).

In more detail, the i-th desired total contact force ↑FMt(i)_cmd1 is determined as a desired value of a contact force acting on the mobile object 81 from a supposed i-th contact target surface (contact target surface whose spatial position and posture are set beforehand to match or approximate the actual i-th contact target surface) as a model of the i-th contact target surface.

The i-th desired total contact force ↑FMt(i)_cmd1 is a vector (=[↑Ft(i)_cmd1, ↑Mt(i)_cmd 1]$^T$) composed of a desired total translational contact force ↑Ft(i)_cmd1 as a desired value of a translational force (translational force component of the total contact force) acting on the mobile object 81 from an acting point on the supposed i-th contact target surface and a desired total contact force moment ↑Mt(i)_cmd1 as a desired value of a moment (moment component of the total contact force) acting on the mobile object 81 about the acting point.

In this embodiment, the acting point of the i-th desired total contact force ↑FMt(i)_cmd1 is an i-th desired total contact force central point set on the supposed i-th contact target surface as a desired position of a total contact force central point (the acting point of the total contact force such that the component about the axis parallel to the i-th contact target surface in the total contact force moment about the acting point is zero) for the total contact force acting on the mobile object 81 from the i-th contact target surface.

That is, the i-th desired total contact force ↑FMt(i)_cmd1 is a total contact force such that the contact force moment about the axis parallel to the supposed i-th contact target surface in the desired total contact force moment ↑Mt(1)_cmd1 is zero. In the determination process of each i-th desired total contact force ↑FMt(i)_cmd1 (i=1, 2, . . . , N), the desired total contact force central point (i-th desired total contact force central point) on the supposed i-th contact target surface is determined, too.

In this embodiment, the determination process of the first to N-th desired total contact forces ↑FMt(1)_cmd1 to ↑FMt(N)_cmd1 (process of distributing the corrected desired overall external force ↑FMt_cmd1) is performed in the following manner, as an example. In the case where there is only one current contact target surface in contact with the mobile object 81 (in the case where N=1), the corrected desired overall translational external force ↑Ft_cmd1 itself is determined as the desired total translational contact force ↑Ft(i)_cmd1 of the desired total contact force ↑FMt(i)_cmd1 corresponding to the single contact target surface.

Further, the desired total contact force central point is determined on the supposed contact target surface so that the component about the axis parallel to the supposed contact target surface in the moment (i.e. vector product of the position vector of the desired total contact force central point relative to the reference point and the desired total translational contact force ↑Ft(i)_cmd1) generated about the reference point when the desired total translational contact force ↑Ft(i)_cmd1 acts on the desired total contact force central point on the supposed contact target surface corresponding to the single contact target surface matches the component about the axis parallel to the supposed contact target surface in the corrected desired overall moment external force ↑Mt_cmd1.

The desired total contact force moment ↑Mt(i)_cmd1 of the desired total contact force ↑FMt(i)_cmd1 is then determined so that: the component about the axis parallel to the supposed contact target surface in ↑Mt(i)_cmd1 is zero; and the moment generated about the reference point by the component about the axis perpendicular to the supposed contact target surface in ↑Mt(i)_cmd1 and the component about the axis parallel to the supposed contact target surface in the corrected desired overall translational external force ↑Ft_cmd1 matches the component about the axis perpendicular to the supposed contact target surface in the corrected desired overall moment external force ↑Mt_cmd1.

In the case where there are two or more current contact target surfaces in contact with the mobile object 81 (in the case where N≧2), for example, the first to N-th desired total contact forces ↑FMt(1)_cmd1 to ↑FMt(N)_cmd1 are determined as follows.

A contact surface normal force component of each of the first to N-th desired total contact forces ↑FMt(1)_cmd1 to ↑FMt(N)_cmd1 is determined so that a translational force vector of a sum total of the contact surface normal force components (translational force components perpendicular to the corresponding supposed i-th contact target surfaces) of the first to N-th desired total contact forces ↑FMt(1)_cmd1 to ↑FMt(N)_cmd1 matches the component, in the corrected desired overall translational external force ↑Ft_cmd1, other than the component parallel to any of all supposed i-th contact target surfaces (i=1, 2, ..., N).

Moreover, a frictional force component of each of the first to N-th desired total contact forces ↑FMt(1)_cmd1 to ↑FMt(N)_cmd1 is determined so that a translational force vector of a sum total of the frictional force components (translational force components parallel to the corresponding supposed i-th contact target surfaces) of the first to N-th desired total contact forces ↑FMt(1)_cmd1 to ↑FMt(N)_cmd1 matches the component parallel to any of all supposed i-th contact target surfaces (i=1, 2, ..., N) in the corrected desired overall translational external force ↑Ft_cmd1.

Here, the frictional force component of each of the first to N-th desired total contact forces ↑FMt(1)_cmd1 to ↑FMt(N)_cmd1 is determined in such a manner that the i-th desired total contact force ↑FMt(i)_cmd1 corresponding to the supposed i-th contact target surface with a relatively small contact surface normal force component has a relatively small frictional force component.

For example, in the case where the contact surface normal force component of the first desired total contact force ↑FMt(1)_cmd1 is smaller than the contact surface normal force component of the second desired total contact force ↑FMt(2)_cmd1, the frictional force component of the first desired total contact force ↑FMt(1)_cmd1 is determined to be smaller than the frictional force component of the second desired total contact force ↑FMt(2)_cmd1.

The desired total translational contact force ↑Ft(i)_cmd1 of the i-th desired total contact force ↑FMt(i)_cmd1 (i=1, 2, ..., N) is then determined as a resultant translational force of the contact surface normal force component and the frictional force component.

Further, the first to N-th desired total contact force central points are determined so that a sum-total moment (i.e. moment vector of a sum-total vector product of the position vector of the i-th desired total contact force central point relative to the reference point and the i-th desired total translational contact force ↑Ft(i)_cmd1) generated about the reference point when each i-th desired total translational contact force ↑Ft(i)_cmd1 (i=1, 2, ..., N) determined in the above manner acts on the desired total contact force central point (i-th desired total contact force central point) on the corresponding supposed i-th contact target surface substantially matches or is extremely close to the corrected desired overall moment external force ↑Mt_cmd1.

For example, the first to N-th desired total contact central points can be determined as follows. For each supposed i-th contact target surface (i=1, 2, ..., N), a provisional value of the i-th desired total contact force central point is determined, and a sum-total moment generated about the reference point when the i-th desired total contact force ↑FMt(i)_cmd1 acts on the provisional i-th desired total contact force central point is calculated. An error between the sum-total moment and the corrected desired overall moment external force ↑Mt_cmd1 is calculated as an error moment.

A Jacobian matrix representing sensitivity of a change of the moment about the reference point to a change (change from the provisional value) of the position of each i-th desired total contact force central point is further calculated, and the error moment is multiplied by a pseudo inverse matrix of this Jacobian matrix to determine the amount of correction of the position of each i-th desired total contact force central point.

The position of each i-th desired total contact force central point is corrected from the provisional value by the determined correction amount, as a result of which each of the first to N-th desired total contact force central points is determined.

Moreover, a contact force moment about the axis perpendicular to the supposed i-th contact target surface in each i-th desired total contact force moment is determined. Here, the contact force moment (hereafter referred to as a torsional force moment) about the axis perpendicular to the supposed i-th contact surface is determined so that a resultant moment of a sum-total moment generated about the reference point when the i-th desired total translational contact force ↑Ft(i)_cmd1 acts on each i-th desired total contact force central point (i=1, 2, ..., N) determined as described above and the contact force moment about the axis perpendicular to the supposed i-th contact target surface (i=1, 2, ..., N) matches the corrected desired overall moment external force ↑Mt_cmd1.

Each i-th desired total contact force moment ↑Mt(i)_cmd1 (i=1, 2, ..., N) is then determined as a moment (moment such that the component about the axis parallel to the supposed i-th contact target surface is zero) that matches the torsional force moment determined as described above.

Here, instead of determining the torsional force moment so that the sum-total moment generated about the reference point by the first to N-th desired total contact forces ↑FMt(1)_cmd1 to ↑FMt(N)_cmd1 matches the corrected desired overall moment external force ↑Mt_cmd1, the correction amounts of the frictional force components of two or more i-th desired total translational contact forces ↑Ft(i)_cmd1 may be determined so that the sum total of the frictional force components of the first to N-th desired total translational contact forces ↑FMt(1)_cmd1 to ↑FMt(N)_cmd1 does not vary from the value matching the component parallel to any of all supposed i-th contact target surfaces (i=1, 2, ..., N) in the corrected desired overall translational external force ↑Ft_cmd1.

In this case, the correction amounts of the frictional force components of two or more i-th desired total translational contact forces ↑Ft(i)_cmd1 are determined so that the sum-total moment generated about the reference point when the i-th desired total translational contact force ↑Ft(i)_cmd1 after the correction acts on each i-th desired total contact force central point (i=1, 2, ..., N) matches the corrected desired overall moment external force ↑Mt_cmd1.

As an alternative, both the torsional force moment (=↑M(i)_cmd1) of the i-th desired total contact force ↑FMt(i)_cmd1 and the correction amounts of the frictional force components of two or more i-th desired total translational contact forces ↑Ft(i)_cmd1 may be determined so that the sum-total moment generated about the reference point by the first to N-th desired total contact forces ↑FMt(1)_cmd1 to ↑FMt(N)_cmd1 matches the corrected desired overall moment external force ↑Mt_cmd1.

Thus, in this embodiment, the first to N-th desired total contact forces ↑FMt(1)_cmd1 to ↑FMt(N)_cmd1 are determined together with the first to N-th desired total contact force central points so that the sum-total translational force of the first to N-th desired total translational contact forces ↑Ft(i)_cmd1 matches the corrected desired overall translational external force ↑Ft_cmd1 and also the sum-total moment generated about the reference point by the first to N-th desired total contact forces ↑FMt(1)_cmd1 to ↑FMt(N)_cmd1 matches the corrected desired overall moment external force ↑Mt_cmd1.

Here, each i-th desired total contact force central point (i=1, 2, ..., N) is determined within an area (area corresponding to the supporting polygon) that connects all contact surfaces of the mobile object 81 on the i-th contact target surface.

The above describes the detailed process of the desired total contact force determinator 113 in this embodiment.

Consider the case of moving the mobile object 81 as shown in FIG. 14, as an example. In the walking motion before and after the motion of pushing the door D open by the mobile object 81, the floor surface FL (hereafter referred to as a first contact target surface) is the only contact target surface.

In this situation, the first desired total contact force ↑FMt(1)_cmd1 corresponding to the desired total floor reaction force is determined by the above-mentioned process.

Here, the first desired total contact force central point is the desired total floor reaction force central point, and is set within the supporting polygon on the supposed first contact target surface (supposed floor surface). In a state where only one of the movable links 83a and 83b as legs is grounded (one-leg supporting state), the supporting polygon is the area of the contact surface between the distal end 84c of the grounded movable link 83a or 83b and the supposed first contact target surface. In a state where both movable links 83a and 83b are grounded (two-leg supporting state), the supporting polygon is the area that connects the contact surfaces of the distal ends 84c of the movable links 83a and 83b with the supposed first contact target surface.

In the motion of pushing the door D open, on the other hand, there are two contact target surfaces, namely, the floor surface FL (first contact target surface) and the door surface Da (hereafter referred to as a second contact target surface). In this situation, the first desired total contact force ↑FMt(1)_cmd1 (desired total floor reaction force) and the second desired total contact force ↑FMt(2)_cmd1 (desired total contact force from the door surface Da) are determined by the above-mentioned process.

The first desired total contact force central point corresponding to the desired total floor reaction force central point is set within the area of the supporting polygon on the supposed first contact target surface (supposed floor surface). The second desired total contact force central point is set within the area of the contact surface between the distal end 84c of the movable link 83d and the supposed second contact target surface corresponding to the door surface Da. The supposed second contact target surface is a surface (contact target surface whose position and posture change with time) that rotates about the hinges of the door D in a predetermined opening motion pattern of the door D.

The above-mentioned method of determining the first to N-th desired total contact forces ↑FMt(1)_cmd1 to ↑FMt(N)_cmd1 applies the method proposed earlier by the applicant of the present application in Japanese Patent Application No. 2010-44712 (Japanese Patent Application Laid-Open No. 2011-177838 or Published U.S. Patent Application No. US-2011-0213495-A1), which is described in detail in Japanese Patent Application No. 2010-44712. The method of determining each desired total contact force ↑FMt(i)_cmd1 is not a main feature of the present invention.

Accordingly, in this specification, the determination process of the first to N-th desired total contact forces ↑FMt(1)_cmd1 to ↑FMt(N)_cmd1 is only briefly described to avoid redundancy.

Note that the method of determining the first to N-th desired total contact forces ↑FMt(1)_cmd1 to ↑FMt(N)_cmd1 for the N contact target surfaces in contact with the mobile object 81 is not limited to the method proposed by the applicant of the present application in Japanese Patent Application No. 2010-44712. Any method is applicable as long as the first to N-th desired total contact forces ↑FMt(1)_cmd1 to ↑FMt(N)_cmd1 are determined so that the sum-total translational force of the first to N-th desired total translational contact forces ↑Ft(i)_cmd1 matches (or substantially matches) the corrected desired overall translational external force ↑Ft_cmd1, the sum-total moment generated about the reference point by the first to N-th desired total contact forces ↑FMt(1)_cmd1 to ↑FMt(N)_cmd1 matches (or substantially matches) the corrected desired overall moment external force ↑Mt_cmd1, and also the desired total contact force ↑FMt(i)_cmd1 of each contact target surface continuously (smoothly) changes.

[Process of the Total Contact Force Required Correction Amount Determinator 114]

Next, the controller 90 executes the process of the total contact force required correction amount determinator 114. The total contact force required correction amount determinator 114 is a functional unit which determines a required correction amount of the i-th total contact force so that the observed value of the actual total contact force (i-th total contact force) acting on the mobile object 81 from the i-th contact target surface (i=1, 2, . . . , N) follows the corresponding one of the first to N-th desired total contact forces ↑FMt(1)_cmd1 to ↑FMt(N)_cmd1 determined as described above.

The required correction amount of the i-th total contact force corresponds to a required value of the i-th perturbation total contact force ↑ΔFMt(i) in the equation (52). The required correction amount of the i-th total contact force is composed of: a required value of the i-th perturbation total translational contact force ↑ΔFt(i) as a required correction amount (three-component column vector) of the translational contact force in the i-th total contact force; and a required value of the perturbation total contact force moment ↑ΔMt(i) as a required correction amount (three-component column vector) of the contact force moment about the i-th desired total contact force central point.

Hereafter, the required value of the i-th perturbation total translational contact force ↑ΔFt(i) is denoted by ↑ΔFt(i)_dmd, and the required value of the i-th perturbation total contact force moment ↑ΔMt(i) is denoted by ↑ΔMt(i)_dmd. The required value of the i-th perturbation total contact force ↑ΔFMt(i) as a six-component column vector that combines ↑ΔFt(i)_dmd and ↑ΔMt(i)_dmd is denoted by ↑ΔFMt(i)_dmd (=[↑ΔFt(i)_dmd, ↑ΔMt(i)_dmd]$^T$).

In addition, the observed value of the translational contact force (three-component column vector) in the total contact force (actual total contact force) actually acting on the mobile object 81 from the i-th contact target surface is denoted by ↑Ft(i)_act, and the observed value of the contact force moment (three-component column vector) in the actual total contact force (i-th actual total contact force) is denoted by ↑Mt(i)_act. The observed value of the i-th actual total contact force as a six-component column vector that combines ↑Ft(i)_act and ↑Mt(i)_act is denoted by ↑FMt(i)_act (=[↑Ft(i)_act, ↑Mt(i)_act]$^T$).

The total contact force required correction amount determinator 114 determines the required value ↑ΔFMt(i)_dmd of the i-th perturbation total contact force ↑ΔFMt(i) by the following process.

First, the total contact force required correction amount determinator 114 calculates, for each i-th contact target surface (i=1, 2, . . . , N), an error ↑Dfmt(i) (=↑FMt(i)_cmd1− ↑FMt(i)_act) between the i-th desired total contact force ↑FMt(i)_cmd1 and the observed i-th actual total contact force ↑FMt(i)_act.

The observed i-th actual total contact force ↑FMt(i)_act is calculated by combining the observed value of the contact force (six-axis force) of each movable link 83 in an i-th contact movable link group indicated by the output of the force sensor 92, using the i-th desired total contact force central point as the acting point. The i-th contact movable link group is a group of movable links 83 contacting the i-th contact target surface.

Note that, in this embodiment, in order to prevent an excessive variation of the error ↑Dfmt(i), the total contact force required correction amount determinator 114 calculates, for each i-th contact movable link group, the observed i-th actual total contact force ↑FMt(i)_act acting on the i-th desired total contact force central point, by performing low-pass filtering on the i-th actual total contact force obtained by combining the observed value of the contact force (six-axis force) of each movable link 83 indicated by the output of the force sensor 92.

As an alternative, the observed i-th actual total contact force ↑FMt(i)_act may be calculated by combining the low-pass filtering result of the observed value of the contact force (six-axis force) of each movable link 83 in the i-th contact movable link group.

The total contact force required correction amount determinator 114 then determines, for each i-th contact movable link group, the required value ↑ΔFMt(i)_dmd of the i-th perturbation total contact force ↑ΔFMt(i) by adding a proportional term (the first term in the right side of the equation (91)) and an integral term (the second term in the right side of the equation (91)) determined according to the error ↑Dfmt(i), as shown in the following equation (91).

The proportional term is a result of multiplying the error ↑Dfmt(i) by a predetermined gain Kcmp. The integral term is a result of integrating a value obtained by multiplying a low-pass filtering result ↑Dfmt(i)_filt of the error ↑Dfmt(i) by a predetermined gain Kestm.

The low-pass filtering process used to calculate ↑Dfmt(i)_filt is a filtering process whose cutoff frequency on the high frequency side is lower than the cutoff frequency on the high frequency side of the low-pass filtering process used to calculate the error ↑Dfmt(i).

$$\uparrow \Delta FMt(i)\_dmd = Kcmp \cdot \uparrow Dfmt(i) + \int (Kestm \cdot \uparrow Dfmt(i)\_filt) \quad (91)$$

Each of the gains Kcmp and Kestm in the equation (91) is a scalar or a diagonal matrix.

The integral term in the equation (91) corresponds to a steady-state error between the i-th desired total contact force ↑FMt(i)_cmd1 and the observed i-th actual total contact force ↑FMt(i)_act, i.e. a steady-state error of the position and posture of the supposed i-th contact target surface from the actual i-th contact target surface.

Though the required value ↑ΔFMt(i)_dmd of the i-th perturbation total contact force ↑ΔFMt(i) is calculated according to the equation (91) in this embodiment, the required value ↑ΔFMt(i)_dmd may be calculated while omitting the proportional term. Besides, the integral term may be calculated using ↑Dfmt(i) itself, instead of ↑ΔDfmt(i)_filt.

The above describes the process of the total contact force required correction amount determinator 114 in this embodiment.

Consider the case of moving the mobile object 81 as shown in FIG. 14, as an example. In the walking motion before and after the motion of pushing the door D open by the mobile object 81, the required value ↑ΔFMt(1)_dmd of the first perturbation total contact force ↑ΔFMt(1) relating to the floor surface FL (first contact target surface) is calculated according to the equation (91).

In the motion of pushing the door D open, on the other hand, the required value ↑ΔFMt(1)_dmd of the first perturbation total contact force ↑ΔFMt(1) relating to the floor surface FL (first contact target surface) and the required value ↑ΔFMt(2)_dmd of the second perturbation total contact force ↑ΔFMt(2) relating to the door surface Da (second contact target surface) are calculated according to the equation (91).

[Process of the Representative Contact Surface Translational/Rotational Displacement Amount Calculator 115]

The controller 90 executes the process of the representative contact surface translational/rotational displacement amount calculator 115, after executing the process of the total contact force required correction amount determinator 114 as described above. The representative contact surface translational/rotational displacement amount calculator 115 is a functional unit which converts the required value ↑ΔFMt(i)_dmd (i=1, 2, . . . , N) of the i-th perturbation total contact force ↑ΔFMt(i) determined as described above to the spring translational/rotational displacement amount ↑Xc(i) (=[↑Xc(i)_org, ↑Xc(i)_rot]$^T$) of the virtual i-th representative contact surface corresponding to the i-th contact target surface, according to the equation (78).

In this embodiment, for each i-th contact target surface (i=1, 2, . . . , N), each diagonal component (spring constant of each component relating to the translational displacement of the i-th representative contact surface in the directions of the three axes) of the translational spring constant matrix Kc_org(i) of the i-th representative contact surface representative of all contact surfaces of the mobile object 81 with the i-th contact target surface (i=1, 2, . . . , N) and each diagonal component (spring constant of each component relating to the rotational displacement of the i-th representative contact surface about the three axes) of the rotational spring constant matrix Kc_rot(i) of the i-th representative contact surface are predetermined constants.

The representative contact surface translational/rotational displacement amount calculator 115 calculates the spring translational/rotational displacement amount ↑Xc(i) of the i-th representative contact surface using these spring constant matrices Kc_org(i) and Kc_rot(i), according to the equation (78). In detail, the representative contact surface translational/rotational displacement amount calculator 115 calculates the spring translational/rotational displacement amount ↑Xc(i) of the i-th representative contact surface, according to the following equation (93) that substitutes ↑ΔFMt(i)_dmd for ↑ΔFMt(i) in the right side of the equation (78).

$$\uparrow Xc(i) = \begin{bmatrix} Kc\_org(i)^{-1} & 0 \\ 0 & Kc\_rot(i)^{-1} \end{bmatrix} \cdot \uparrow FMt(i)\_dmd \quad (93)$$

In the equation (93), Kc_org(i)$^{-1}$ is an inverse matrix (matrix whose diagonal components are the inverses of the diagonal components of Kc_org(i)) of the translational spring constant matrix Kc_org(i), and Kc_rot(i)$^{-1}$ is an inverse matrix (matrix whose diagonal components are the inverses of the diagonal components of Kc_rot(i)) of the rotational spring constant matrix Kc_rot(i). Kc_org(i)$^{-1}$ and Kc_rot(i)$^{-1}$ are respectively calculated from the translational spring constant matrix Kc_org(i) and the rotational spring constant matrix Kc_rot(i) by the controller 90. Alternatively, Kc_org(i)$^{-1}$ and Kc_rot(i)$^{-1}$ may be stored in the storage device of the controller 90 beforehand.

The above describes the process of the representative contact surface translational/rotational displacement amount calculator 115 in this embodiment.

Consider the case of moving the mobile object 81 as shown in FIG. 14, as an example. In the walking motion before and after the motion of pushing the door D open by the mobile object 81, the spring translational/rotational displacement amount ↑Xc(1) of the first representative contact surface corresponding to the floor surface FL (first contact target surface) is calculated according to the equation (93).

In the motion of pushing the door D open, on the other hand, the spring translational/rotational displacement amount ↑Xc(1) of the first representative contact surface corresponding to the floor surface FL (first contact target surface) and the spring translational/rotational displacement amount ↑Xc(2) of the second representative contact surface corresponding to the door surface Da (second contact target surface) are calculated according to the equation (93).

[Process of the Representative Contact Surface Jacobian Matrix Calculator 116]

In the compliance manipulation amount determination process, the controller 90 executes the process of the representative contact surface Jacobian matrix calculator 116, simultaneously with (or before or after) the calculation of the spring translational/rotational displacement amounts ↑Xc(1) to ↑Xc(N) of the first to N-th representative contact surfaces as described above.

The representative contact surface Jacobian matrix calculator 116 is a functional unit which calculates the i-th representative contact surface Jacobian matrix Jc(i) (i=1, 2, . . . , N) representing the relation of the equation (73). In this embodiment, the generalized variable vector ↑q2 is more specifically a column vector formed by arranging the six components of the position and posture of the body 82 and the amount of displacement of each joint 87 of the mobile object 81. A column vector formed by arranging the change amounts of the components of ↑q2 per unit time is ↑Δq2 in the equation (73).

The representative contact surface Jacobian matrix calculator 116 calculates the i-th representative contact surface Jacobian matrix Jc(i), according to the equation (77). The equation (77) and the meanings of the main variables of the equation (77) are as follows.

$$Jc(i) = \sum_{j=1}^{m(i)} (r(i)\_j \cdot A(i)\_j \cdot J(i)\_j) \tag{77}$$

where
Jc(i) is an i-th representative contact surface Jacobian matrix,
j is an identification number of each movable link belonging to the i-th contact movable link group,
m(i) is a total number of movable links belonging to the i-th contact movable link group,
r(i)_j is a weight coefficient of a j-th movable link in the i-th contact movable link group determined by the following equation (77-1), $$r(i)\_j = Fn(i)\_j/(j) \tag{77-1}$$

Fn(i)_j is a normal force component of a contact force acting on the j-th movable link in the i-th contact movable link group,
A(i)_j is a matrix defined by the following equation (77-2), $$A(i)\_j \equiv \begin{bmatrix} I & 0 \\ Rk(i) \cdot VV(i)\_j & I \end{bmatrix} \tag{77-2}$$

Rk(i) is a coefficient matrix defined by the following equation (77-3), $$Rk(i) = Kc(i)\_rot^{-1} \cdot Kc(i)\_org \tag{77-3}$$

Kc(i)_org is a spring constant matrix relating to a translational displacement of the position of the i-th representative contact surface,
Kc(i)_rot is a spring constant matrix relating to a rotational displacement of the posture of the i-th representative contact surface,
VV(i)_j is a matrix such that VV(i)_j·↑F(i)_j=↑V(i)_j×↑F(i)_j,
↑F(i)_j is a contact force vector acting on the j-th movable link in the i-th contact movable link group,
↑V(i)_j is a position vector of a contact force central point of a contact portion of the j-th movable link in the i-th contact movable link group relative to the total contact force central point of the i-th contact target surface, and
J(i)_j is a movable link Jacobian matrix of the j-th movable link in the i-th contact movable link group.

Here, the variables necessary for calculating the right side of the equation (77) are determined as follows.

Regarding the weight coefficient r(i) j relating to the i-th contact target surface, first the observed value of the current actual posture of the distal end 84c of each movable link 83 in the i-th contact movable link group is determined based on the observed (measured) value of the actual displacement amount (actual joint displacement amount) of each joint 87 indicated by the output of the rotary encoder 93.

Further, the observed value of the current actual contact surface normal force component Fn(i)_j (actual contact surface normal force component Fn(i)_j) (j=1, 2, . . . , m(i)) of each movable link 83 (each of the first to m(i)-th movable links 83) in the i-th contact movable link group is calculated based on the observed value of the actual posture of the distal end 84c of each movable link 83 and the output of the force sensor 92.

The weight coefficient r(i)_j (j=1, 2, . . . , m(i)) is then determined from the observed value of the actual contact surface normal force component Fn(i)_j of each movable link 83 in the i-th contact movable link group, according to the definition shown in the equation (77-1). Here, filtering such as low-pass filtering may be performed on the observed value of Fn(i)_j, in order to prevent a frequent variation of the weight coefficient r(i)_j.

Though it is desirable to determine the weight coefficient r(i) j based on the observed value of the actual contact surface normal force component Fn(i)_j of each movable link 83 in the i-th contact movable link group, the weight coefficient r(i)_j may be determined using an approximate estimated value or predicted value of the actual contact surface normal force component Fn(i)_j instead of the observed value.

For example, in the case where the desired contact force of each movable link 83 in the i-th contact movable link group is set and also the actual contact force of each movable link 83 approximately matches the desired contact force, the weight coefficient r(i)_j may be determined using the desired value instead of the observed value of the actual contact surface normal force component Fn(i)_j.

The coefficient matrix Rk(i) relating to the matrix A(i)_j (j=1, 2, . . . , m(i)) of the i-th contact target surface is determined from the translational spring constant matrix Kc_org(i) and the rotational spring constant matrix Kc_rot(i) (or its inverse matrix Kc_rot(i)$^{-1}$) set beforehand with respect to the i-th representative contact surface, according to the equation (77-3). The coefficient matrix Rk(i) may be stored in the storage device of the controller 90 beforehand.

The position vector ↑V(i)_j necessary for determining the matrix VV(i)_j relating to the matrix A(i)_j is determined in the following manner, as an example.

A position vector (hereafter denoted by ↑Va(i)_j) of the current actual contact force central point (actual contact force central point) of the contact surface (contact surface with the i-th contact target surface) of each movable link 83 in the i-th contact movable link group is specified based on the observed (measured) value of the current actual displacement amount of each joint 87 indicated by the output of the rotary encoder 93 and the output of the force sensor 92. A reference point of this position vector may be an arbitrary point.

Next, a position vector ↑Vc(i) (=r(i)_1·↑Va(i)_1+r(i)_2·↑Va(i)_2+ ... +r(i)_m(i)·↑Va(i)_m(i)) of a weighted mean point of the actual contact force central point of each movable link 83 in the i-th contact movable link group according to the weight coefficient r(i)_j is calculated as a position vector of the i-th actual total contact force central point.

The position vector ↑V(i)_j of the actual contact force central point of the contact surface of each movable link 83 (j-th movable link 83) in the i-th contact movable link group relative to the i-th actual total contact force central point is then determined according to ↑V(i)_j=↑Va(i)_j−↑Vc(i) (j=1, 2, ..., m(i)).

The matrix VV(i)_j relating to the matrix A(i)_j is determined so that VV(i)_j·↑F(i)_j=↑V(i)_j×↑F(i)_j, according to the definition.

Of the variables necessary for calculating the right side of the equation (77), the movable link Jacobian matrix J(i)_j relating to the j-th movable link 83 in the i-th contact movable link group is determined as follows. The movable link Jacobian matrix J(i)_j is a matrix that represents the relation between the spring translational/rotational displacement amount ↑X(i)_j (=[↑Xorg(i)_j, ↑Xrot(i)_j]$^T$) of the j-th movable link contact surface (contact surface between the j-th movable link 83 and the i-th contact target surface) and the change amount ↑Δq2 of the generalized variable vector ↑q2 per unit time, by the equation (74).

The spring translational displacement amount ↑Xorg(i)_j of ↑X(i)_j corresponds to the translational displacement amount of the j-th movable link contact surface per unit time, and so can be regarded as matching the temporal change rate (translational velocity) of the position of the current contact portion of the distal end 84c of the j-th movable link 83. The spring rotational displacement amount ↑Xrot(i)_j of ↑X(i)_j corresponds to the rotational displacement amount of the j-th movable link contact surface per unit time, and so can be regarded as matching the temporal change rate (angular velocity) of the current posture of the distal end 84c of the j-th movable link 83.

In view of this, in this embodiment, the movable link Jacobian matrix J(i)_j relating to the j-th movable link 83 in the i-th contact movable link group is determined on the ground that the change amount (temporal change rate) of the position of the current contact portion and the posture of the distal end 84c of the j-th movable link 83 (in more detail, the column vector whose components are the components of the position and posture) per unit time matches ↑X(i)_j in the left side of the equation (74). As the position of the current contact portion of the distal end 84c of the j-th movable link 83, the position of the point of the distal end 84c corresponding to the actual contact force central point of the contact surface (j-th movable link contact surface) of the j-th movable link 83 is used as an example.

In this case, the movable link Jacobian matrix J(i)_j is determined by a known method, using the current motion state (specified by the measured current actual displacement amount of each joint 87) of the mobile object 81 as the starting point of the minute change (perturbation) of ↑q2.

For instance, the movable link Jacobian matrix J(i)_j is determined by calculating the change in contact portion position and posture of the distal end 84c of the j-th movable link 83 with the minute change (minute change from the current state) of each component of the generalized variable vector ↑q2, by using a geometric model (rigid link model) of the mobile object 81 or by analytical calculation.

Here, the current contact portion position of the distal end 84c of the j-th movable link 83 in the i-th contact movable link group is assumed to match the observed value of the position of the current actual contact force central point of the contact surface of the j-th movable link 83 with the i-th contact target surface. The change of the position of this point (change with the minute change of each component of ↑q2) is calculated as the change in contact portion position of the distal end 84c of the j-th movable link 83.

Meanwhile, the current posture of the distal end 84c of the j-th movable link 83 is assumed to match the observed value of the current actual posture of the distal end 84c of the j-th movable link 83 calculated based on the observed (measured) value of the actual displacement amount of each joint indicated by the output of the rotary encoder 93, and accordingly the change in posture of the distal end 84c (change with the minute change of each component of ↑q2) is calculated.

In this embodiment, the representative contact surface Jacobian matrix calculator 116 calculates, for each i-th contact target surface (i=1, 2, ..., N) in contact with the mobile object 81, the i-th representative contact surface Jacobian matrix Jc(i), by calculating the right side of the equation (77) using the weight coefficient r(i)_j (j=1, 2, ..., m(i)), the matrix VV(i)_j, and the movable link Jacobian matrix J(i)_j determined as described above.

The above describes the process of the representative contact surface Jacobian matrix calculator 116 in this embodiment.

Consider the case of moving the mobile object 81 as shown in FIG. 14, as an example. In the walking motion before and after the motion of pushing the door D open by the mobile object 81, the first representative contact surface Jacobian matrix Jc(1) corresponding to the floor surface FL (first contact target surface) is calculated according to the equation (77).

In a state where only one of the movable links 83a and 83b of the mobile object 81 contacts the floor surface FL, m(1) in the equation (77) is m(1)=1. In this case, the movable link Jacobian matrix J(1)_1 is a movable link Jacobian matrix relating to the movable link 83a or 83b in contact with the floor surface FL.

In a state where both movable links 83a and 83b contact the floor surface FL, m(1) in the equation (77) is m(1)=2. In this case, one of the movable link Jacobian matrices J(1)_1 and J(1)_2 is a movable link Jacobian matrix relating to the movable link 83a, and the other one of the movable link Jacobian matrices J(1)_1 and J(1)_2 is a movable link Jacobian matrix relating to the movable link 83b.

In the motion of pushing the door D open, on the other hand, the first representative contact surface Jacobian matrix Jc(1) corresponding to the floor surface FL (first contact target surface) and the second representative contact surface Jacobian matrix Jc(2) corresponding to the door surface Da (second contact target surface) are calculated according to the equation (77).

Here, Jc(1) is calculated in the same way as when both movable links 83a and 83b contact the floor surface FL in the walking motion. In the calculation of Jc(2), meanwhile, m(2)

in the equation (77) is m(2)=1. In this case, the movable link Jacobian matrix J(2)_1 is a movable link Jacobian matrix relating to the movable link 83*d* in contact with the door surface Da.

[Process of the Joint Displacement Correction Amount Determinator 118]

In the compliance manipulation amount determination process, the controller 90 executes the process of the joint displacement correction amount determinator 118, after calculating the spring translational/rotational displacement amount ↑Xc(i) of the i-th representative contact surface and the representative contact surface Jacobian matrix Jc(i) for each i-th contact target surface (i=1, 2, . . . , N) as described above.

The joint displacement correction amount determinator 118 is a functional unit which determines a joint displacement correction amount that is the amount of correction (the amount of correction from the desired joint displacement amount corresponding to the desired motion of the reference gait) of the displacement amount of each joint corresponding to all spring translational/rotational displacement amounts ↑Xc(1) to ↑Xc(N) of the first to N-th representative contact surfaces.

First, the joint displacement correction amount determinator 118 calculates the pseudo inverse matrix Jc$^{-1}$ of the overall Jacobian matrix Jc [Jc(1), Jc(2), . . . , Jc(N)]$^T$ formed by arranging the first to N-th representative contact surface Jacobian matrices Jc(1) to Jc(N). Since the overall Jacobian matrix Jc is typically not a square matrix, there is no inverse matrix of Jc. The joint displacement correction amount determinator 118 accordingly calculates the pseudo inverse matrix Jc$^{-1}$ of the overall Jacobian matrix Jc.

The joint displacement correction amount determinator 118 calculates a generalized variable required correction amount vector ↑Δq2 dmd whose components are the required correction amounts (required perturbation amounts) of the components of the generalized variable vector ↑q2, by multiplying, by the pseudo inverse matrix Jc$^{-1}$, the overall spring translational/rotational displacement amount ↑Xc (=[↑Xc(1), ↑Xc(2), . . . , ↑Xc(N)]$^T$) which is a vector (column vector) formed by arranging the spring translational/rotational displacement amounts ↑Xc(1) to ↑Xc(N) of the first to N-th representative contact surfaces, as shown by the equation (80). The joint displacement correction amount determinator 118 then determines the component representing the required correction amount of the displacement amount of each joint among the components of the generalized variable required correction amount vector ↑Δq2 dmd, as the joint displacement correction amount.

Here, the joint displacement correction amount determinator 118 calculates the pseudo inverse matrix Jc$^{-1}$ according to the equation (30), as in the first embodiment.

That is, in this embodiment, too, the pseudo inverse matrix Jc$^{-1}$ is calculated as a weighted pseudo inverse matrix (weighted SR-Inverse).

In detail, the process of calculating the pseudo inverse matrix Jc$^{-1}$ is the same as that in the first embodiment, and is executed as shown in the flowchart of FIG. 5 including the determination process of the adjustment parameter k.

The joint displacement correction amount determinator 118 calculates the generalized variable required correction amount vector Δ↑q2 dmd, by calculating the right side of the equation (80) using the pseudo inverse matrix Jc$^{-1}$ obtained as described above. The joint displacement correction amount determinator 118 then determines the component representing the required correction amount of the displacement amount of each joint among the components of the generalized variable required correction amount vector ↑Δq2_dmd, as the joint displacement correction amount. The joint displacement correction amount determined in this way is the compliance manipulation amount as the required correction amount of the displacement amount of each joint such that the i-th actual total contact force (i=1, 2, . . . , N) approaches the i-th desired total contact force ↑FMt(i)_cmd1 for each of the first to N-th contact target surfaces.

[Process of the Joint Displacement Controller 119]

The controller 90 executes the process of the joint displacement controller 119, after executing the compliance manipulation amount determination process (the processes of the posture stabilization compensating force determinator 112, the desired total contact force determinator 113, the total contact force required correction amount determinator 114, the representative contact surface translational/rotational displacement amount calculator 115, the representative contact surface Jacobian matrix calculator 116, and the joint displacement correction amount determinator 118) and the process of the desired joint displacement amount determinator 117 described above.

The joint displacement controller 119 determines the corrected desired joint displacement amount as the eventual joint displacement command of each joint, by adding the joint displacement correction amount determined by the desired joint displacement amount corrector 118 to the desired joint displacement amount (desired joint displacement amount corresponding to the desired motion of the reference gait) of each joint determined by the desired joint displacement amount determinator 117.

The joint displacement controller 119 then controls the corresponding electric motor 88 (joint actuator) via a motor drive circuit such as a servo amplifier not shown, to match the actual displacement amount of each joint to the corrected desired joint displacement amount determined as described above.

[Process of the Contact Target Surface Estimator 120]

The controller 90 executes the process of the contact target surface estimator 120, simultaneously with the drive control of each joint of the mobile object 81. The contact target surface estimator 120 is a functional unit which calculates a contact target surface estimate value that is an estimated value of the position and posture of the contact target surface (actual contact target surface) actually contacted by the mobile object 81.

For this process, the value of the integral term (second term) in the right side of the equation (91) as the component of the required value ↑ΔFMt(i)_dmd (i=1, 2, . . . , N) of the i-th perturbation total contact force ↑ΔFMt(i) is input to the contact target surface estimator 120 from the total contact force required correction amount determinator 114. That is, the integral (=∫(Kestm·↑Dfmt(i)_filt)) of the value obtained by multiplying the low-pass filtering result ↑Dfmt(i)_filt of the error ↑Dfmt(i) (=↑FMt(i)_cmd1−↑FMt(i)_act) between the i-th desired total contact force ↑FMt(i)_cmd1 and the observed i-th actual total contact force ↑FMt(i)_act by the predetermined gain Kestm (scalar or diagonal matrix) is input to the contact target surface estimator 120 from the total contact force required correction amount determinator 114. Hereafter, this value of the integral term is denoted by ↑ΔFMt(i)_int, as shown in the following equation (94).

$$\uparrow\Delta FMt(i)\_int = \int(Kestm \cdot \uparrow Dfmt(i)\_filt) \tag{94}$$

By the drive control of each joint of the mobile object 81 mentioned earlier, the displacement amount of each joint is controlled so that the observed i-th actual total contact force ↑FMt(i)_act (i=1, 2, . . . , N) follows the i-th desired total contact force ↑FMt(i)_cmd1 (i.e. so that the error ↑Dfmt(i) approaches zero). Hence, the value ↑ΔFMt(i)_int of the integral term is induced by the steady-state error of the position and posture of the supposed i-th contact target surface used for the generation of the reference gait from the actual i-th contact target surface.

This indicates that the spring translational/rotational displacement amount of the i-th representative contact surface corresponding to ↑ΔFMt(i)_int corresponds to the steady-state error of the position and posture of the supposed i-th contact target surface used for the generation of the desired motion of the reference gait from the actual i-th contact target surface (i-th actual contact target surface).

In view of this, the contact target surface estimator 120 obtains the result of converting the input value ↑ΔFMt(i)_int of the integral term for the i-th contact target surface to the spring translational/rotational displacement amount according to the equation (78-1), as the error ↑Xc(i)_int of the position and posture of the supposed i-th contact target surface.

In more detail, the result (=Kc_org(i)$^{-1}$·↑ΔFt(i)_int) of multiplying the translational force component ↑ΔFt(i)_int in the integral term value ↑ΔFMt(i)_int by the inverse matrix Kc_org(i)$^{-1}$ of the translational spring constant matrix Kc_org(i) of the i-th representative contact surface is set as the error ↑Xc_org(i)_int of the position of the supposed i-th contact target surface.

Likewise, the result (=Kc_rot(i)$^{-1}$·↑ΔMt(i)_int) of multiplying the moment component ↑ΔMt(i)_int in the integral term value ↑ΔFMt(i)_int by the inverse matrix Kc_rot(i)$^{-1}$ of the rotational spring constant matrix Kc_rot(i) of the i-th representative contact surface is set as the error ↑Xc_rot(i)_int of the posture of the supposed i-th contact target surface.

The contact target surface estimator 120 then corrects the position and posture of the supposed i-th contact target surface according to the error ↑Xc(i)_int calculated in the above manner, thereby determining the i-th contact target surface estimate value (i=1, 2, . . . , N) as the estimated value of the position and posture of the i-th actual contact target surface.

In this embodiment, the i-th contact target surface estimate value (i=1, 2, . . . , N) determined by the contact target surface estimator 120 in this way is provided to the reference gait generator 111. The reference gait generator 111 updates the supposed i-th contact target surface used for the generation of the reference gait according to the i-th contact target surface estimate value, on a regular basis (e.g. each time the mobile object 81 takes one step or each time the mobile object 81 takes a plurality of steps during the walking motion, or at fixed time intervals).

The supposed i-th contact target surface used for the generation of the reference gait is not necessarily determined according to only the i-th contact target surface estimate value. For example, in the case where the position and posture of the i-th actual contact target surface can be estimated based on information of the contact target surface provided from a vision sensor mounted in the mobile object 81 or from outside, the i-th contact target surface estimate value may be used for reliability evaluation of the position and posture of the estimated i-th contact target surface or complementary correction of the position and posture of the estimated i-th contact target surface.

The above describes the detailed process of the controller 90 in this embodiment.

The correspondence relation between this embodiment and the present invention is as follows. The total contact force required correction amount determination element in the present invention (more specifically, the tenth, twelfth, fourteenth, or fifteenth invention) is realized by the total contact force required correction amount determinator 114 in this embodiment. The i-th desired total contact force ↑FMt(i)_cmd1 determined by the desired total contact force determinator 113 in this embodiment corresponds to the desired total contact force corresponding to the i-th contact target surface in the present invention.

Moreover, the representative contact surface position/posture displacement amount calculation element, the representative contact surface Jacobian matrix calculation element, the joint displacement correction amount determination element, and the joint displacement control element in the present invention (more specifically, the tenth, twelfth, fourteenth, or fifteenth invention) are realized respectively by the representative contact surface translational/rotational displacement amount calculator 115, the representative contact surface Jacobian matrix calculator 116, the joint displacement correction amount determinator 118, and the joint displacement controller 119 in this embodiment.

Furthermore, the pseudo inverse matrix calculation parameter determination element in the present invention (more specifically, the fifteenth invention) is realized by STEPS 2 to 9 in FIG. 5 in the process executed by the joint displacement correction amount determinator 118 in this embodiment.

In addition, the contact target surface estimation element in the present invention (more specifically, the fourteenth invention) is realized by the contact target surface estimator 120 in this embodiment. Here, the error ↑Xc(i)_int calculated by the contact target surface estimator 120 for each contact target surface from the integral term value ↑ΔFMt(i)_int according to the equation (78-1) corresponds to the representative contact surface steady-state displacement amount in the present invention. Besides, each of the first to N-th contact target surfaces in this embodiment corresponds to the h-th contact target surface in the present invention.

According to this embodiment, in each control cycle, the controller 90 converts the required value ↑ΔFMt(i)_dmd of the i-th perturbation total contact force ↑ΔFMt(i) as the manipulation amount (control input) by which the i-th actual total contact force follows the i-th desired total contact force ↑FMt(i)_cmd1 (i=1, 2, . . . , N), to the spring translational/rotational displacement amount ↑Xc(i) of the i-th representative contact surface.

The controller 90 also determines the joint displacement correction amount of each joint of the mobile object 81 as the compliance manipulation amount for realizing ↑Xc(i) (i=1, 2, . . . , N) (so that the i-th actual total contact force of each contact target surface follows the i-th desired total contact force ↑FMt(i)_cmd1), by multiplying, by the pseudo inverse matrix Jc$^{-1}$ of the overall Jacobian matrix Jc formed by arranging the i-th representative contact surface Jacobian matrices Jc(i), the overall spring translational/rotational displacement amount ↑Xc (=[↑Xc(1), ↑Xc(2), . . . , ↑Xc(N)]$^T$) as a vector (column vector) formed by arranging ↑Xc(i) (i=1, 2, . . . , N).

The controller 90 then controls the displacement amount of each joint via the corresponding electric motor 88 (joint actuator) according to the corrected desired joint displacement amount obtained by correcting, by the joint displacement correction amount, the desired joint displacement amount of each joint corresponding to the desired motion of the reference gait.

Thus, according to this embodiment, the joint displacement correction amount of each joint by which the i-th actual total contact force follows the i-th desired total contact force ↑FMt(i)_cmd1 can be collectively determined, without executing a process of determining the amount of correction of the position and posture of the distal end of each movable link 83 in consideration of the relation between the correction of the position and posture of the distal end (element link) 84c of each individual movable link 83 in contact with the corresponding contact target surface and the change of the actual total contact force of the contact target surface or the interrelation between these factors. As a result, the process of determining the joint displacement correction amount for compliance control can be efficiently performed in a short time.

Here, the weight coefficient $r(i)\_j$ of each movable link 83 (j-th movable link 83) in the i-th contact movable link group in the equation (77) for calculating the i-th representative contact surface Jacobian matrix $Jc(i)$ (i=1, 2, ..., N) is set so that the movable link 83 whose contact surface normal force component $Fn(i)\_j$ is larger has a larger weight coefficient (closer to "1").

This means the required value ↑ΔFMt(i)_dmd of the i-th perturbation total contact force ↑ΔFMt(i) is shared by each movable link 83 in the i-th contact movable link group in such a manner that the movable link 83 whose contact surface normal force component $Fn(i)\_j$ is larger has a larger correction amount.

In other words, the i-th representative contact surface Jacobian matrix $Jc(i)$ is determined so that the required value ↑ΔFMt(i)_dmd of the i-th perturbation total contact force ↑ΔFMt(i) can be realized by correcting, to a larger degree, the position or posture of the distal end 84c of the movable link 83 whose contact surface normal force component $Fn(i)\_j$ is relatively large.

Accordingly, it is possible to determine such a joint displacement correction amount that ensures the required value ↑ΔFMt(i)_dmd of the i-th perturbation total contact force ↑ΔFMt(i) without needlessly correcting the position or posture of the distal end 84c of any movable link 83 whose contact surface normal force component $Fn(i)\_j$ is relatively small, i.e. an appropriate joint displacement correction amount by which the i-th actual total contact force (i=1, 2, ..., N) follows the i-th desired total contact force ↑ΔFMt(i)_cmd1.

In addition, since the weight coefficient $r(i)\_j$ of each movable link 83 in the i-th contact movable link group (i=1, 2, ..., N) continuously changes, the i-th representative contact surface Jacobian matrix $Jc(i)$ has no discontinuous change. As a result, the displacement amount of each joint of the mobile object 81 can be continuously changed smoothly. This enables the mobile object 81 to move smoothly.

In this embodiment, in the process (STEPS 2 to 9 in FIG. 5) of searching for the adjustment parameter k for preventing the determinant DET from becoming excessively small, the joint displacement correction amount determinator 118 sets the increment Δk of the adjustment parameter k to a value proportional to the n-th root of the error (=DET_L−|DET|) generated by subtracting the absolute value of the determinant DET from the lower threshold DET_L.

Therefore, the appropriate value of the adjustment parameter k such that |DET|≧DET_L can be efficiently determined in a short time in each control cycle of the controller 90, without causing a discontinuous change of the value of k. As a result, the pseudo inverse matrix $Jc^{-1}$ for determining the joint displacement correction amount from the overall spring translational/rotational displacement amount ↑Xc can be smoothly changed. This allows the joint displacement correction amount to be determined so as to smoothly change the displacement amount of each joint of the mobile object 81.

Furthermore, while performing the drive control of each joint of the mobile object 81 so that the i-th actual total contact force follows the i-th desired total contact force ↑ΔFMt(i)_cmd1, the translational/rotational displacement amount ↑Xc(i)_int of the i-th representative contact surface corresponding to the integral term value ↑ΔFMt(i) int as the component of the required value ↑ΔFMt(i) dmd of the i-th perturbation total contact force ↑ΔFMt(i) is calculated according to the equation (78-1). By doing so, ↑Xc(i) int as the steady-state error of the position and posture of the supposed i-th contact target surface from the actual i-th contact target surface can be calculated with high reliability. This contributes to accurate estimation of the position and posture of each actual contact target surface.

[Modifications of the Third Embodiment]

The following describes modifications of the third embodiment described above.

Though the third embodiment describes the case where the mobile object 81 has four movable links 83, the mobile object may have five or more movable links, or three movable links.

Though the third embodiment describes the case where the distal end 84c of each movable link 83 of the mobile object 81 is the element link 84c where the contact force moment acting thereon from the contact target surface can be changed (the contact force central point can be changed on the contact surface of the distal end), the distal end of each movable link 83 may have a structure where the contact force moment cannot be changed.

For example, the distal end of each of the m(i) movable links $203(i)\_j$ (j=1, 2, ..., m(i)) in the i-th contact movable link group in contact with the arbitrary i-th contact target surface may be spherical (more typically, a structure whose contact surface with the i-th contact target surface is substantially a point (including a structure whose contact surface with the i-th contact target surface has a minute area)), as shown in FIG. 15.

In such a case, the point contact surface (contact point) of each movable link $203(i)\_j$ in the i-th contact movable link group with the i-th contact target surface matches the contact force central point. This makes it substantially impossible to apply (and change) the contact force moment to the movable link $203(1)\_j$.

Since the perturbation contact force moment ↑M(i)_j that can be added to the movable link $203(i)\_j$ is constantly zero, the spring rotational displacement amount ↑Xrot(i)_j (=Krot (i)_j·↑M(i)_j) of the contact surface of the movable link $203(i)\_j$ is constantly zero, too. Accordingly, the Jacobian matrix Jrot(i)_j representing the relation between the spring rotational displacement amount ↑Xrot(i)_j and the change amount ↑Δq2 of the generalized variable vector Δq2 per unit time is constantly a zero matrix.

The movable link Jacobian matrix $J(i)\_j$ in this case is $J(i)\_j=[Jorg(i)\_j, 0]^T$, according to the equation (76c). Thus, the process of calculating the i-th representative contact surface Jacobian matrix $Jc(i)$ by the equation (77) is equivalent to the process of calculating $Jc(i)$ by the following equation (77a).

$$Jc(i) = \sum_{j=1}^{m(i)} \left( r(i)\_j \cdot \begin{bmatrix} I \\ Rk(i) \cdot VV(i)\_j \end{bmatrix} \cdot Jorg(i)\_j \right) \quad (77a)$$

In the equation (77a), $r(i)\_j$, $Rk(i)$, and $VV(i)\_j$ are the same as those in the equation (72). $Jorg(i)\_j$ is the Jacobian matrix shown in the equation (76a), i.e. the Jacobian matrix representing the relation between the spring translational displacement amount ↑Xorg(i)_j of the j-th movable link contact surface and the change amount ↑Δq2 of the generalized variable vector Δq2 per unit time.

The values of r(i)_j, Rk(i), and VV(i)_j for calculating the equation (77a) can be determined in the same way as in the third embodiment. Moreover, since $J(i)\_j = [Jorg(i)\_j, 0]^T$, Jorg(i)_j can be calculated in the same way as the calculation of the movable link Jacobian matrix J(i)_j in the third embodiment.

The mobile object may be a mobile object of a structure in which the distal end of each of the m(i) movable links $203(i)\_j$ (j=1, 2, ..., m(i)) in the i-th contact movable link group in contact with the arbitrary i-th contact target surface is wheeled, as shown in FIG. 16 as an example.

Though the third embodiment describes the case where the first to N-th desired total contact forces ↑FMt(1)_cmd1 to ↑FMt(N)_cmd1 are determined after correcting the desired overall external force ↑FMt_cmd0 of the reference gait so as to enhance the stability of the posture of the mobile object 81, the first to N-th desired total contact forces ↑FMt(1)_cmd1 to ↑FMt(N)_cmd1 may be determined directly using the desired overall external force ↑FMt_cmd0 of the reference gait.

Though the third embodiment describes the case where the required value ↑ΔFMt(i)_dmd of the i-th perturbation total contact force ↑ΔFMt(i) is determined by combining (adding) the integral term and the proportional term according to the error ↑Dfmt(i) (=↑FMt(i)_cmd1−↑FMt(i)_act) between the i-th desired total contact force ↑FMt(i)_cmd1 and the observed i-th actual total contact force ↑FMt(i)_act, the integral term (=↑ΔFMt(i)_int) itself may be determined as the required value ↑ΔFMt(i)_dmd of the i-th perturbation total contact force ↑ΔFMt(i).

In such a case, the spring translational/rotational displacement amount ↑ΔXc(i) of the i-th representative contact surface calculated from ↑ΔFMt(i)_dmd by the representative contact surface translational/rotational displacement amount calculator 115 corresponds to the steady-state error ↑Xc(i) int of the position and posture of the supposed i-th contact target surface from the actual i-th contact target surface.

Accordingly, the contact target surface estimator 120 does not need to calculate ↑Xc(i) int by the equation (78-1). The contact target surface estimator 120 determines the i-th contact target surface estimate value, by correcting the position and posture of the supposed i-th contact target surface based on the spring translational/rotational displacement amount ↑ΔXc(i) of the i-th representative contact surface calculated by the representative contact surface translational/rotational displacement amount calculator 115. This corresponds to an embodiment of the eleventh or thirteenth invention.

Though the third embodiment describes the case where the actual position and posture are estimated for all of the first to N-th contact target surfaces, the actual position and posture may be estimated only for a specific contact target surface (h-th contact target surface). For example, in the case of moving the mobile object 81 as shown in FIG. 14, the contact target surface estimator 120 may estimate the actual position and posture of only the floor surface FL (first contact target surface).

Though the third embodiment describes the case where the contact target surface estimator 120 is included, the contact target surface estimator 120 may be omitted. In such a case, the proportional term according to the error ↑Dfmt(i) (=↑FMt(i)_cmd1−↑FMt(i)_act) between the i-th desired total contact force ↑FMt(i)_cmd1 and the observed i-th actual total contact force ↑FMt(i)_act may be determined as the required value ↑ΔFMt(i)_dmd of the i-th perturbation total contact force ↑ΔFMt(i).

Though the third embodiment describes the case where the mobile object 81 contacts two contact target surfaces, the present invention (more specifically, the tenth to fifteenth inventions) is equally applicable to the case where the mobile object 81 contacts three or more contact target surfaces. The plurality of contact target surfaces contacted by the mobile object 81 may include two contact target surfaces that are substantially in parallel with each other.

For example, the present invention (more specifically, the tenth to fifteenth inventions) is applicable to an instance where the mobile object 81 climbs on a wall in a motion pattern as exemplified earlier by the applicant of the present application in Japanese Patent Application No. 2010-44712 (Japanese Patent Application Laid-Open No. 2011-177838 or Published U.S. Patent Application No. US-2011-0213495-A1).

What is claimed is:

1. A mobile object controller which performs motion control of a mobile object according to a desired motion of the mobile object and a desired total floor reaction force which is a desired value of a total floor reaction force to be applied to the mobile object to realize the desired motion, the mobile object including a body, a plurality of leg links connected to the body, and a joint actuator which drives a joint of each leg link, and moving on a floor surface by movements of the plurality of leg links, the mobile object controller comprising:

a total floor reaction force required correction amount determination processor configured to determine a total floor reaction force required correction amount according to an error between an observed value of the total floor reaction force actually acting on the mobile object and the desired total floor reaction force, the total floor reaction force required correction amount being a required correction amount of the total floor reaction force to be additionally applied to the mobile object so that the error approaches zero;

a representative contact surface position/posture displacement amount calculation processor configured to calculate, from the determined total floor reaction force required correction amount and a predetermined spring constant of a representative contact surface, a required displacement amount of a position and posture of the representative contact surface corresponding to the total floor reaction force required correction amount based on an assumption that the total floor reaction force required correction amount is generated by a spring displacement of the position and posture of the representative contact surface, the representative contact surface being a single virtual contact surface representative of all contact surfaces between the mobile object and the floor surface;

a representative contact surface Jacobian matrix calculation processor configured to calculate a representative contact surface Jacobian matrix Jc according to the following equation (27) from a leg link Jacobian matrix J_i for each leg link, the spring constant, a relative position of an actual floor reaction force central point of a distal end of each leg link relative to a total floor reaction force central point, and a floor reaction force actually acting on each leg link, the representative contact surface Jacobian matrix Jc being a Jacobian matrix representing a relation between a temporal change rate of the position and posture of the representative contact surface and a temporal change rate of a generalized variable vector whose components are a position and posture of the body and a displacement amount of each joint of the mobile object, the leg link Jacobian matrix J_i being a Jacobian matrix representing a relation between a temporal change rate of a position of a distal end of the leg link or a temporal change rate of a position and posture of the distal end of the leg link and the temporal change rate of the generalized variable vector, and the total floor reaction force central point being an acting point of the total floor reaction force actually acting on the mobile object;

a joint displacement correction amount determination processor configured to determine a joint displacement correction amount by multiplying the calculated required displacement amount of the position and posture of the representative contact surface by a pseudo inverse matrix $Jc^{-1}$ of the calculated representative contact surface Jacobian matrix Jc, the joint displacement correction amount being a correction amount of the displacement amount of each joint of the mobile object for realizing the required displacement amount of the position and posture of the representative contact surface; and a joint displacement control processor configured to control the joint actuator according to a corrected desired joint displacement amount obtained by correcting a desired joint displacement amount by the determined joint displacement correction amount, the desired joint displacement amount being the displacement amount of each joint of the mobile object defined by the desired motion of the mobile object, $$Jc = \sum_{i=1}^{N} (r\_i \cdot A\_i \cdot J\_i) \quad (27)$$

where
Jc is the representative contact surface Jacobian matrix,
i is an identification number of a leg link,
N is a total number of leg links,
r_i is a weight coefficient of an i-th leg link determined by the following equation (27-1), $$r\_i = Fn\_i \bigg/ \left( \sum_{j=1}^{N} Fn\_j \right) \quad (27\text{-}1)$$

Fn_i is a normal force component of a floor reaction force acting on the i-th leg link,
A_i is a matrix defined by the following equation (27-2), $$A\_i \equiv \begin{bmatrix} I & 0 \\ Rk \cdot VV\_i & I \end{bmatrix} \quad (27\text{-}2)$$

Rk is a coefficient matrix defined by the following equation (27-3), $$Rk \equiv Kc\_rot^{-1} \cdot Kc\_org \quad (27\text{-}3)$$

Kc_org is a spring constant matrix relating to a translational displacement of the position of the representative contact surface,
Kc_rot is a spring constant matrix relating to a rotational displacement of the posture of the representative contact surface,
VV_i is a matrix such that $VV\_i \cdot \uparrow F\_i = \uparrow V\_i \times \uparrow F\_i$,
↑F_i is a floor reaction force vector acting on the i-th leg link,
↑V_i is a position vector of a floor reaction force central point of a distal end of the i-th leg link relative to the total floor reaction force central point, and
J_i is a leg link Jacobian matrix of the i-th leg link.

2. The mobile object controller according to claim 1, wherein the total floor reaction force required correction amount determined by the total floor reaction force required correction amount determination processor is a sum total of a proportional term proportional to the error and an integral term obtained by integrating the error.

3. The mobile object controller according to claim 1, wherein the total floor reaction force required correction amount determined by the total floor reaction force required correction amount determination processor is a value obtained by integrating the error, and
wherein the mobile object controller further comprises
a floor surface estimation processor configured to estimate a position and posture of an actual floor surface by correcting a position and posture of a supposed floor surface according to the required displacement amount calculated by the representative contact surface position/posture displacement amount calculation processor, the supposed floor surface being a floor surface supposed in the desired motion.

4. The mobile object controller according to claim 1, wherein the total floor reaction force required correction amount determined by the total floor reaction force required correction amount determination processor is a value obtained by combining at least a proportional term proportional to the error and an integral term obtained by integrating the error, and
wherein the mobile object controller further comprises:
a representative contact surface steady-state displacement amount calculation processor configured to calculate a representative contact surface steady-state displacement amount from the integral term in the total floor reaction force required correction amount and the spring constant of the representative contact surface, the representative contact surface steady-state displacement amount being a displacement amount of the position and posture of the representative contact surface corresponding to the integral term; and
a floor surface estimation processor configured to estimate a position and posture of an actual floor surface by correcting a position and posture of a supposed floor surface according to the representative contact surface steady-state displacement amount calculated by the representative contact surface steady-state displacement amount calculation processor, the supposed floor surface being a floor surface supposed in the desired motion.

5. The mobile object controller according to claim 1, wherein the pseudo inverse matrix $Jc^{-1}$ of the calculated representative contact surface Jacobian matrix Jc is a matrix obtained according to the following equation (30) from a weight matrix W set beforehand and the calculated representative contact surface Jacobian matrix Jc,
wherein the mobile object controller further comprises
a pseudo inverse matrix calculation parameter determination processor configured to determine a value of k in the equation (30) so that a determinant DET expressed by the following equation (31) is equal to or more than a predetermined positive threshold, $$Jc^{-1} = W^{-1} \cdot Jc^T \cdot (Jc \cdot W^{-1} \cdot Jc^T + k \cdot I)^{-1} \quad (30)$$

$$DET = det(Jc \cdot W^{-1} \cdot Jc^T + k \cdot I) \quad (31)$$

where W is the weight matrix set beforehand which is a diagonal matrix, and wherein the pseudo inverse matrix calculation parameter determination processor is configured to: repeatedly perform a process of setting a provisional value of k by gradually increasing the provisional value from a predetermined initial value, calculating the determinant DET using the set provisional value, and determining whether or not an absolute value of the calculated determinant DET is equal to or more than the predetermined threshold, and determine the provisional value of k in the case where a result of the determination is true as the value of k used for calculating the pseudo inverse matrix according to the equation (30); and set an increment of the provisional value of k in the case where the result of the determination is false, to a value proportional to an n-th root of an absolute value of an error between the absolute value of the determinant DET calculated using the provisional value before the increment and the predetermined threshold, where n is an order of $Jc \cdot W^{-1} \cdot Jc^T$.

6. A floor surface estimator which estimates a position and posture of an actual floor surface on which a mobile object moves, in a mobile object controller performing motion control of the mobile object according to a desired motion of the mobile object and a desired total floor reaction force which is a desired value of a total floor reaction force to be applied to the mobile object to realize the desired motion, the mobile object including a body, a plurality of leg links connected to the body, and a joint actuator which drives a joint of each leg link, and moving on the floor surface by movements of the plurality of leg links, the floor surface estimator comprising:

a total floor reaction force required correction amount determination processor configured to determine, as a total floor reaction force required correction amount, a result of integrating an error between an observed value of the total floor reaction force actually acting on the mobile object and the desired total floor reaction force, the total floor reaction force required correction amount being a correction amount of the total floor reaction force to be additionally applied to the mobile object so that the error approaches zero;

a representative contact surface position/posture displacement amount calculation processor configured to calculate, from the determined total floor reaction force required correction amount and a predetermined spring constant of a representative contact surface, a required displacement amount of a position and posture of the representative contact surface corresponding to the total floor reaction force required correction amount based on an assumption that the total floor reaction force required correction amount is generated by a spring displacement of the position and posture of the representative contact surface, the representative contact surface being a single virtual contact surface representative of all contact surfaces between the mobile object and the floor surface;

a representative contact surface Jacobian matrix calculation processor configured to calculate a representative contact surface Jacobian matrix Jc according to the following equation (27) from a leg link Jacobian matrix J_i for each leg link, the spring constant, a relative position of an actual floor reaction force central point of a distal end of each leg link relative to a total floor reaction force central point, and a floor reaction force actually acting on each leg link, the representative contact surface Jacobian matrix Jc being a Jacobian matrix representing a relation between a temporal change rate of the position and posture of the representative contact surface and a temporal change rate of a generalized variable vector whose components are a position and posture of the body and a displacement amount of each joint of the mobile object, the leg link Jacobian matrix J_i being a Jacobian matrix representing a relation between a temporal change rate of a position of a distal end of the leg link or a temporal change rate of a position and posture of the distal end of the leg link and the temporal change rate of the generalized variable vector, and the total floor reaction force central point being an acting point of the total floor reaction force actually acting on the mobile object;

a joint displacement correction amount determination processor configured to determine a joint displacement correction amount by multiplying the calculated required displacement amount of the position and posture of the representative contact surface by a pseudo inverse matrix $Jc^{-1}$ of the calculated representative contact surface Jacobian matrix Jc, the joint displacement correction amount being a correction amount of the displacement amount of each joint of the mobile object for realizing the required displacement amount of the position and posture of the representative contact surface; and a joint displacement control processor configured to control the joint actuator according to a corrected desired joint displacement amount obtained by correcting a desired joint displacement amount by the determined joint displacement correction amount, the desired joint displacement amount being the displacement amount of each joint of the mobile object defined by the desired motion of the mobile object, wherein the position and posture of the actual floor surface are estimated by correcting a position and posture of a supposed floor surface according to the required displacement amount calculated by the representative contact surface position/posture displacement amount calculation processor, the supposed floor surface being a floor surface supposed in the desired motion, $$Jc = \sum_{i=1}^{N} (r\_i \cdot A\_i \cdot J\_i) \tag{27}$$

where
Jc is the representative contact surface Jacobian matrix,
i is an identification number of a leg link,
N is a total number of leg links,
r_i is a weight coefficient of an i-th leg link determined by the following equation (27-1), $$r\_i = Fn\_i \bigg/ \left( \sum_{j=1}^{N} Fn\_j \right) \tag{27-1}$$

Fn_i is a normal force component of a floor reaction force acting on the i-th leg link,
A_i is a matrix defined by the following equation (27-2), $$A\_i \equiv \begin{bmatrix} I & 0 \\ Rk \cdot VV\_i & I \end{bmatrix} \tag{27-2}$$

Rk is a coefficient matrix defined by the following equation (27-3), $$Rk = Kc\_rot^{-1} \cdot Kc\_org \qquad (27\text{-}3)$$

Kc_org is a spring constant matrix relating to a translational displacement of the position of the representative contact surface, Kc_rot is a spring constant matrix relating to a rotational displacement of the posture of the representative contact surface, VV_i is a matrix such that $VV\_i \cdot \uparrow F\_i = \uparrow V\_i \times \uparrow F\_i$, ↑F_i is a floor reaction force vector acting on the i-th leg link, ↑V_i is a position vector of a floor reaction force central point of a distal end of the i-th leg link relative to the total floor reaction force central point, and J_i is a leg link Jacobian matrix of the i-th leg link.

7. A floor surface estimator which estimates a position and posture of an actual floor surface on which a mobile object moves, in a mobile object controller performing motion control of the mobile object according to a desired motion of the mobile object and a desired total floor reaction force which is a desired value of a total floor reaction force to be applied to the mobile object to realize the desired motion, the mobile object including a body, a plurality of leg links connected to the body, and a joint actuator which drives a joint of each leg link, and moving on the floor surface by movements of the plurality of leg links, the floor surface estimator comprising:

a total floor reaction force required correction amount determination processor configured to determine a total floor reaction force required correction amount which is a correction amount of a total floor reaction force to be additionally applied to the mobile object so that an error between an observed value of the total floor reaction force actually acting on the mobile object and the desired total floor reaction force approaches zero, by combining at least a proportional term proportional to the error and an integral term obtained by integrating the error;

a representative contact surface position/posture displacement amount calculation processor configured to calculate, from the determined total floor reaction force required correction amount and a predetermined spring constant of a representative contact surface, a required displacement amount of a position and posture of the representative contact surface corresponding to the total floor reaction force required correction amount based on an assumption that the total floor reaction force required correction amount is generated by a spring displacement of the position and posture of the representative contact surface, the representative contact surface being a single virtual contact surface representative of all contact surfaces between the mobile object and the floor surface;

a representative contact surface Jacobian matrix calculation processor configured to calculate a representative contact surface Jacobian matrix Jc according to the following equation (27) from a leg link Jacobian matrix J_i for each leg link, the spring constant, a relative position of an actual floor reaction force central point of a distal end of each leg link relative to a total floor reaction force central point, and a floor reaction force actually acting on each leg link, the representative contact surface Jacobian matrix Jc being a Jacobian matrix representing a relation between a temporal change rate of the position and posture of the representative contact surface and a temporal change rate of a generalized variable vector whose components are a position and posture of the body and a displacement amount of each joint of the mobile object, the leg link Jacobian matrix J_i being a Jacobian matrix representing a relation between a temporal change rate of a position of a distal end of the leg link or a temporal change rate of a position and posture of the distal end of the leg link and the temporal change rate of the generalized variable vector, and the total floor reaction force central point being an acting point of the total floor reaction force actually acting on the mobile object;

a joint displacement correction amount determination processor configured to determine a joint displacement correction amount by multiplying the calculated required displacement amount of the position and posture of the representative contact surface by a pseudo inverse matrix $Jc^{-1}$ of the calculated representative contact surface Jacobian matrix Jc, the joint displacement correction amount being a correction amount of the displacement amount of each joint of the mobile object for realizing the required displacement amount of the position and posture of the representative contact surface;

a joint displacement control processor configured to control the joint actuator according to a corrected desired joint displacement amount obtained by correcting a desired joint displacement amount by the determined joint displacement correction amount, the desired joint displacement amount being the displacement amount of each joint of the mobile object defined by the desired motion of the mobile object; and a representative contact surface steady-state displacement amount calculation processor configured to calculate a representative contact surface steady-state displacement amount from the integral term in the total floor reaction force required correction amount and the spring constant of the representative contact surface, the representative contact surface steady-state displacement amount being a displacement amount of the position and posture of the representative contact surface corresponding to the integral term, wherein the position and posture of the actual floor surface are estimated by correcting a position and posture of a supposed floor surface according to the representative contact surface steady-state displacement amount calculated by the representative contact surface steady-state displacement amount calculation processor, the supposed floor surface being a floor surface supposed in the desired motion, $$Jc = \sum_{i=1}^{N} (r\_i \cdot A\_i \cdot J\_i) \qquad (27)$$

where
  Jc is the representative contact surface Jacobian matrix,
  i is an identification number of a leg link,
  N is a total number of leg links,
  r_i is a weight coefficient of an i-th leg link determined by the following equation (27-1), $$r\_i = Fn\_i \Big/ \left( \sum_{j=1}^{N} Fn\_j \right) \qquad (27\text{-}1)$$

Fn_i is a normal force component of a floor reaction force acting on the i-th leg link, A_i is a matrix defined by the following equation (27-2), $$A\_i \equiv \begin{bmatrix} I & 0 \\ Rk \cdot VV\_i & I \end{bmatrix} \quad (27\text{-}2)$$

Rk is a coefficient matrix defined by the following equation (27-3), $$Rk = Kc\_rot^{-1} \cdot Kc\_org \quad (27\text{-}3)$$

Kc_org is a spring constant matrix relating to a translational displacement of the position of the representative contact surface, Kc_rot is a spring constant matrix relating to a rotational displacement of the posture of the representative contact surface, VV_i is a matrix such that $VV\_i \cdot \uparrow F\_i = \uparrow V\_i \times \uparrow F\_i$, ↑F_i is a floor reaction force vector acting on the i-th leg link, ↑V_i is a position vector of a floor reaction force central point of a distal end of the i-th leg link relative to the total floor reaction force central point, and J_i is a leg link Jacobian matrix of the i-th leg link.

8. The floor surface estimator according to claim 6, wherein the pseudo inverse matrix $Jc^{-1}$ of the calculated representative contact surface Jacobian matrix Jc is a matrix obtained according to the following equation (30) from a weight matrix W set beforehand and the calculated representative contact surface Jacobian matrix Jc, wherein the floor surface estimator further comprises a pseudo inverse matrix calculation parameter determination processor configured to determine a value of k in the equation (30) so that a determinant DET expressed by the following equation (31) is equal to or more than a predetermined positive threshold, $$Jc^{-1} = W^{-1} \cdot Jc^T \cdot (Jc \cdot W^{-1} \cdot Jc^T + k \cdot I)^{-1} \quad (30)$$

$$DET = det(Jc \cdot W^{-1} \cdot Jc^T + k \cdot I) \quad (31)$$

where W is the weight matrix set beforehand which is a diagonal matrix, and wherein the pseudo inverse matrix calculation parameter determination processor is configured to: repeatedly perform a process of setting a provisional value of k by gradually increasing the provisional value from a predetermined initial value, calculating the determinant DET using the set provisional value, and determining whether or not an absolute value of the calculated determinant DET is equal to or more than the predetermined threshold, and determine the provisional value of k in the case where a result of the determination is true as the value of k used for calculating the pseudo inverse matrix according to the equation (30); and set an increment of the provisional value of k in the case where the result of the determination is false, to a value proportional to an n-th root of an absolute value of an error between the absolute value of the determinant DET calculated using the provisional value before the increment and the predetermined threshold, where n is an order of $Jc \cdot W^{-1} \cdot Jc^T$.

9. The floor surface estimator according to claim 7, wherein the pseudo inverse matrix $Jc^{-1}$ of the calculated representative contact surface Jacobian matrix Jc is a matrix obtained according to the following equation (30) from a weight matrix W set beforehand and the calculated representative contact surface Jacobian matrix Jc, wherein the floor surface estimator further comprises a pseudo inverse matrix calculation parameter determination processor configured to determine a value of k in the equation (30) so that a determinant DET expressed by the following equation (31) is equal to or more than a predetermined positive threshold, $$Jc^{-1} = W^{-1} \cdot Jc^T \cdot (Jc \cdot W^{-1} \cdot Jc^T + k \cdot I)^{-1} \quad (30)$$

$$DET = det(Jc \cdot W^{-1} \cdot Jc^T + k \cdot I) \quad (31)$$

where W is the weight matrix set beforehand which is a diagonal matrix, and wherein the pseudo inverse matrix calculation parameter determination processor is configured to: repeatedly perform a process of setting a provisional value of k by gradually increasing the provisional value from a predetermined initial value, calculating the determinant DET using the set provisional value, and determining whether or not an absolute value of the calculated determinant DET is equal to or more than the predetermined threshold, and determine the provisional value of k in the case where a result of the determination is true as the value of k used for calculating the pseudo inverse matrix according to the equation (30); and set an increment of the provisional value of k in the case where the result of the determination is false, to a value proportional to an n-th root of an absolute value of an error between the absolute value of the determinant DET calculated using the provisional value before the increment and the predetermined threshold, where n is an order of $Jc \cdot W^{-1} \cdot Jc^T$.

10. A mobile object controller which performs motion control of a mobile object according to a desired motion and a desired total contact force, the mobile object including a body, a plurality of movable links connected to the body, and a joint actuator which drives a joint of each movable link, the desired motion being for moving the mobile object while at least one movable link contacts each of first to N-th contact target surfaces which are a plurality of mutually different contact target surfaces existing in a mobile environment of the mobile object where N is an integer equal to or more than 2, and the desired total contact force being a desired value of a total contact force to be applied to the mobile object from each of the first to N-th contact target surfaces to realize the desired motion, the mobile object controller comprising:

a total contact force required correction amount determination processor configured to determine an i-th total contact force required correction amount according to an error between an observed value of a total contact force actually acting on the mobile object from an i-th contact target surface and a desired total contact force corresponding to the i-th contact target surface where i=1, 2, . . . , N, the i-th total contact force required correction amount being a required correction amount of the total contact force to be additionally applied to the mobile object from the i-th contact target surface so that the error approaches zero, the i-th contact target surface being each of the first to N-th contact target surfaces;

a representative contact surface position/posture displacement amount calculation processor configured to calculate, from the determined i-th total contact force required correction amount and a predetermined spring constant of an i-th representative contact surface corresponding to the i-th contact target surface where i=1, 2, . . . , N, a required displacement amount of a position and posture of the i-th representative contact surface based on an assumption that the i-th total contact force required correction amount is generated by a spring displacement of the position and posture of the i-th representative contact surface, the i-th representative contact surface being a single virtual contact surface representative of all contact surfaces between the mobile object and the i-th contact target surface;

a representative contact surface Jacobian matrix calculation processor configured to calculate an i-th representative contact surface Jacobian matrix Jc(i) according to the following equation (77) from a movable link Jacobian matrix J(i)_j for each movable link in an i-th contact movable link group where i=1, 2, . . . , N, the spring constant of the i-th representative contact surface, a relative position of an actual contact force central point of a contact portion of each movable link in the i-th contact movable link group relative to a total contact force central point, and a contact force actually acting on each movable link in the i-th contact movable link group, the i-th representative contact surface Jacobian matrix Jc(i) being a Jacobian matrix representing a relation between a temporal change rate of the position and posture of the i-th representative contact surface and a temporal change rate of a generalized variable vector whose components are a position and posture of the body and a displacement amount of each joint of the mobile object, the movable link Jacobian matrix J(i)_j being a Jacobian matrix representing a relation between a temporal change rate of a position of a contact portion of the movable link in the i-th contact movable link group or a temporal change rate of a position and posture of the contact portion of the movable link in the i-th contact movable link group and the temporal change rate of the generalized variable vector, the total contact force central point being an acting point of the total contact force actually acting on the mobile object from the i-th contact target surface, and the i-th contact movable link group being a group of movable links contacting the i-th contact target surface;

a joint displacement correction amount determination processor configured to determine a joint displacement correction amount by multiplying an overall required displacement amount by a pseudo inverse matrix $Jc^{-1}$ of an overall Jacobian matrix Jc, the joint displacement correction amount being a correction amount of the displacement amount of each joint of the mobile object for realizing the required displacement amount of the position and posture of each of the first to N-th representative contact surfaces, the overall required displacement amount being formed by arranging calculated required displacement amounts of positions and postures of first to N-th representative contact surfaces, and the overall Jacobian matrix Jc being formed by arranging calculated first to N-th representative contact surface Jacobian matrices Jc(i) where i=1, 2, . . . , N; and a joint displacement control processor configured to control the joint actuator according to a corrected desired joint displacement amount obtained by correcting a desired joint displacement amount by the determined joint displacement correction amount, the desired joint displacement amount being the displacement amount of each joint of the mobile object defined by the desired motion of the mobile object, $$Jc(i) = \sum_{j=1}^{m(i)} (r(i)\_j \cdot A(i)\_j \cdot J(i)\_j) \qquad (77)$$

where
Jc(i) is an i-th representative contact surface Jacobian matrix,
j is an identification number of each movable link belonging to the i-th contact movable link group,
m(i) is a total number of movable links belonging to the i-th contact movable link group,
r(i)_j is a weight coefficient of a j-th movable link in the i-th contact movable link group determined by the following equation (77-1), $$r(i)\_j = Fn(i)\_j/(j) \qquad (77\text{-}1)$$

Fn(i)_j is a normal force component of a contact force acting on the j-th movable link in the i-th contact movable link group,
A(i)_j is a matrix defined by the following equation (77-2), $$A(i)\_j \equiv \begin{bmatrix} I & 0 \\ Rk(i) \cdot VV(i)\_j & I \end{bmatrix} \qquad (77\text{-}2)$$

Rk(i) is a coefficient matrix defined by the following equation (77-3), $$Rk(i) = Kc(i)\_rot^{-1} \cdot Kc(i)\_org \qquad (77\text{-}3)$$

Kc(i)_org is a spring constant matrix relating to a translational displacement of the position of the i-th representative contact surface,
Kc(i)_rot is a spring constant matrix relating to a rotational displacement of the posture of the i-th representative contact surface,
VV(i)_j is a matrix such that VV(i)_j·↑F(i)_j= ↑V(i)_j×T F(i)_j,
↑F(i)_j is a contact force vector acting on the j-th movable link in the i-th contact movable link group,
↑V(i)_j is a position vector of a contact force central point of a contact portion of the j-th movable link in the i-th contact movable link group relative to the total contact force central point of the i-th contact target surface, and
J(i)_j is a movable link Jacobian matrix of the j-th movable link in the i-th contact movable link group.

11. The mobile object controller according to claim 10, wherein the total contact force required correction amount determination processor is configured to determine the i-th total contact force required correction amount by integrating the error on the i-th contact target surface where i=1, 2, . . . , N.

12. The mobile object controller according to claim 10, wherein the total contact force required correction amount determination processor is configured to determine the i-th total contact force required correction amount, by combining at least a proportional term proportional to the error and an integral term obtained by integrating the error on the i-th contact target surface, where i=1, 2, . . . , N.

13. The mobile object controller according to claim 11, further comprising
a contact target surface estimation processor configured to estimate a position and posture of an actual h-th contact target surface by correcting a position and posture of a supposed h-th contact target surface according to a required displacement amount of an h-th representative contact target surface calculated by the representative contact surface position/posture displacement amount calculation processor, the supposed h-th contact target surface being a contact target surface supposed in the desired motion in correspondence with an h-th contact target surface which is a predetermined specific contact target surface of the first to N-th contact target surfaces.

14. The mobile object controller according to claim 12, further comprising
a contact target surface estimation processor configured to estimate a position and posture of an actual h-th contact target surface by correcting a position and posture of a supposed h-th contact target surface, the supposed h-th contact target surface being a contact target surface supposed in the desired motion in correspondence with an h-th contact target surface which is a predetermined specific contact target surface of the first to N-th contact target surfaces,
wherein the contact target surface estimation processor is configured to estimate the position and posture of the actual h-th contact target surface by: calculating an h-th representative contact target surface steady-state displacement amount from an integral term included in an h-th total contact force required correction amount corresponding to the h-th contact target surface and a spring constant of an h-th representative contact surface corresponding to the h-th contact target surface; and correcting the position and posture of the supposed h-th contact target surface according to the h-th representative contact surface steady-state displacement amount, the h-th representative contact surface steady-state displacement amount being a displacement amount of a position and posture of the h-th representative contact surface corresponding to the integral term.

15. The mobile object controller according to claim 10, wherein the pseudo inverse matrix $Jc^{-1}$ of the calculated overall Jacobian matrix $Jc$ is a matrix obtained according to the following equation (30) from a weight matrix W set beforehand and the calculated overall Jacobian matrix $Jc$,
wherein the mobile object controller further comprises
a pseudo inverse matrix calculation parameter determination processor configured to determine a value of k in the equation (30) so that a determinant DET expressed by the following equation (31) is equal to or more than a predetermined positive threshold, $$Jc^{-1} = W^{-1} \cdot Jc^T \cdot (Jc \cdot W^{-1} \cdot Jc^T + k \cdot I)^{-1} \qquad (30)$$

$$DET = det(Jc \cdot W^{-1} \cdot Jc^T + k \cdot I) \qquad (31)$$

where W is the weight matrix set beforehand which is a diagonal matrix, and
wherein the pseudo inverse matrix calculation parameter determination processor is configured to: repeatedly perform a process of setting a provisional value of k by gradually increasing the provisional value from a predetermined initial value, calculating the determinant DET using the set provisional value, and determining whether or not an absolute value of the calculated determinant DET is equal to or more than the predetermined threshold, and determine the provisional value of k in the case where a result of the determination is true as the value of k used for calculating the pseudo inverse matrix $Jc^{-1}$ according to the equation (30); and set an increment of the provisional value of k in the case where the result of the determination is false, to a value proportional to an n-th root of an absolute value of an error between the absolute value of the determinant DET calculated using the provisional value before the increment and the predetermined threshold, where n is an order of $Jc \cdot W^{-1} \cdot Jc^T$.

* * * * *